United States Patent [19]

Fukushima et al.

[11] Patent Number: 5,293,256
[45] Date of Patent: Mar. 8, 1994

[54] FACSIMILE APPARATUS COMPRISING A ONE-TOUCH DIAL FUNCTION

[75] Inventors: Shigenobu Fukushima; Hiroya Sugawa, both of Toyokawa, Japan

[73] Assignee: Minolta Camera Kabushiki Kaisha, Osaka, Japan

[21] Appl. No.: 953,182

[22] Filed: Sep. 29, 1992

Related U.S. Application Data

[63] Continuation of Ser. No. 567,143, Aug. 14, 1990.

[30] Foreign Application Priority Data

Aug. 14, 1989 [JP] Japan .................. 1-210521
Aug. 14, 1989 [JP] Japan .................. 1-210522

[51] Int. Cl.⁵ .............................................. H04N 1/32
[52] U.S. Cl. ..................... 358/468; 358/440; 358/444; 358/401
[58] Field of Search ............... 358/468, 400, 401, 404, 358/434, 440, 444; 377/100, 88

[56] References Cited

U.S. PATENT DOCUMENTS

| | | | |
|---|---|---|---|
| 4,432,020 | 2/1984 | Onose et al. | 379/100 |
| 4,907,274 | 3/1990 | Nomura et al. | 379/100 |
| 5,121,423 | 6/1992 | Morihiro et al. | 379/100 |
| 5,210,621 | 5/1993 | Kinoshita | 379/100 |

FOREIGN PATENT DOCUMENTS

0107770  6/1983  Japan .................. 358/440

OTHER PUBLICATIONS

Document entitled "Toshiba Markets a New Popular Type G-3 Format Facsimile Using an Exclusive Personal Card for Communication with 55 Registered Addresses Via Single-Touch Key Operation," News in The Denpa Shinbun, Jan. 11, 1989.

*Primary Examiner*—Edward L. Coles, Sr.
*Assistant Examiner*—Jerome Grant
*Attorney, Agent, or Firm*—Willian Brinks Hofer Gilson & Lione

[57] ABSTRACT

There is disclosed a facsimile apparatus comprising plural keys arranged on an operation panel and a RAM for storing data of destinations and facsimile numbers thereof so as to correspond to respective keys. A network control unit of the facsimile apparatus dials through a communication line the facsimile number stored in the RAM corresponding to pressed one of the plural keys when one of the plural keys is pressed. Further, a printer section reads the data stored in the RAM, and prints the read data on a piece of paper or label in a format suitable for sticking it on an IC card or in the vicinity of each of the plural keys on the operation panel.

8 Claims, 46 Drawing Sheets

```
┌─────────────────────┐ ┌─────────────────────┐ ┌─────────────────────┐
│ Head office         │ │ Head office         │ │ Head office         │
│ Sales dep. 1st sec. │ │ Personnel dep. 2nd  │ │ Personnel dep. 1st sec. │
│   06(111)1122       │ │ sec.  06(222)2222   │ │   06(333)3333       │
└─────────────────────┘ └─────────────────────┘ └─────────────────────┘

┌─────────────────────┐ ┌─────────────────────┐ ┌─────────────────────┐
│ Head office sales   │ │ Tokyo branch        │ │ Nagoya branch       │
│ dep. 2nd sec.       │ │ office              │ │ office              │
│   06(444)1234       │ │   03(555)5555       │ │   052(66)6666       │
└─────────────────────┘ └─────────────────────┘ └─────────────────────┘

┌─────────────────────┐ ┌─────────────────────┐ ┌─────────────────────┐
│ Osaka sales office  │ │ Nara sales office   │ │ Wakayama sales      │
│                     │ │                     │ │ office              │
│   06(777)7777       │ │   0742(88)8888      │ │   0734(99)9999      │
└─────────────────────┘ └─────────────────────┘ └─────────────────────┘

┌─────────────────────┐ ┌─────────────────────┐ ┌─────────────────────┐
│ Kobe sales office   │ │ Okayama sales       │ │ Shizuoka sales      │
│                     │ │ office              │ │ office              │
│   078(12)3456       │ │   0833(78)9012      │ │   0559(34)5678      │
└─────────────────────┘ └─────────────────────┘ └─────────────────────┘
```

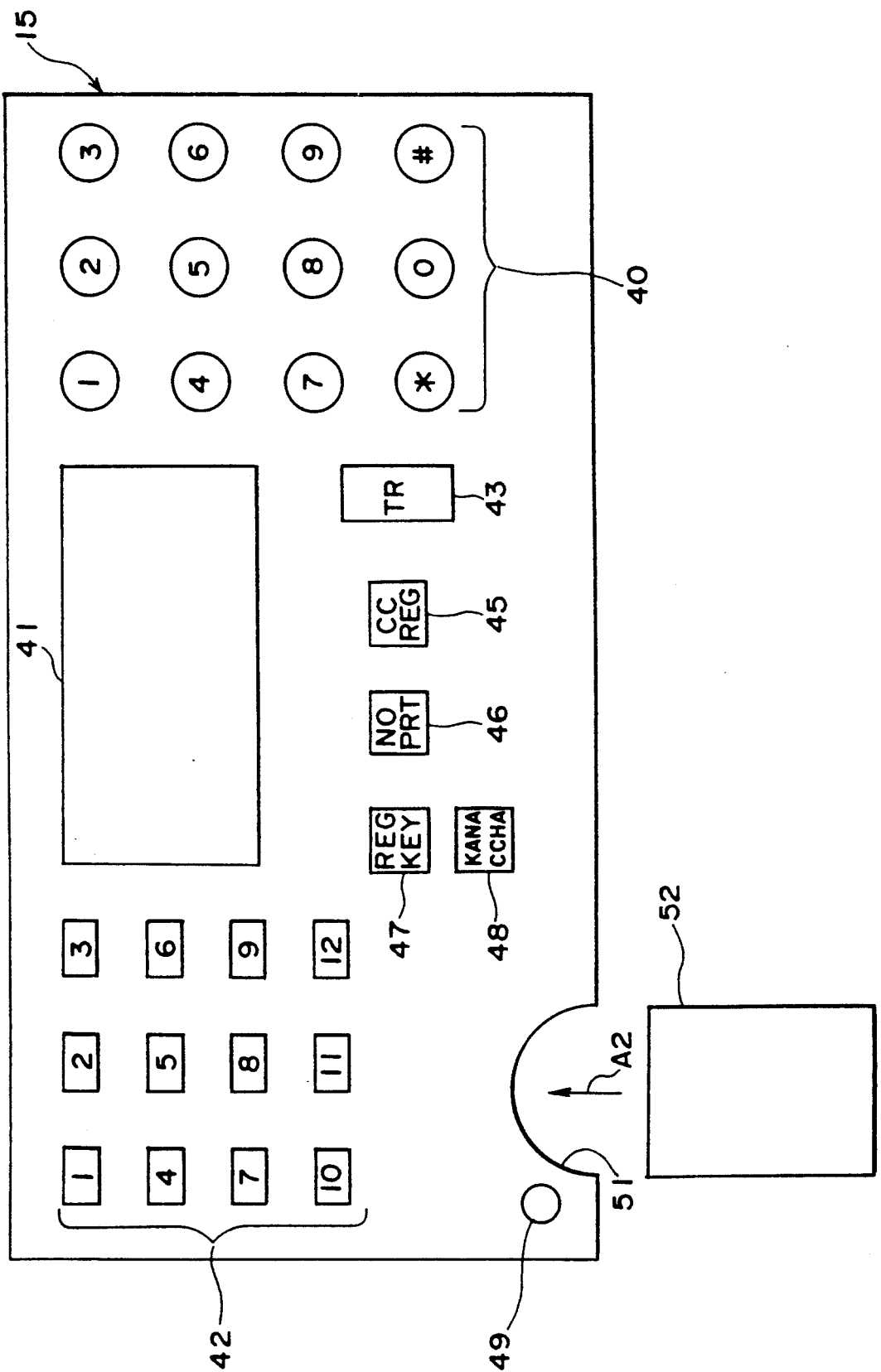

Fig. 3a — Input destination OR Insert calling card — 100a

Fig. 3b — Do not you feed card to bottom thereof ? — 100b

Fig. 3c — You can transmit image by interruption after stop of printing — 100c

Fig. 3d — Printing — 100d

Fig. 3e — Completion of printing — 100e

Fig. 3f — Reading — 100f

Fig. 3g — Transmitting — 100g

Fig. 3h — Receiving — 100h

Fig. 3i — Completion of transmission — 100i

Fig. 3j — Completion of Receipt — 100j

Fig. 3k — Completion of Reading — 100k

Fig. 3l — Reading destination NO. — 100l

Fig. 3m — Set document. — 100m

Fig. 3n — Destination FAX is not type of FAX which can not connect with ours. — 100n Fig. 3o — Analyzing destination No. please wait a minute. — 100o Fig. 3p — Please select one of FAX Nos.
1 : ○○-○○○-○○○○
2 : △△△△-△△-△△△△
3 : □□□-□□-□□□□ — 100p Fig. 3q — Dial FAX No. of IC card registration by one-touch key. Address Group No. =○○ — 100q Fig. 3r — You can use this IC card. — 100r Fig. 3s — No Number registration. Dial originally registerd No. by one-touch key. — 100s Fig. 3t — 100t: No Number registration. Input FAX No. using Ten key.

Fig. 3u — 100u: This No. is registered in ○○-group of IC card. Please press one-touch key to be registered.

Fig. 3v — 100v: This No. is registered in one-touch key of main body. Please press one-touch key to be registered.

Fig. 3w — 100w: Register FAX No. of calling card.

Fig. 3x — 100x: Please set calling card because FAX No. thereof will be registered.

Fig. 3y — 100y: Could not FAX No.

Fig. 3z — 100z: FAX No.: ○○-○○○-○○○○

Fig. 3aa — 100aa: FAX No.: ○○-○○○-○○○○ is automatically selected.

Fig. 6a
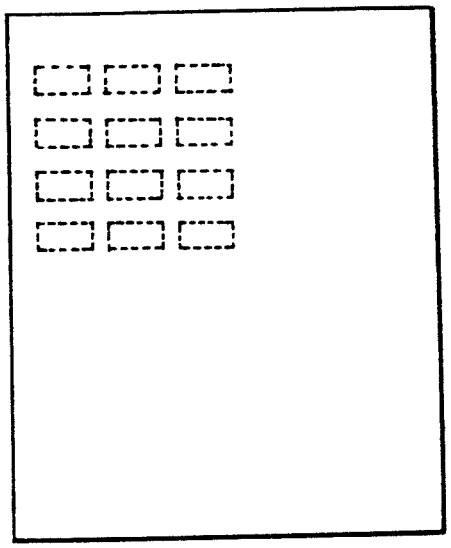
Fig. 6b
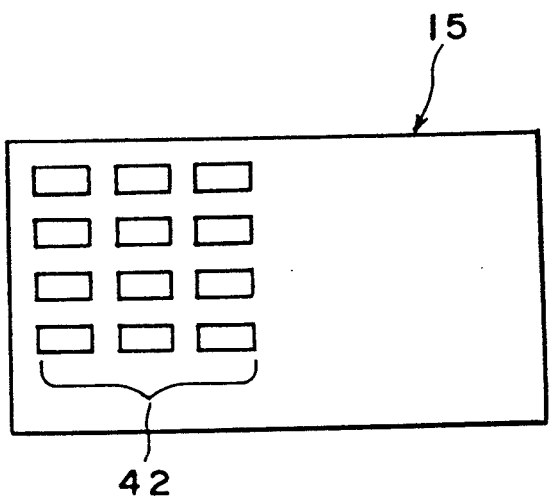
Fig. 6c
| Head office Sales dep. 1st sec. 06(111)1122 | Head office Personnel dep. 2nd sec. 06(222)2222 | Head office Personnel dep. 1st sec. 06(333)3333 |
|---|---|---|
| Head office sales dep. 2nd sec. 06(444)1234 | Tokyo branch office 03(555)5555 | Nagoya branch office 052(66)6666 |
| Osaka sales office 06(777)7777 | Nara sales office 0742(88)8888 | Wakayama sales office 0734(99)9999 |
| Kobe sales office 078(12)3456 | Okayama sales office 0833(78)9012 | Shizuoka sales office 0559(34)5678 |

Fig. 7a      Fig. 7b
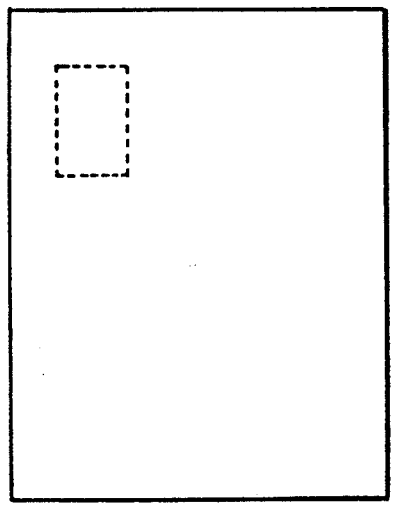
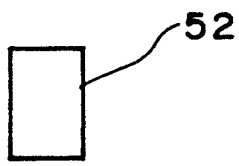
Fig. 7c
```
 1. Head office Sales Dep. 1st Sec.
 2. Head office Personnel Dep. 2nd Sec.
 3. Head office Personnel Dep. 1st Sec.
 4. Head office Sales Dep. 2nd Sec
 5. Tokyo Branch office
 6. Nagoya Branch office
 7. Osaka Sales office
 8. Nara Sales office
 9. Wakayama Sales office
10. Kobe Sales office
11. Okayama Sales office
12. Shizuoka Sales office
```

Data to be stored

| Destination | 本社営業1課 |
|---|---|
| FAX. No. | 0 6 - 1 1 1 - 1 1 2 2 |

Stored character code

| Destination | 1 9 5 , 5 E C , 1 0 8 , 1 F 4 , 7 6 6 , E 5 A |
|---|---|
| FAX. No. | 7 D E , 7 2 C , 9 6 0 , 7 6 6 , 7 6 6 , 7 6 6 , |
| | 9 6 0 , 7 6 6 , 7 6 6 , 7 6 7 , 7 6 7 |

```
3C 00
7E 00
E7 00
C3 00
07 00
06 00
0E 00
1C 00
38 00
70 00
FF 80
FF 80
```

| | | |
|---|---|---|
| 01 | F8 | 00 |
| 07 | FE | 00 |
| 1F | FF | 80 |
| 3E | 0F | C0 |
| 3C | 07 | C0 |
| 78 | 07 | E0 |
| 7C | 03 | E0 |
| 7C | 03 | E0 |
| 7C | 03 | E0 |
| 38 | 03 | E0 |
| 00 | 03 | E0 |
| 00 | 07 | C0 |
| 00 | 07 | C0 |
| 00 | 0F | 80 |
| 00 | 0F | 80 |
| 00 | 1F | 00 |
| 00 | 1F | 00 |
| 00 | 3E | 00 |
| 00 | 3C | 00 |
| 00 | 78 | 00 |
| 00 | F0 | 00 |
| 01 | E0 | 00 |
| 03 | C0 | 30 |
| 07 | 80 | 30 |
| 0F | 00 | 70 |
| 1E | 00 | 70 |
| 3C | 00 | F0 |
| 7F | FF | F0 |
| FF | FF | F0 |
| FF | FF | F0 |
| FF | FF | F0 |

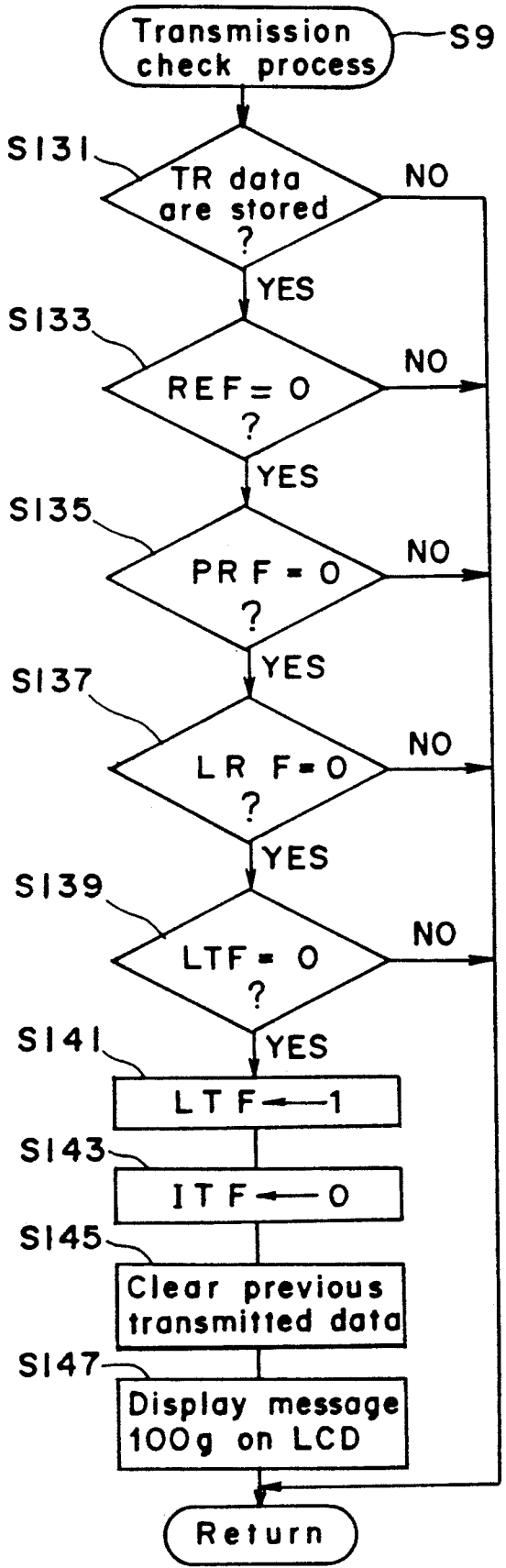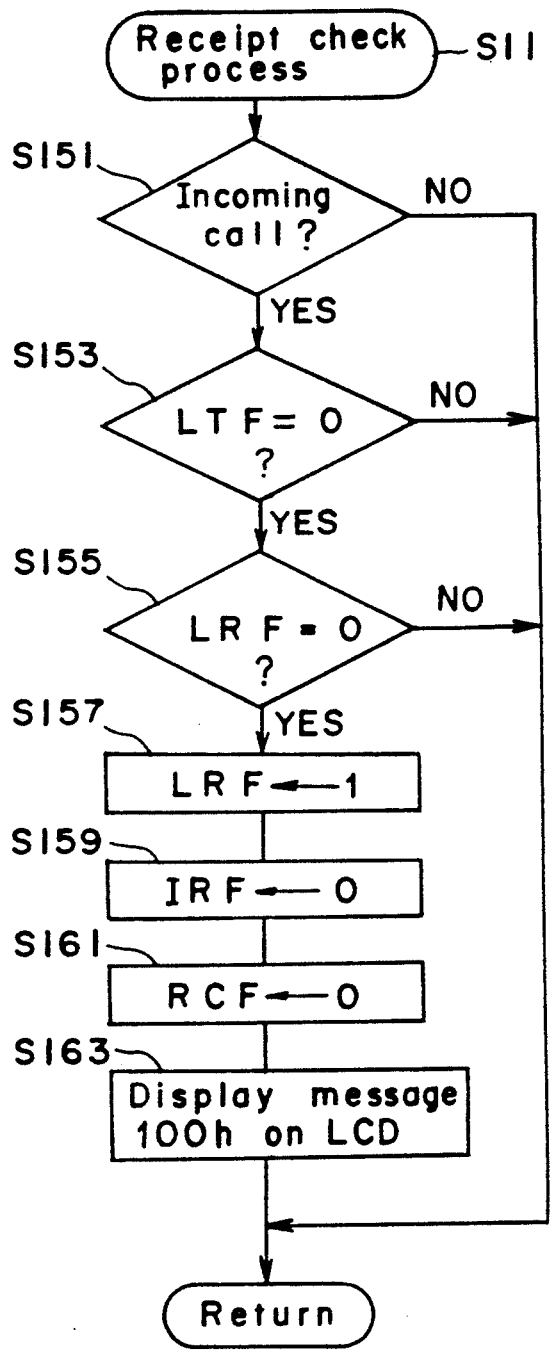

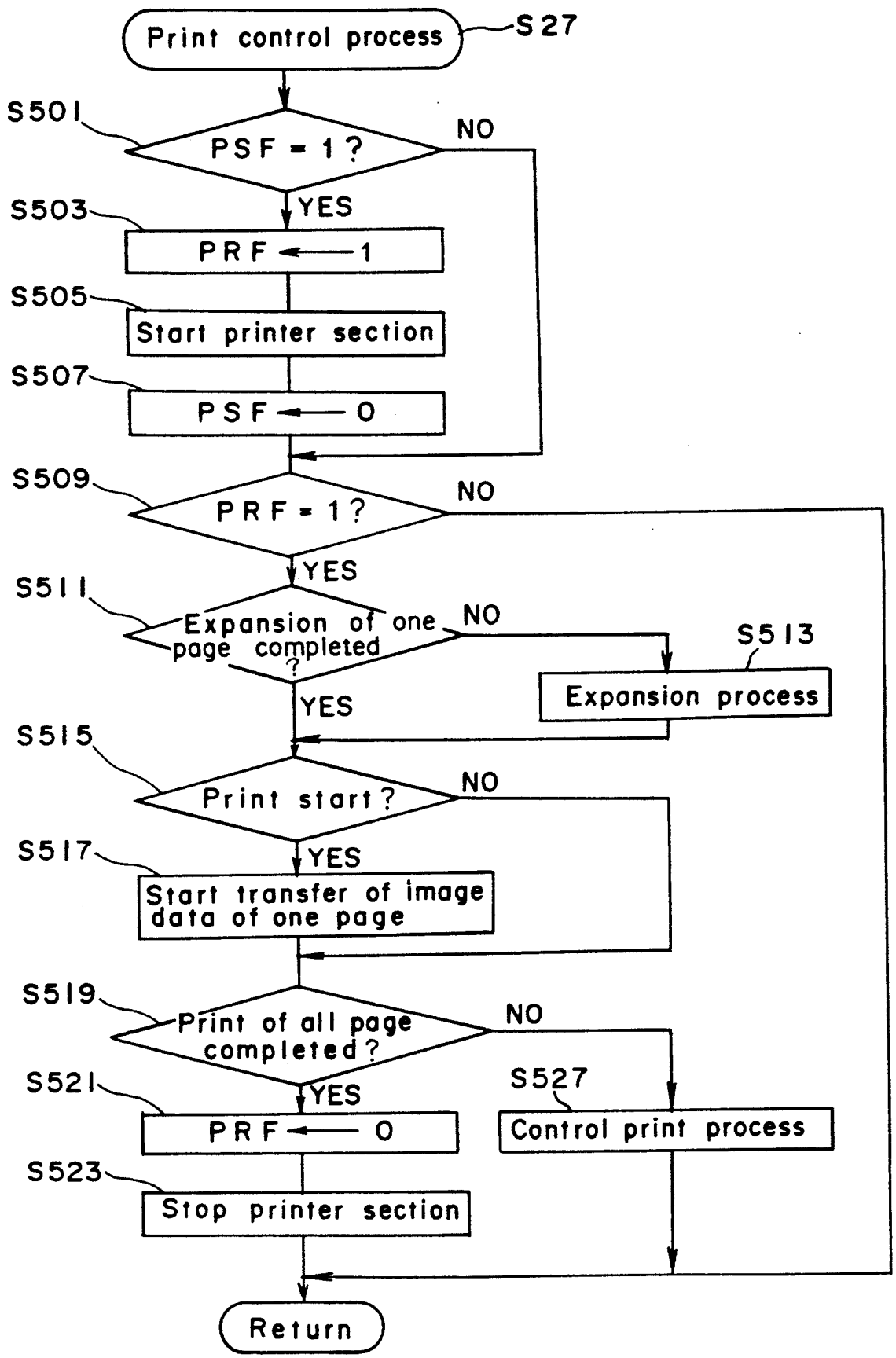

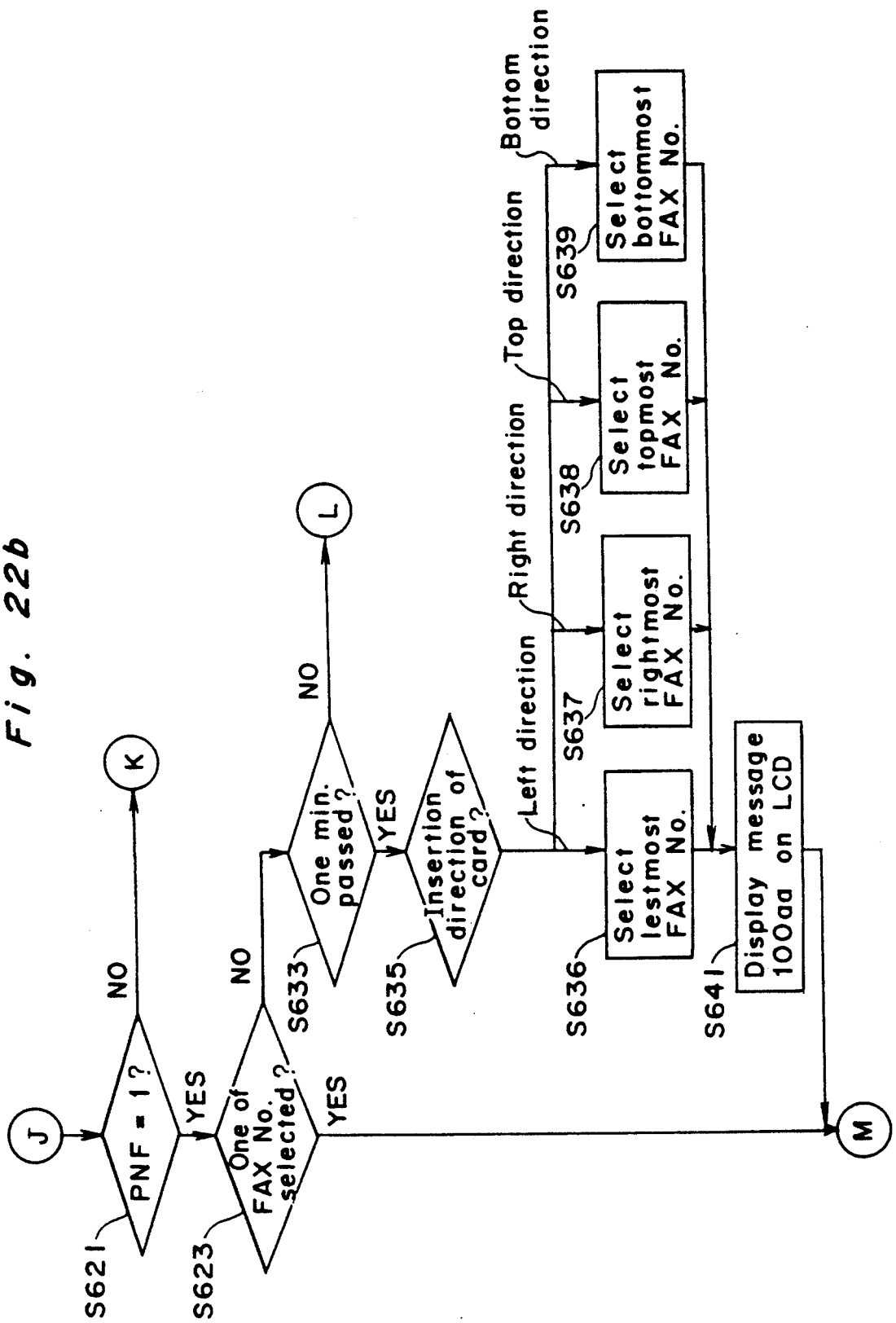

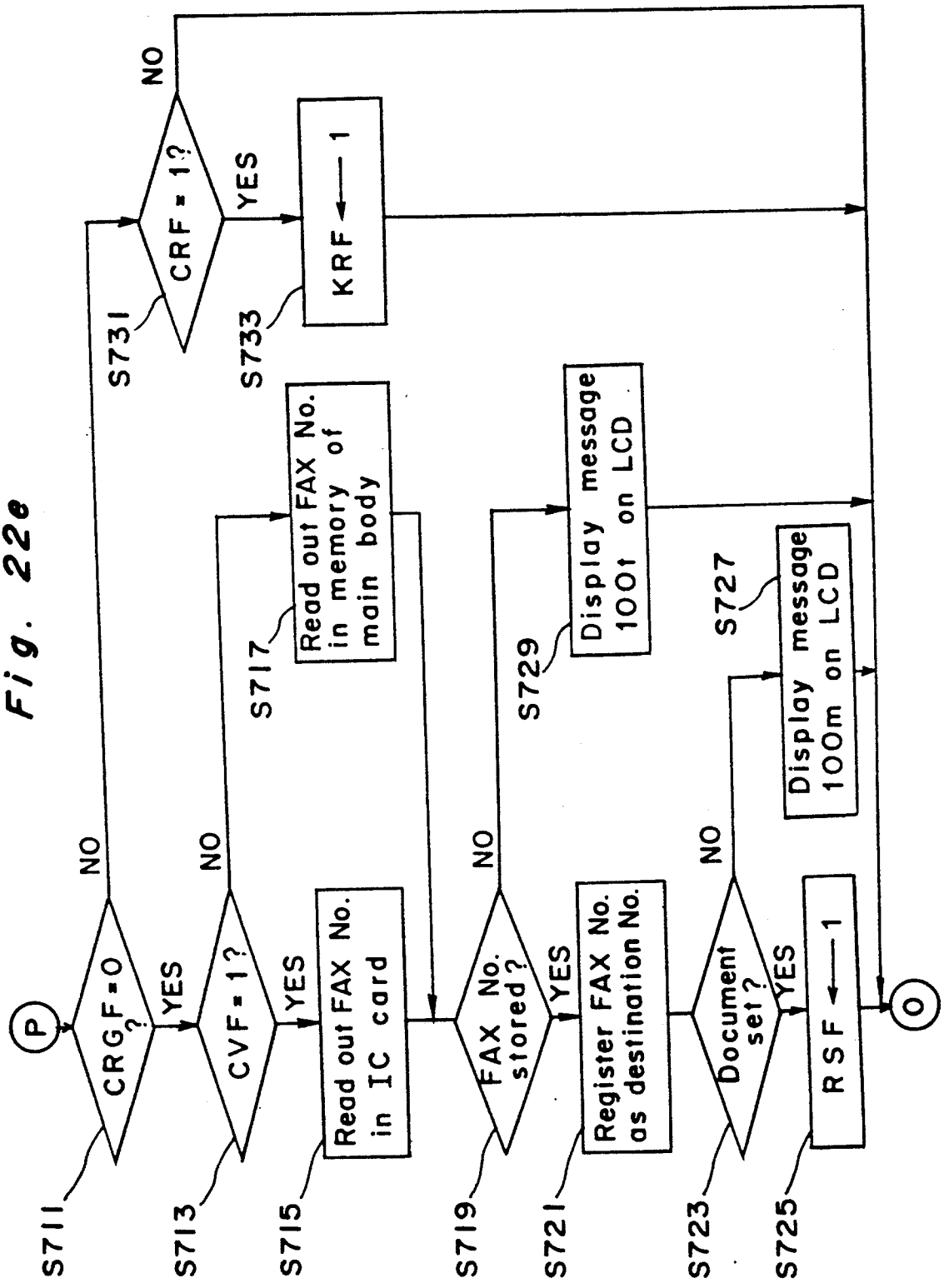

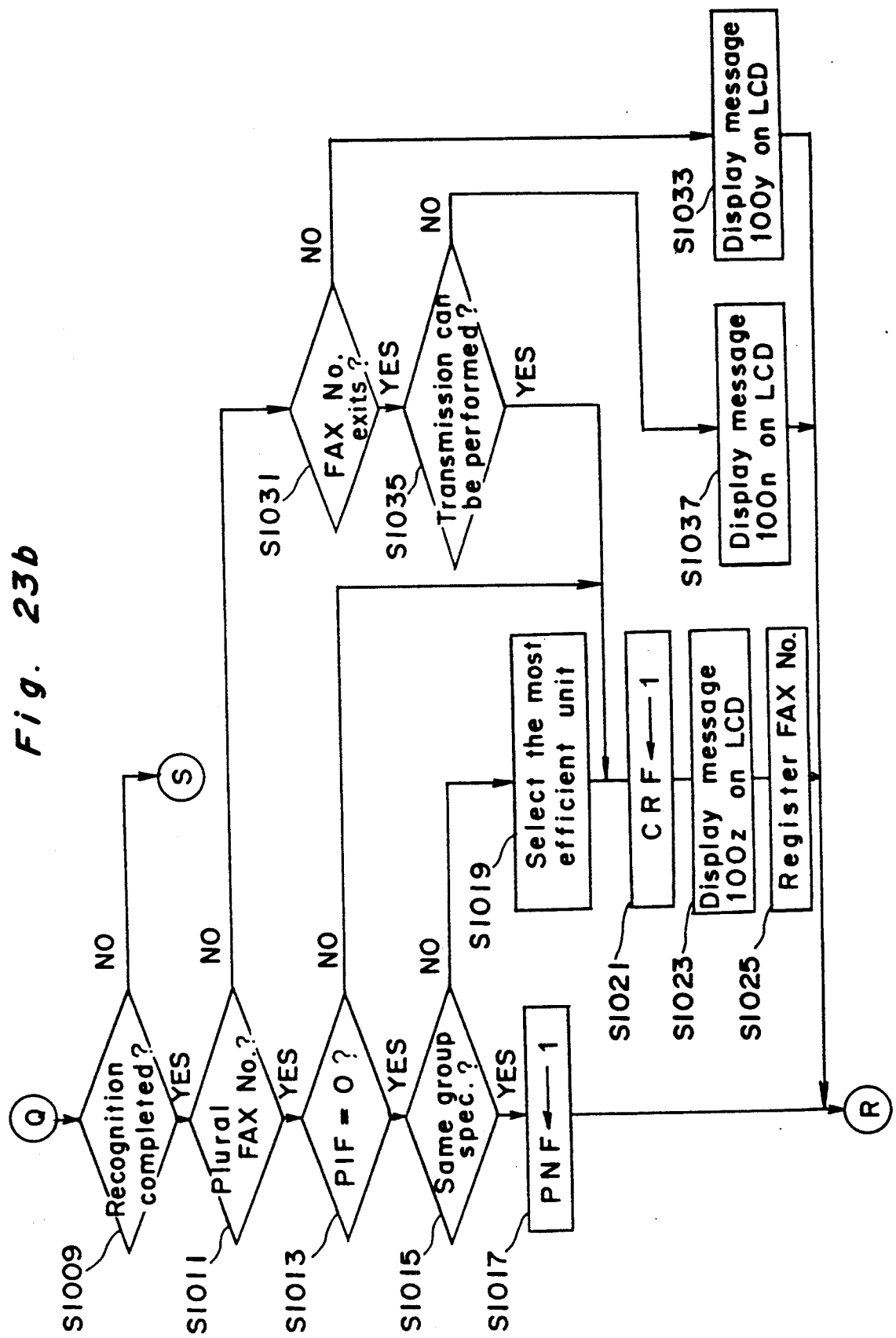

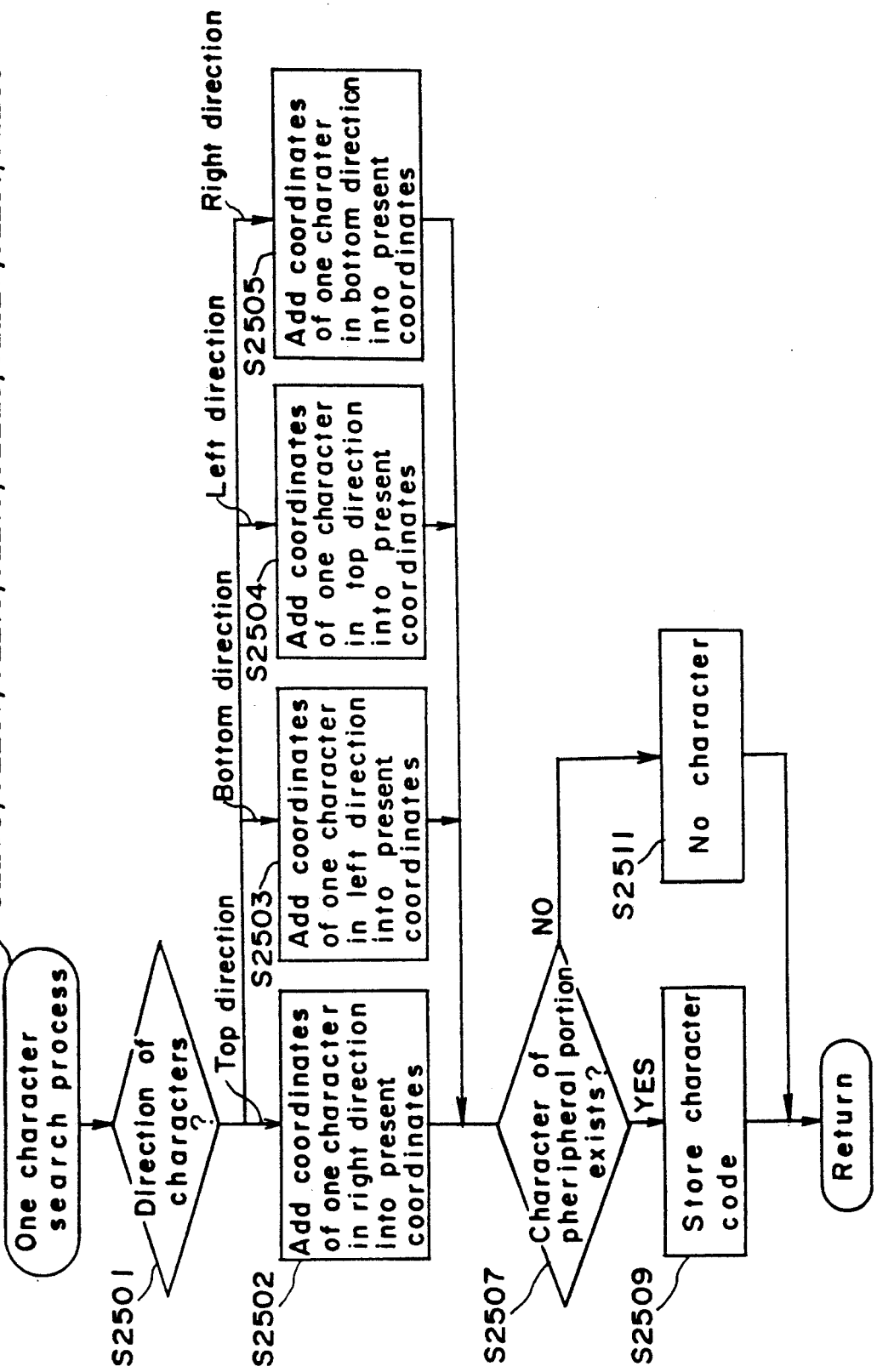

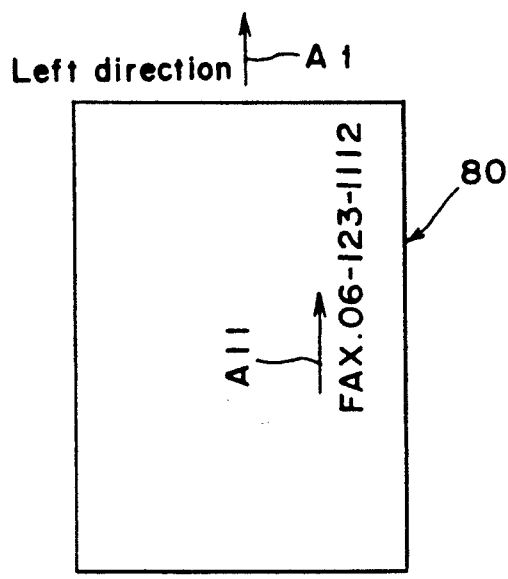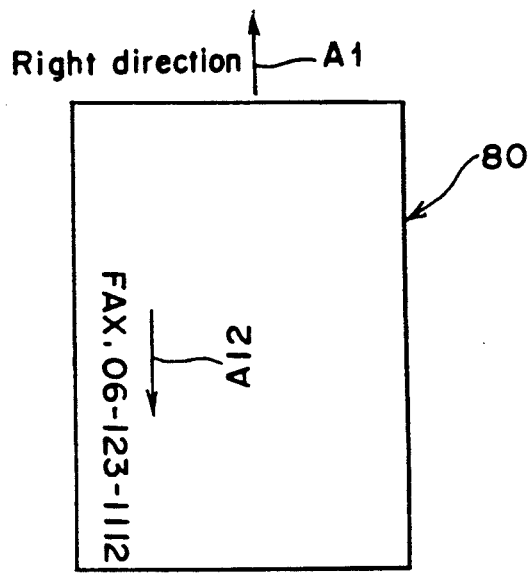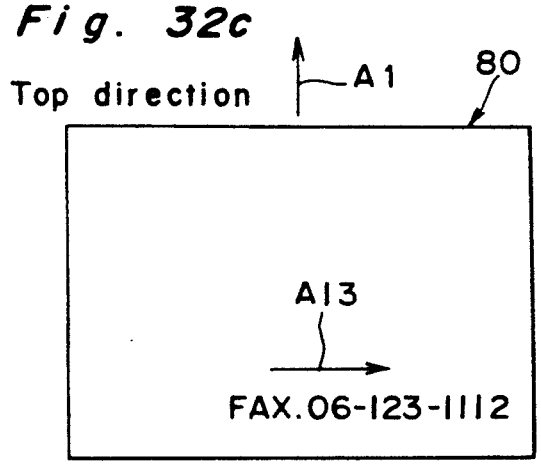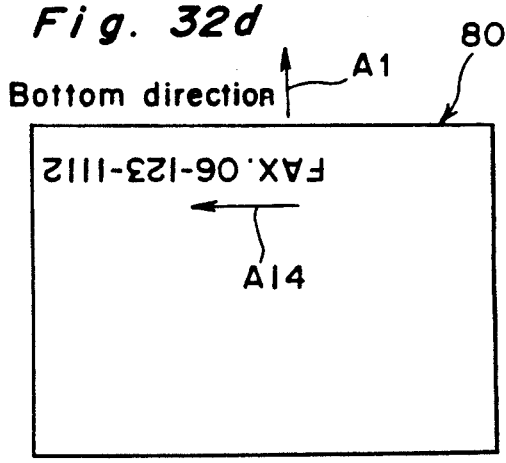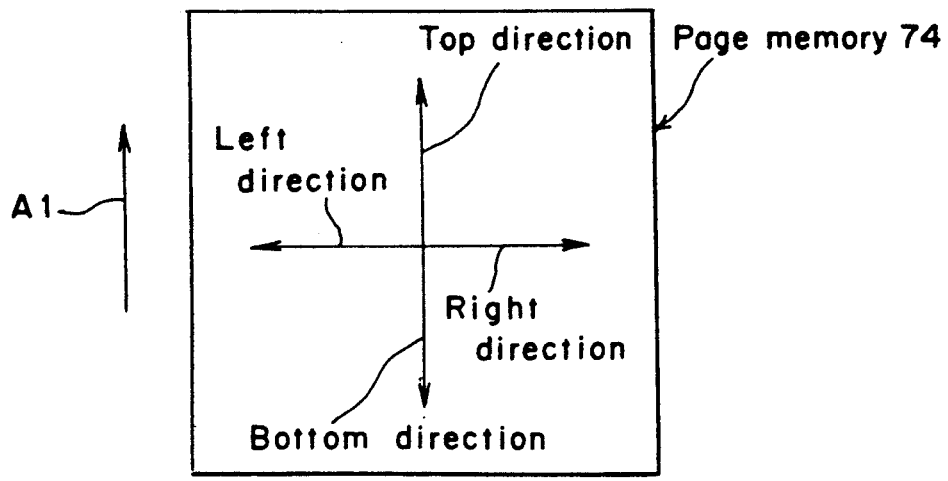

```
Belonging to

Name

Company's name
    Head office  Address
        TEL.     03-123-4567
        FAX. GIII 03-123-1111
    Osaka Branch office  Address
        TEL.     06-123-4567
        FAX. GIII 06-123-2222
             GIV  06-123-3333
```

Please select one of the following FAX. No.

1 : 03-123-1111

2 : 06-123-3333

FACSIMILE APPARATUS COMPRISING A ONE-TOUCH DIAL FUNCTION

This application is a continuation of application Ser. No. 07/567,143, filed Aug. 14, 1990.

BACKGROUND OF THE INVENTION

1. Field of the Invention

The present invention relates to a facsimile apparatus, and more particularly, to a facsimile apparatus comprising a one-touch dial function.

2. Description of the Related Art

Conventionally, a facsimile apparatus comprising a one-touch dial function has been put into practical use. In the conventional facsimile apparatus of this type, there are provided plural one-touch dial keys on an operation panel, and telephone numbers of facsimile apparatuses (referred to as facsimile numbers hereinafter) are stored in a RAM so as to correspond to respective one-touch dial keys. Further, upon transmitting image data of a document, a facsimile number of a destination corresponding to pressed one of above-mentioned one-touch dial keys is automatically read out from the RAM, the read facsimile number is dialed through a telephone line, and there is performed a telephone line connection process for connecting the present facsimile apparatus with a receiving facsimile apparatus of a destination through the telephone line. Thereafter, the image data of the document are transmitted thereto.

Upon transmitting image data to the destination of the prestored facsimile number, the image data can be transmitted through the telephone line to the destination to which the image data are to be transmitted only by pressing the one-touch dial key corresponding thereto, and it is not necessary to input the facsimile number of the destination using a set of ten keys. Further, the facsimile number of the destination can be prevented from being inputted by mistake by the operator.

Further, there has been also proposed a facsimile apparatus capable of storing data corresponding to the one-touch dial keys in a RAM of an IC card. In the RAM of the IC card, there are stored names of destinations and facsimile numbers thereof. Generally, since the memory capacity of the RAM of the IC card is larger than the capacity of data corresponding to all the one-touch dial keys, data to be stored in the RAM of the IC card are divided into the same number of address groups as the number of the one-touch dial keys.

In the case of specifying a destination, first of all, one of the address groups is specified using the one-touch dial key after mounting the IC card into the facsimile apparatus, and then, a destination of the specified address group is specified using the one-touch dial key. Then, the facsimile number of the destination is specified, and the facsimile apparatus dials the specified facsimile number through a telephone line.

When the IC card is mounted into the facsimile apparatus, data stored in the RAM of the main body or data stored in the RAM of the IC card correspond to respective one-touch dial keys, and these data can be used in order to transmit image data by the one-touch operation.

In the case of using the above-mentioned one-touch dial function, labels on which names of destinations etc. are hand-written by the operator may be often stuck under respective one-touch dial keys on the operation panel, in order to easily see the name of the destination corresponding to each one-touch dial key upon using the facsimile apparatus. Upon transmitting image data, the operator can see the name of the destination corresponding to each one-touch dial key, easily, by looking at these labels stuck on the operation panel, and the performance of the operation of the one-touch dial function can be further improved.

However, it is difficult for the operator to write the names of the destinations with small size of characters on a piece of paper or label so as to stick it under each one-touch dial key. Further, when data corresponding to the one-touch dial keys are changed or updated, there is such a problem that it is necessary to rewrite the names of the destinations.

Similarly, in the case of using the one-touch dial function after inserting the IC card into the facsimile apparatus, it is necessary to stick on the IC card, for example, a piece of paper or label on which data corresponding to respective one-touch dial keys are written, in order that the operator can see the names of the destinations, easily. However, it is difficult for the operator to write the names of the destinations with small size of characters on a piece of paper or label so as to stick it on the IC card, similarly to the case of sticking it on the operation panel.

Further, it is desirable to provide a facsimile apparatus comprising both of a first print means for printing data stored in the RAM of the IC card corresponding to respective one-touch dial keys such as names of destinations and facsimile numbers thereof on a piece of paper or label in a format suitable for sticking it on the IC card, and a second print means for printing data stored in the RAM of the main body corresponding to each one-touch dial key such as a name of a destinations and a facsimile number thereof on a piece of paper or label in a format suitable for sticking it under each one-touch dial key on the operation panel. Upon printing above-mentioned data, it is supposed that it is necessary for the operator to selected one of the first print means and the second print means. In this case, if the selection of the RAM of the main body or the RAM of the IC card is in common to both of the one-touch function and the above-mentioned print function, it is supposed that the performance of the operation can be further improved.

SUMMARY OF THE INVENTION

An essential object of the present invention is to provide a facsimile apparatus comprising a one-touch dial function, which is capable of automatically printing data corresponding to respective one-touch dial keys such as names of destinations and facsimile numbers thereof on a piece of paper or label so as to stick it under each one-touch dial key on the operation panel or on the IC card.

Another object of the present invention is to provide a facsimile apparatus comprising a print function capable of data stored in the RAM of the main body and the RAM of the IC card corresponding to respective one-touch dial keys on a piece of paper or label in a format suitable for sticking it under each one-touch dial key on the operation panel and on the IC card by the improved performance of the operation.

In order to accomplish the above objects, according to one aspect of the present invention, there is provided a facsimile apparatus comprising:

input means including plural keys arranged on an operation panel;

storage means for storing data of destinations and facsimile numbers thereof so as to correspond to respective keys of said input means;

line connection means for dialing through a communication line said facsimile number stored in said storage means corresponding to pressed one of said plural keys of said input means when one of said plural keys of said input means is pressed; and print means for reading said data stored in said storage means and printing said read data on a piece of paper or label in a format suitable for sticking it in the vicinity of each of said plural keys of said input means on said operation panel.

According to another aspect of the present invention, there is provided a facsimile apparatus comprising:

input means including plural keys arranged on an operation panel;

an IC card including storage means for storing data of destinations and facsimile numbers thereof so as to correspond to respective keys of said input means;

line connection means for dialing through a communication line said facsimile number stored in said storage means of said IC card corresponding to pressed one of said plural keys of said input means when one of said plural keys of said input means is pressed; and print means for reading said data stored in said storage means of said IC card and printing said read data on a piece of paper or label in a format suitable for sticking it on said IC card.

According to a further aspect of the present invention, there is provided a facsimile apparatus comprising:

input means including plural keys arranged on an operation panel;

first storage means for storing data of destinations and facsimile numbers thereof so as to correspond to respective keys of said input means;

an IC card including second storage means for storing data of destinations and facsimile numbers thereof so as to correspond to respective keys of said input means;

first selection means for selecting either data stored in said first storage means or data stored in said second storage means as data to be printed;

first print means for reading said data stored in said first storage means and printing said read data on a piece of paper or label in a format suitable for sticking it in the vicinity of each of said plural keys of said input means on said operation panel;

second print means for reading said data stored in said second storage means and printing said read data on a piece of paper or label in a format suitable for sticking it on said IC card; and second selection means for selecting said first print means and enabling said first print means when said data stored in said first storage means are selected by said first selection means, and for selecting said second print means and enabling said second print means when said data stored in said second storage means are selected by said first selection means.

BRIEF DESCRIPTION OF THE DRAWINGS

These and other objects and features of the present invention will become clear from the following description taken in conjunction with the preferred embodiment thereof with reference to the accompanying drawings, in which:

FIG. 2 is a front view of an operation panel of the facsimile apparatus shown in FIG. 1;

FIGS. 3a to 3z and 3aa are front views of messages displayed on a liquid crystal display of the operation panel shown in FIG. 2;

FIG. 6a is a front view of facsimile number labels showing a print format thereof upon printing destinations and facsimile numbers thereof for one-touch dial keys;

FIG. 6b is a front view of one-touch dial keys of the operation panel shown in FIG. 2;

FIG. 6c is an enlarged front view of the facsimile number labels to be stuck under respective one-touch dial keys shown in FIG. 6b;

FIG. 7a is a front view of a facsimile number label showing a print format thereof upon printing destinations for an IC card;

FIG. 7b is a front view of an IC card;

FIG. 7c is an enlarged front view of the facsimile number label to be stuck on the IC card shown in FIG. 7b;

FIG. 8a shows one example of registration data comprised of a destination and a facsimile number thereof to be stored in a RAM of the facsimile apparatus;

FIG. 8b shows character code of the registration data shown in FIG. 8a;

FIG. 10a shows one example of another font;

FIG. 10b shows font data of the font shown in FIG. 10a to be stored in a second Chinese character ROM shown in FIG. 4;

FIG. 15 is a flowchart showing a transmission check process of a subroutine executed by the communication control CPU shown in FIG. 4;

FIG. 16 is a flowchart showing a receipt check process of a subroutine executed by the communication control CPU shown in FIG. 4;

FIG. 21 is a flowchart showing a print control process of a subroutine executed by the communication control CPU shown in FIG. 4;

FIGS. 22a to 22g are flowcharts showing a key input process of a subroutine executed by the communication control CPU shown in FIG. 4;

FIGS. 23a to 23c are flowcharts showing a calling card reading process of a subroutine executed by the communication control CPU shown in FIG. 4;

FIG. 31 is a flowchart showing a one character search process of a subroutine executed by the optical character reader character recognition section shown in FIG. 4;

FIGS. 32a to 32d are top plan views showing a relationship between a calling card and an insertion direction thereof into a reading section of the facsimile apparatus shown in FIG. 1;

FIG. 32e is a diagram showing directions of coordinates of a page memory shown in FIG. 4;

FIG. 33a is a front view of another example of a calling card on which facsimile numbers are printed; and FIG. 33b is a front view of a message displayed on the liquid crystal display of the operation panel shown in FIG. 2.

DETAILED DESCRIPTION OF THE PREFERRED EMBODIMENT

A facsimile apparatus of a preferred embodiment according to the present invention will be described below in an order of the following items with reference to the attached drawings.

(a) Composition of Facsimile apparatus
(b) Operation panel
(c) Composition of Facsimile control system
(d) Reading facsimile number printed on Calling card
  (d-1) Optical character recognition
  (d-2) Selecting one of plural facsimile numbers
  (d-3) Selecting one of plural facsimile groups
  (d-4) Registering read facsimile number
(e) One-touch dial function and Number print function
(f) Control flow of Communication control CPU
  (f-1) Main routine
  (f-2) Timer interruption process
  (f-3) Print check process
  (f-4) Reading check process
  (f-5) Transmission check process
  (f-6) Receipt check process
  (f-7) Calling card reading check process
  (f-8) Transmission process
  (f-9) Receipt process
  (f-10) Reading process
  (f-11) Print control process
  (f-12) Key input process
  (f-13) Calling card reading process
  (f-14) Number print process
  (f-15) Calling card number registration process
(g) Control flow of Optical character reader character recognition section
  (g-1) Main routine
  (g-2) Direction judgement process
  (g-3) Character recognition process
  (g-4) FAX search process
  (g-5) facsimile number search process
  (g-6) One character search process
(h) Other modifications

(a) Composition of Facsimile apparatus

Figure 1:
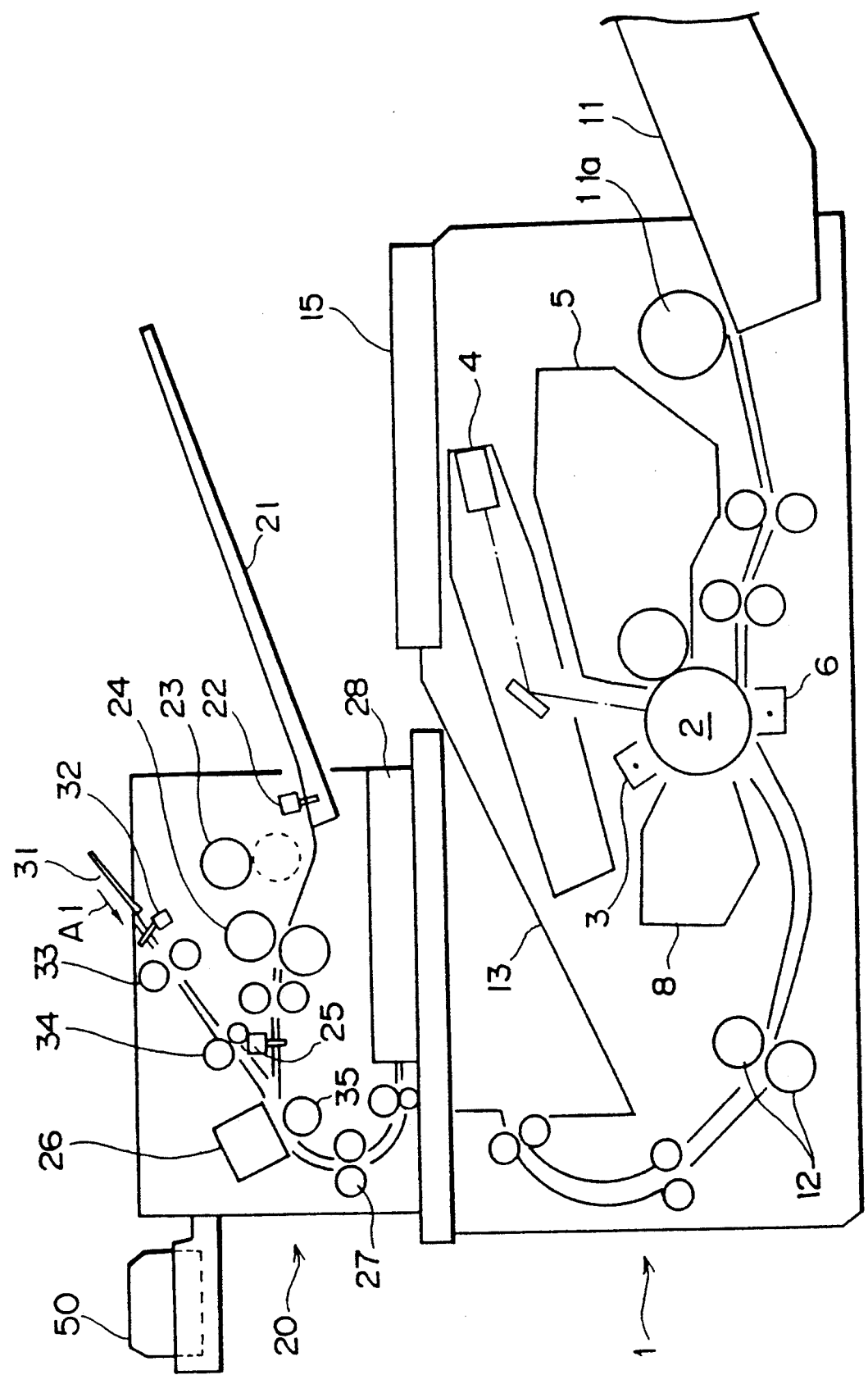
FIG. 1 is a schematic cross sectional view showing a composition of a facsimile apparatus of a preferred embodiment according to the present invention.

FIG. 1 is a schematic cross sectional view showing a composition of a facsimile apparatus of a preferred embodiment according to the present invention.

Referring to FIG. 1, the facsimile apparatus of the present preferred embodiment comprises a printer section 1, an image reading section 20 arranged on the printer section 1, an operation panel 15 arranged on the printer section 1, and a handset 50 arranged in the side portion of the image reading section 20.

The printer section 1 is an electrophotographic laser printer, and the action thereof will be described below, briefly.

First of all, a photoconductive surface of a rotated photoconductive drum 2 is electrically charged uniformly by a corona charger 3. Next, a beam of laser light is projected according to image data onto the photoconductive surface of the photoconductive drum 2 by an optical system 4 so as to form an electrostatic latent image thereon, and then, the electrostatic latent image is developed using toner by a developing unit 5 so as to form a visible toner image on the photoconductive drum 2.

On the other hand, plural pieces of copying papers are set on a paper feeding cassette 11, and a piece of copying paper is fed one by one onto the photoconductive drum 2 by a pick-up roller 11a. The visible toner image formed on the photoconductive drum 2 is transferred onto a piece of copying paper by a transfer charger 6, and is fixed thereon by a fixing unit 12. Thereafter, the copying paper is discharged onto a paper discharge tray 13. The toner which has not adhered on the copying paper is collected by a blade type toner cleaner 8, and then, the print process for printing an image on a piece of copying paper is completed.

Next, the action of the image reading section 20 will be described below. The reading process for reading an image of a document (referred to as a document image hereinafter) is performed in a manner similar to a conventional manner which is well known to those skilled in the art.

Namely, plural documents are set on a document tray 21, and the documents are detected by a document detection sensor 22. The document is fed one by one into the position of a document feeding sensor 25 by document feeding rollers 23 and 24. The document image is read by a contact type CCD linear image sensor 26 in synchronous with the rotation of the roller 24 rotated by a motor (not shown) and the reading process of the CCD linear image sensor 26, and then, the document image is converted into digital image data. After the reading process is completed, the document is discharged onto a document discharge tray 28 by a document discharge roller 27. It is to be noted that, in the present preferred embodiment, the rollers 24 and 27 are driven by the same motor (not shown), and the document is discharged upon reading the next document image.

Figure 4:
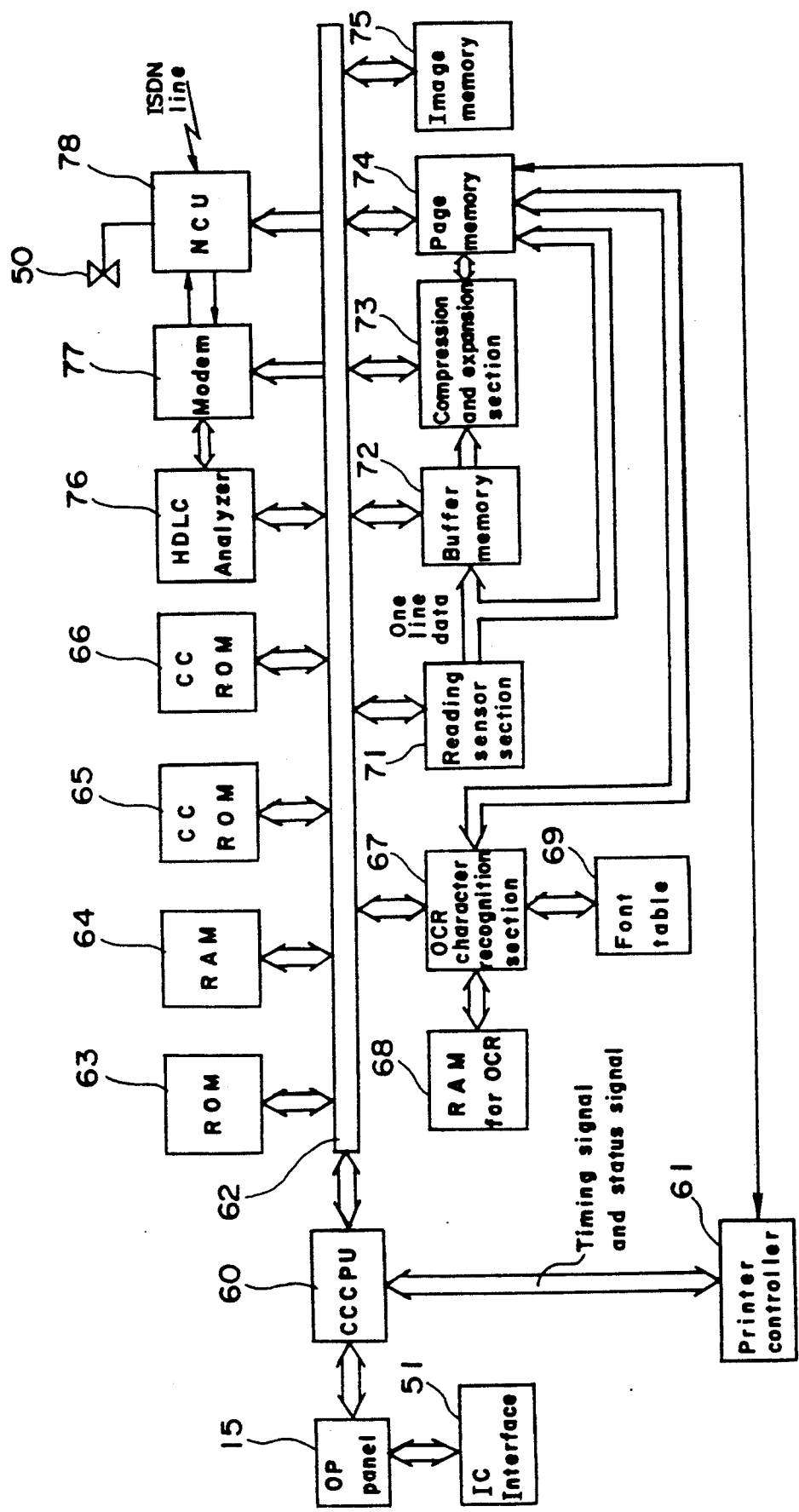
FIG. 4 is a block diagram showing a facsimile control system of the facsimile apparatus shown in FIG. 1.

The image section 20 is characterized in that the image section 20 comprises a calling card tray 31 for setting a calling card thereon, and a facsimile number printed on the calling card which is set on the calling card tray 31 is read by an OCR character recognition section 67 shown in FIG. 4. Namely, when the calling card set on the calling card tray 31 is detected by a calling card detection sensor 32, the calling card is fed into the contact type CCD linear image sensor 26 in an insertion direction indicated by an arrow A1 by calling card feeding rollers 33 and 34. The image printed on the calling card is read by the CCD linear image sensor 26 in a manner similar to that of reading the document image, and then, the image of the calling card is converted into digital image data. After the reading process for reading the image of the calling card is completed, the calling card is returned onto the calling card tray 31 in a direction opposite to the calling card feeding direction, namely, in a direction opposite to the insertion direction A1. It is to be noted that the calling card is returned onto the calling card tray 31 in the opposite direction since it is difficult to use a paper discharge system including the rollers 27 and 35 in order to discharge the calling card because of a difference between the qualities of the document and the calling card. Further, there is such an advantage that the documents and the calling card are not mixed on the document discharge tray 28.

Another feature of the facsimile apparatus of the present preferred embodiment is that the same CCD linear image sensor is used in common in order to read the document image and to read the image of the calling card. If the document image and the image of the calling card are read by separate image sensors, respectively, there is such a problem that there must provide a larger space in order to arrange the separate image sensors and the manufacturing cost of the facsimile apparatus increases. Therefore, the transportation system for feeding and discharging the document and another transportation system for feeding and discharging the calling card are provided, separately, since there is a difference between the qualities of the document and the calling card. However, the CCD linear image sensor 26 is used in common in order to reading the document image and to reading the image of the calling card.

Since the processes are performed sequentially in an order of the process for reading the image of the calling card, the process for searching and recognizing the facsimile number, and the process for reading the document image and the process for feeding the document into the CCD linear image sensor 26 is performed about simultaneously with the start of discharging the calling card, there is almost no difference in the processing time between the case of the present preferred embodiment and the case of providing separate image sensors.

Figure 17:
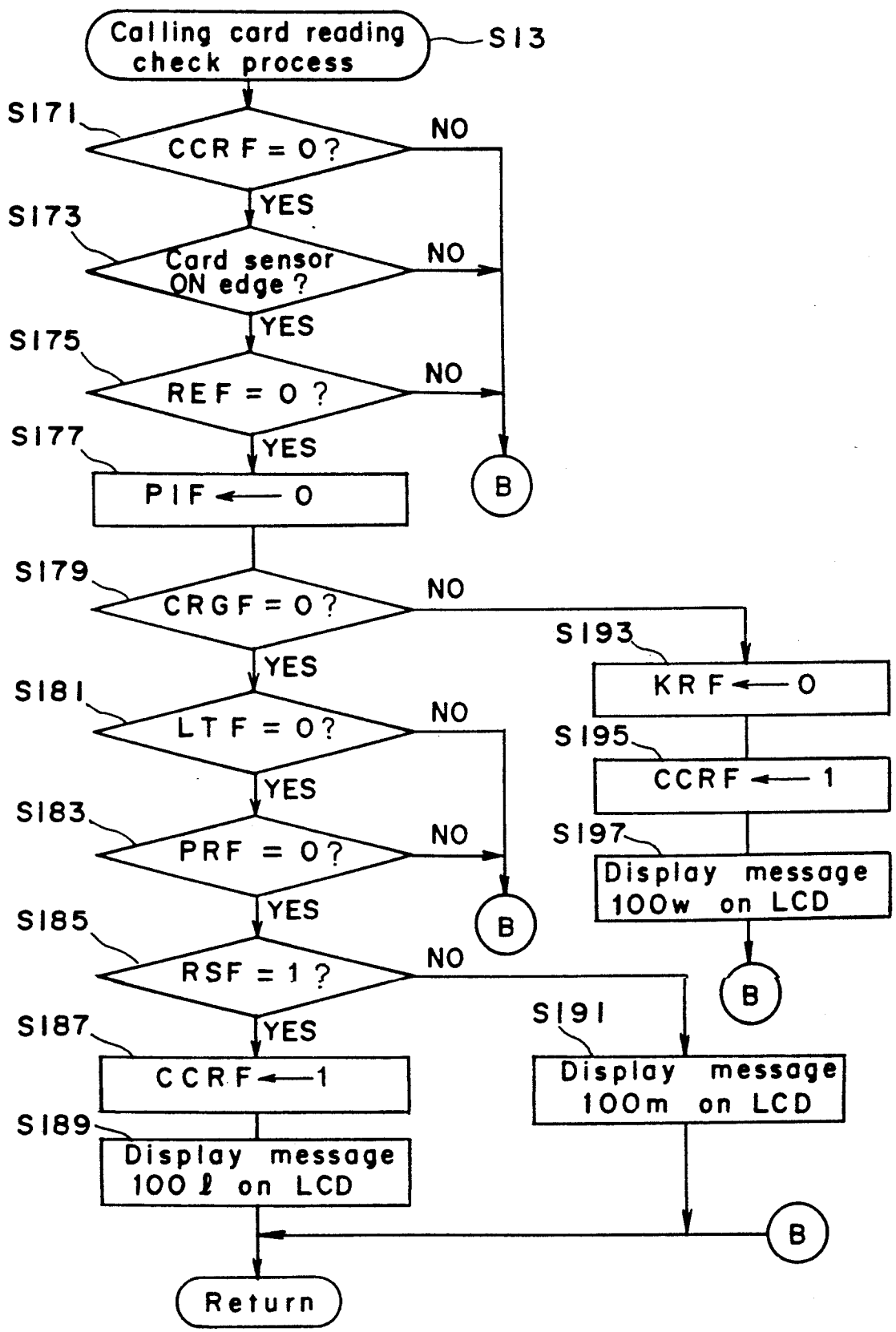
FIG. 17 is a flowchart showing a calling card reading check process of a subroutine executed by the communication control CPU shown in FIG. 4.
Figure 23A:
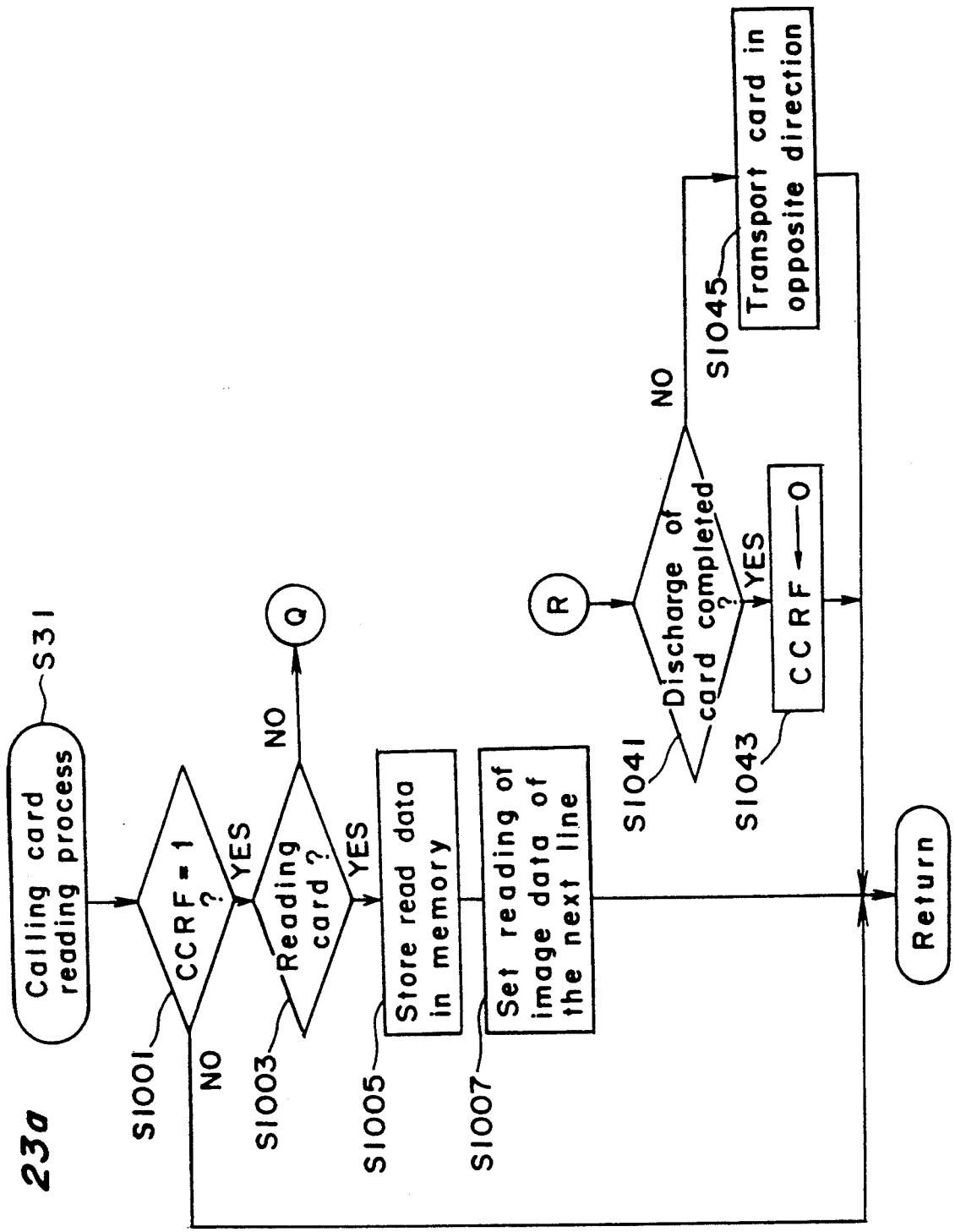
Figure 23C:
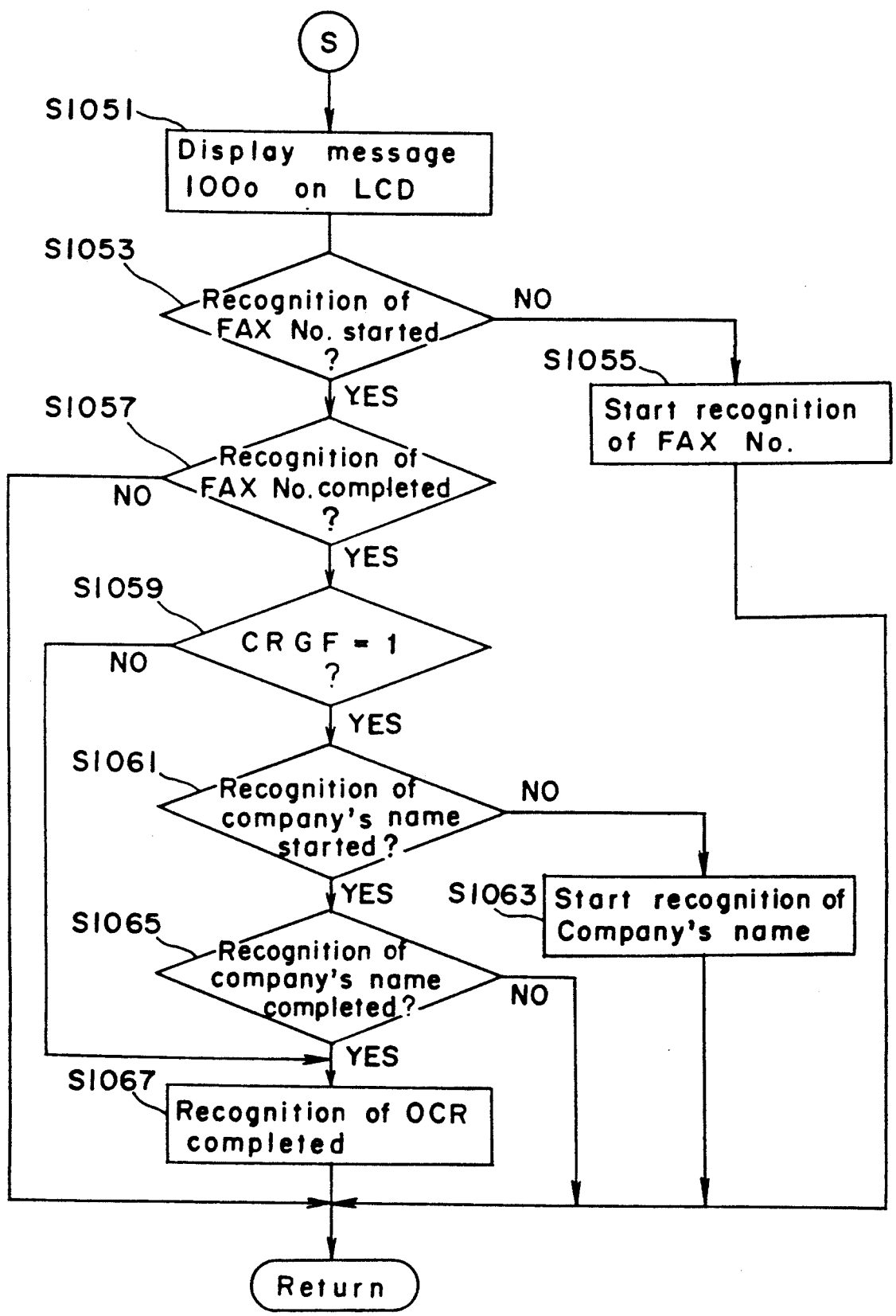

Since the process for reading the image of the calling card can not be performed simultaneously with the process for reading the document image, a calling card reading flag CCRF is set at one only when the document image is not read or a reading flag REF is zero, as shown in FIG. 17, and then, a calling card reading process shown in FIGS. 23a to 23c is executed.

The handset 28 is connected through a network control unit 78 to an ISDN line. The operation panel 15 is provided for setting respective actions of the facsimile apparatus and for displaying the state of the actions thereof.

It is to be noted that the printer section 1 and the image reading section 20 may be provided, separately.

(b) Operation panel

FIG. 2 is a front view of an operation panel 15 of the facsimile apparatus shown in FIG. 1.

Referring to FIG. 2, on the operation panel 15, there are provided a set of ten keys 40 for the telephone, a liquid crystal display (referred to as an LCD hereinafter) 41, one-touch dial keys 42, a transmission key 43, a calling card registration key 45, a number print key 46, a registration key 47, a Japanese kana character and Chinese character (referred to as a KCC hereinafter) key (referred to as a KCC key hereinafter) 48, and an IC card load key 49, and also an IC card interface unit 51 is provided in the operation panel 15.

A set of ten keys 40 is provided for setting a facsimile number or a telephone number of a destination. The LCD 41 is provided for displaying messages such as messages shown in FIGS. 3a to 3z and 3aa in order to inform the operator about the states of the actions of the facsimile apparatus or to instruct and warn the operator.

The one-touch dial keys 42 are provided for storing data of facsimile numbers of destinations corresponding thereto in a RAM 64 and for transmitting image data into the corresponding destination by the so-called one-touch operation. It is to be noted that, in the RAM 64, there are stored facsimile numbers of destinations corresponding to the one-touch dial keys 42, and the destination's names. The one-touch dial keys 42 is also provided for a one-touch transmission operation for dialing facsimile numbers stored in an IC card 52, and for registering a facsimile number printed on the calling card which has been read by the OCR character recognition section 67. In the present preferred embodiment, the contents of the one-touch dial keys 42 are switched over upon inserting the IC card 53 into the IC card interface unit 51.

Further, the transmission key 43 is provided for instructing the facsimile apparatus to start a transmission of image data. The calling card registration key 45 is provided for registering a facsimile number printed on the calling card which has been read. The number print key 46 is provided for printing facsimile numbers of destinations corresponding to respective one-touch dial keys 42 on a piece of paper, label or the like. The registration key 47 is provided for selecting one of a registration mode and a non-registration mode.

Furthermore, the KCC key 48 is provided for selecting one of a KCC mode and a non-KCC mode. When the KCC mode is set, the Japanese kana character or the Chinese character is inputted upon registering a destination's name and a facsimile number thereof. On the other hand, the non-KCC mode is set, the alphabet or the number is inputted upon registering a destination's name and a facsimile number thereof.

The IC card load key 49 is provided for selecting one of plural address groups stored in the IC card 52 to be loaded. The IC card interface unit 51 is provided for electrically connecting the IC card 52 to the facsimile apparatus upon inserting the IC card 52 into the IC card interface unit 51, and there is formed a circular arc-shaped entrance in the IC card interface unit 51, in order to insert the IC card 52 thereinto, easily. The IC card 52 comprises a RAM for storing destination's names and facsimile numbers thereof.

Composition of Facsimile control system

FIG. 4 is a block diagram showing a facsimile control system of the facsimile apparatus shown in FIG. 1.

Referring to FIG. 4, the facsimile control system mainly comprises a communication control CPU (referred to as a CCCPU hereinafter) 60, the operation panel 15, and a printer controller 61. The CCCPU 60 is electrically connected to the operation panel 15, and further, through timing signals lines and status signal lines to the printer controller 61. The IC card interface unit 51 is electrically connected to the operation panel 15.

The CCCPU 60 is electrically connected through a bus 62 to peripheral units 63 to 67 and 71 to 78. A ROM 63 is provided for storing a system program of the CCCPU 60 for controlling the facsimile apparatus, and the RAM 64 is provided for being used as a working area and for storing data and flags necessary for executing the system program stored in the ROM 63.

In the RAM 64, there are stored the following flags:
CCRF: a calling card reading flag,
COMF: a compression flag,
CRF: a calling card read flag,
CRGF: a calling card registration flag,
CVF: an IC card validation flag,
EXPF: an expansion flag,
IRF: an image received flag,
IRSF: an image receipt start flag,
ITF: an image transmitted flag,
KCCF: a KCC mode flag,
KRF: a key registration flag,
LRF: a line receipt flag,
LTF: a line transmission flag,
NPF: a number print flag,
PIF: a plural number inputted flag,
PNF: a plural number flag,
PRF: a print flag,
PSF: a print start flag,
RCF: a receipt connected flag,
REF: a reading flag,
REGF: a registration flag,
RSF: a reading start flag,
TCF: a transmission connected flag, and
TDF: a transmission disconnected flag.

First and second Chinese character ROMs (referred to as first and second CCROMs hereinafter) 65 and 66 are provided for storing different types fonts, respectively, each of which including fonts of the Japanese kana characters, the Chinese characters, the alphabets and the numerals. These fonts are used upon displaying messages on the LCD 41, for adding additional information such as present time, a sender, onto a document image, and for printing the contents of the one-touch dial keys 42 on a piece of paper, label or the like. There is used only one of two kinds of first and second CCROMs 65 and 66, corresponding to a printing mode upon printing the contents of the one-touch dial keys 42.

The OCR character recognition section 67 is provided for the optical character recognition of characters printed on the calling card which have been read by the reading sensor section 71, and is electrically connected to a RAM 68 for the OCR and a font table 69. The RAM 68 for the OCR is provided for storing font data used upon the character recognition of the OCR character recognition section 67. It is to be noted that the OCR character recognition section 67 is electrically connected to the page memory 74.

As units for performing a facsimile communication process, there are provided the reading sensor section 71, a buffer memory 72, a compression and expansion section 73, a page memory 74, an image memory 75, an HDLC analyzer 76, a modem 77 including a digital modulator and a digital demodulator, and the network control unit (referred to as an NCU hereinafter) 78. The reading sensor section 71 is electrically connected to the buffer memory 72 and the page memory 74. The buffer memory 72 is electrically connected to the compression and expansion section 73, and the compression and expansion section 73 is electrically connected to the page memory 74. Further, the page memory 74 is electrically connected to the printer controller 61.

The general action of the facsimile apparatus will be described below with reference to FIGS. 1 and 4.

First of all, the action of the transmission process of the facsimile apparatus will be described below.

When a document is set on the document tray 21, the document is detected by the document detection sensor 22 of the reading sensor section 71, and the information thereof is transmitted to the CCCPU 60. The CCCPU 60 instructs the LCD 41 of the operation panel 15 to display the message 100a shown in FIG. 3a for requesting to input a facsimile number. When a facsimile number is inputted using a set of ten keys 40, the reading sensor section 71 reads the document image one line by one line in synchronous with the rotation of the motors thereof and the action of the CCD linear image sensor 26, and converts the document image of one line into image data of one line. Then, the image data are sent to the buffer memory 72. The image data stored in the buffer memory 72 are compressed by the compression and expansion section 73, and the compressed image data are stored in the image memory 75.

After the above-mentioned reading process is completed, the CCCPU 60 instructs the NCU 78 to perform the line connection process for connecting to a receiving facsimile apparatus of a destination through the ISDN line according to the predetermined protocol. Then, the NCU 78 dials the facsimile number of the destination through the ISDN line so as to call the receiving facsimile apparatus thereof. After the NCU 78 is connected through the ISDN line to the receiving facsimile apparatus of the destination, in order to compress the image data depending on the facsimile group of the receiving facsimile apparatus of the destination such as G3, G4 (recommended by the CCITT), the compressed image data stored in the image memory 75 are sent to the compression and expansion section 73, and are expanded so as to become the original image data. Then, the expanded original image data are stored in the page memory 74. Thereafter, after an automatic reduction process is performed for the original image data stored in the page memory 74 depending on a print size of the receiving facsimile apparatus, the image data are compressed depending on the decoding method of the receiving facsimile apparatus by the compression and expansion section 73. Then, the compressed image data are stored in another area of the image memory 75, again. The expansion and compression processes are performed by a unit of one block comprised of several lines, alternately.

After the image data compressed depending on the facsimile group of the receiving facsimile apparatus are processed according to the HDLC specification by the HDLC analyzer 76, a carrier signal is modulated according to the processed image data by the modem 77, and the modulated carrier signal (referred to as an image signal hereinafter) including the image data is sent to the receiving facsimile apparatus through the NCU 78 and the ISDN line. After the image signal with respect to all the image data of the read document image has been sent thereto, the NCU 78 performs the line disconnection process so as to disconnect the ISDN line to the receiving facsimile apparatus, and then, the transmission process is completed.

Next, the action of the receipt process will be described below.

When the facsimile apparatus receives an incoming telephone call from a transmitting facsimile apparatus through the ISDN line, the NCU 78 performs the line connection process according to the predetermined protocol. After the line connection process is completed, an image signal transmitted from the transmitting facsimile apparatus is inputted to the modem 77 through the ISDN line and the NCU 78, and then, the image signal is demodulated by the modem 77 so as to be converted into image data. Then, the image data are sent to the HDLC analyzer 76, and are converted into compressed image data. The compressed image data are stored in the image memory 75. After the receipt of the image signal with respect to all the image data is completed, the NCU 78 performs the line disconnection process to the transmitting facsimile apparatus according to the predetermined protocol. After the line disconnection process is completed, the image data stored in the image memory 75 are sent to the compression and expansion section 73, and then, and are expanded. Thereafter, the expand image data are stored in the page memory 74.

Then, the printer controller 61 is started by the CCCPU 60, and further, the image data start to be transferred from the page memory 74 to the printer controller 61, and the printer controller 61 makes the printer section 1 print an image of the transferred image on a piece of copying paper. At that time, after the expansion process for one page is completed, the expansion process is stopped until the image data of one page have been transferred from the page memory 74 to the printer controller 61, since the page memory 74 has only a storage area of one page and it is necessary to prevent the expanded image data from being written in the page memory so that another image data are overlapped thereon.

When the print process for all the compressed image data thus is completed, the receipt process is completed.

The OCR character recognition section 67 searches predetermined characters and recognizes characters of the image such as the facsimile number printed on the calling card by utilizing the optical character recognition technique, as described later.

Since the action of the printer controller 61 is similar to that of a conventional electrophotographic laser printer, the action thereof is omitted in this specification.

(d) Reading facsimile number printed on Calling card

When the calling card is set on the calling card tray 31, a calling card reading process is executed, as shown in FIGS. 23a to 23c. In the calling card reading process, after the calling card set on the calling card tray 31 is detected by the calling card detection sensor 32, the calling card is fed into the CCD linear image sensor 26. Thereafter, an image printed on the calling card is read by the CCD linear image sensor 26, and then, the read image is converted into image data. Then, the image data are stored in the page memory 74 (See steps S1001 to S1007 of FIG. 23a). As soon as the image data are stored in the page memory 74, the character recognition process for the image data is executed using the RAM 68 for the OCR and the font table 69 by the OCR character recognition section 67 so that the image data are converted into position information and character code information (See the flowcharts shown in FIGS. 26 to 29, 30a, 30b and 31).

(d-1) Optical character recognition

Generally, one or more facsimile numbers are printed a calling card. In the present preferred embodiment, an image printed on the calling card which has been set on the calling card tray 31 is read and is converted into the image data. Thereafter, one or more facsimile numbers are searched and recognized from the image data using the OCR technique, and the recognized facsimile number is dialed.

At present, the recognition rate of the OCR technique with respect to the printed alphabets and numerals is at a stage of practical use stage, namely, is relatively high. In the calling card reading process, the recognition process can be simplified by taking the feature of the characters printed on the calling card to be read into considerations.

Figure 5A:
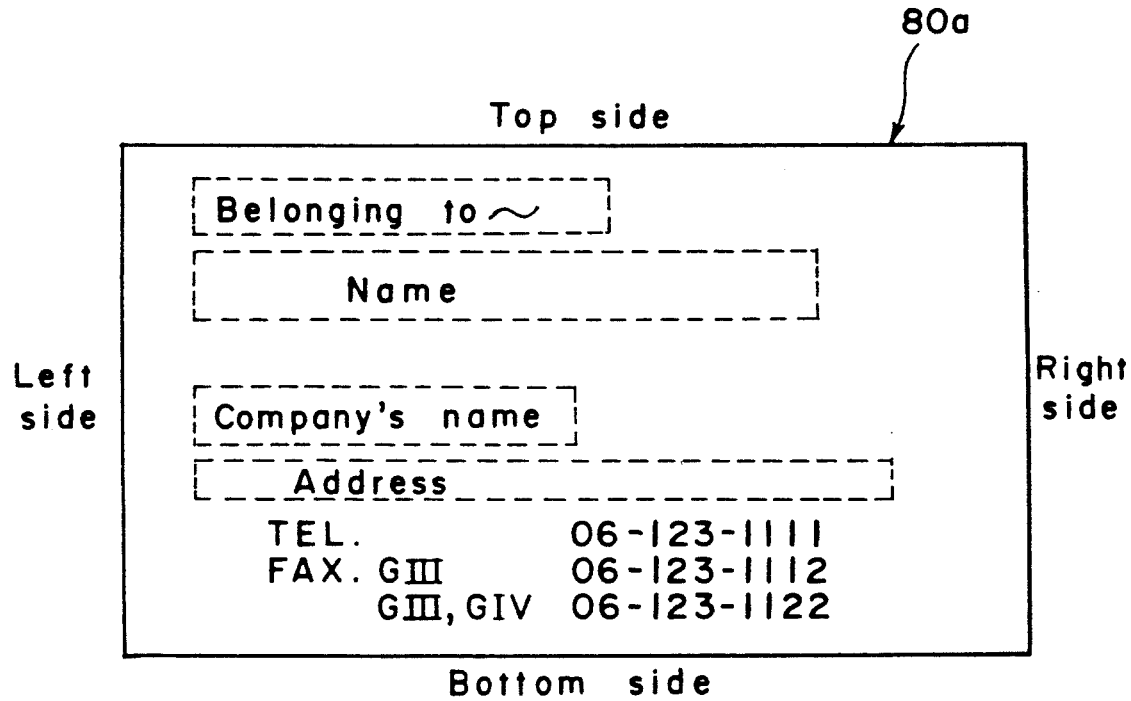
FIGS. 5a and 5b are front views of examples of calling cards on each of which facsimile numbers are printed.
Figure 5B:
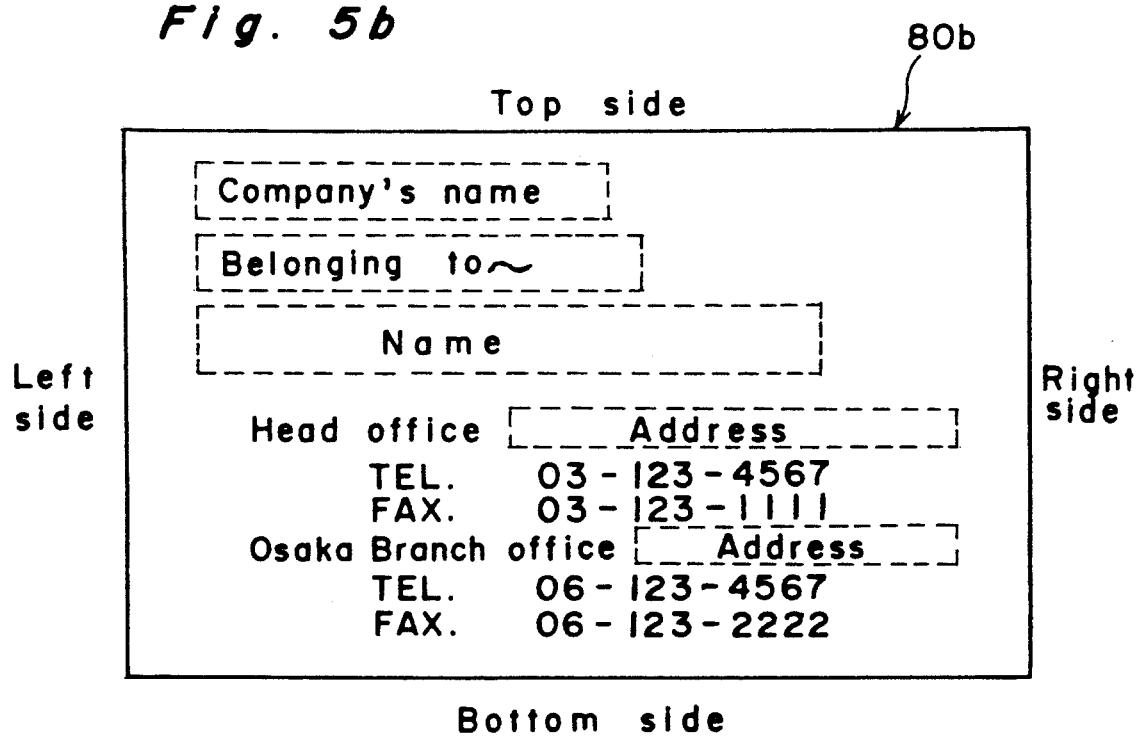

FIGS. 5a and 5b show examples of general forms of calling cards 80a and 80b.

As shown in FIGS. 5a and 5b, one or more facsimile numbers comprises of Arabic numerals or Chinese character numerals (only in the case of Japanese calling cards) are printed on the right side and/or the right under side of a character train representing the facsimile or the facsimile number such as "FAX", "Fax", "fax", "FACSIMILE", "Facsimile", "facsimile", "TELEFAX", "Telefax", "telefax". Further, the facsimile group of the facsimile apparatus recommended by the CCITT or the code thereof such as "GIII", "GIII", "GIV", "G3", "G4", "Group 3", "Group 4" may be printed between the above-mentioned character train representing the facsimile or the facsimile number and the facsimile number. Generally, the above-mentioned character train representing the facsimile or the facsimile number, the facsimile group and the facsimile number are printed using the same font, and also the sizes of the fonts used upon printing facsimile numbers on calling cards are fallen in a predetermined range.

FIGS. 32a to 32d show the insertion directions of the calling card 80 into the facsimile apparatus, and FIG. 32e shows coordinates of a bit map of the page memory 74 and directions thereof when an image printed on the calling card 80 is stored in the page memory 74.

As shown in FIGS. 32a to 32d, there are four cases with respect to the insertion directions of the calling card 80. Further, as shown in FIG. 32e, the insertion direction indicated by the arrow A1 of the calling card 80 is parallel to top and bottom directions of the coordinates of the page memory 74, and is directed in the top direction thereof.

Namely, as shown in FIG. 32a, when the calling card 80 is set on the calling card tray 31 so that the left side of the calling card 80 is directed to the insertion hole of the facsimile apparatus and the insertion direction indicated by the arrow A1 is parallel to a printed direction of characters printed on the calling card 80 indicated by an arrow A11, the insertion direction of the calling card 80 is referred to as a left direction hereinafter. Further, since the top side of each character printed on the calling card is directed to the left direction of the coordinates of the page memory 74 as shown in FIGS. 32a and 32e, the direction of each printed character is referred to as a left direction hereinafter.

As shown in FIG. 32b, when the calling card 80 is set on the calling card tray 31 so that the right side of the calling card 80 is directed to the insertion hole of the facsimile apparatus and the insertion direction indicated by the arrow A1 is opposite to a printed direction of characters printed on the calling card 80 indicated by an arrow A12, the insertion direction of the calling card 80 is referred to as a right direction hereinafter. Further, since the top side of each character printed on the calling card is directed to the right direction of the coordinates of the page memory 74 as shown in FIGS. 32b and 32e, the direction of each printed character is referred to as a right direction hereinafter.

As shown in FIG. 32c, when the calling card 80 is set on the calling card tray 31 so that the top side of the calling card 80 is directed to the insertion hole of the facsimile apparatus and the insertion direction indicated by the arrow A1 is perpendicular to a printed direction of characters printed on the calling card 80 indicated by an arrow A13 so that the printed direction is a direction obtained when the insertion direction is rotated in the clockwise direction by 90 degrees, the insertion direction of the calling card 80 is referred to as a top direction hereinafter. Further, since the top side of each character printed on the calling card is directed to the top direction of the coordinates of the page memory 74 as shown in FIGS. 32c and 32e, the direction of each printed character is referred to as a top direction hereinafter.

As shown in FIG. 32d, when the calling card 80 is set on the calling card tray 31 so that the bottom side of the calling card 80 is directed to the insertion hole of the facsimile apparatus and the insertion direction indicated by the arrow A1 is perpendicular to a printed direction of characters printed on the calling card 80 indicated by an arrow A14 so that the printed direction is a direction obtained when the insertion direction is rotated in the counterclockwise direction by 90 degrees, the insertion direction of the calling card 80 is referred to as a bottom direction hereinafter. Further, since the top side of each character printed on the calling card is directed to the bottom direction of the coordinates of the page memory 74 as shown in FIGS. 32d and 32e, the direction of each printed character is referred to as a bottom direction hereinafter.

The features of the OCR of the facsimile number printed on the calling card are as follows:

(a) The OCR process is executed for only typed or printed font characters, except for hand written characters.

(b) As shown in FIGS. 32a to 32d, the printed facsimile number is printed in an almost prefixed range of the calling card depending on the insertion direction of the calling card.

(c) The characters of the facsimile number to be recognized are only numerals, parentheses such as (, ) and a hyphen.

(d) The sizes of the fonts used upon printing facsimile numbers on calling cards are in a predetermined range. Namely, it is unnecessary to recognize extremely large or extremely small font characters.

(e) The facsimile group of the facsimile apparatus or the code thereof is printed in the peripheral area of the above-mentioned character train representing the facsimile or the facsimile number. Then, the characters to be recognized are only characters such as G, III, IV, Group and numerals.

Figure 26:
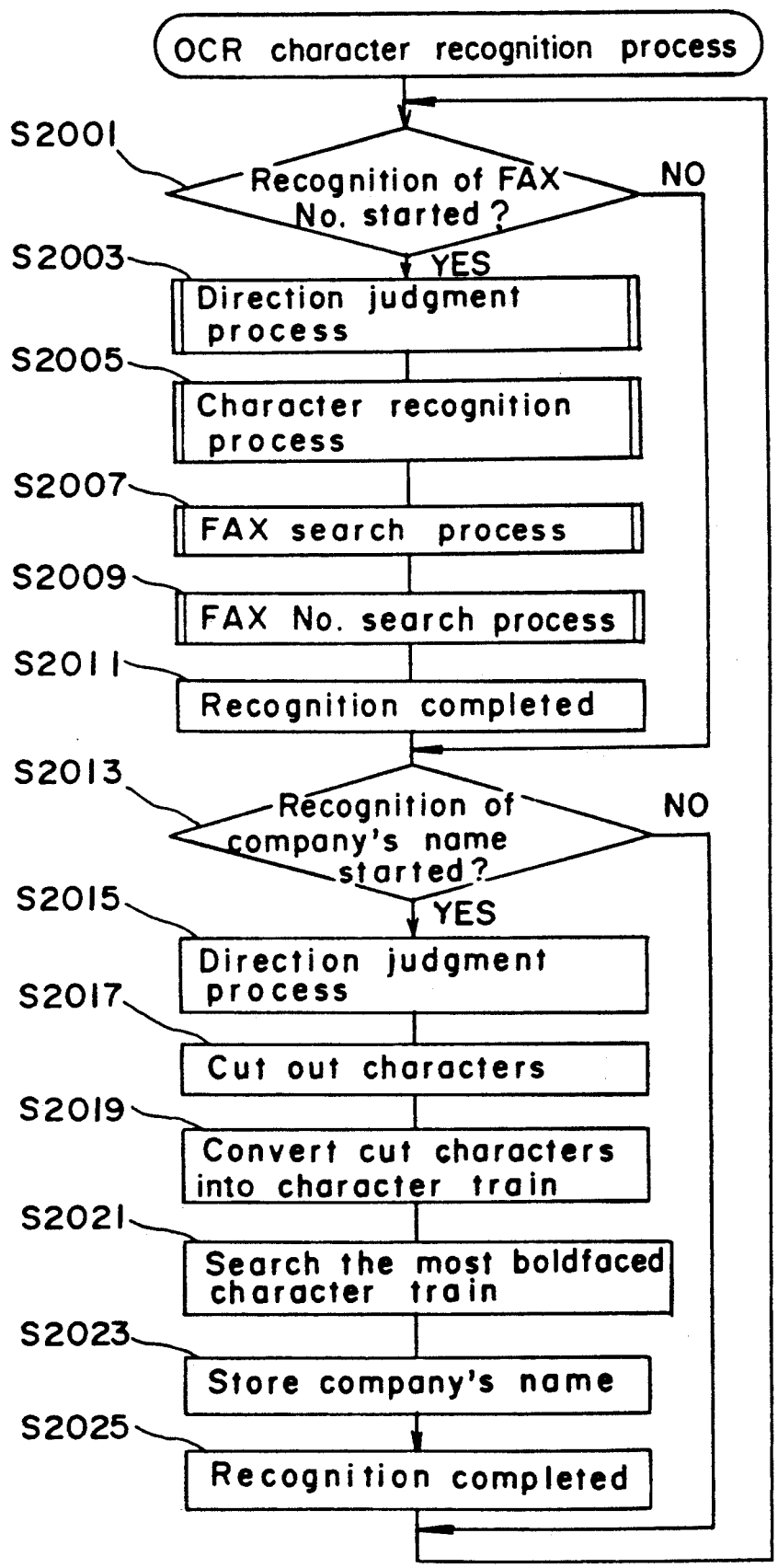
FIG. 26 is a flowchart showing an optical character reader character recognition process of a main routine executed by an optical character reader character recognition section shown in FIG. 4.
Figure 27:
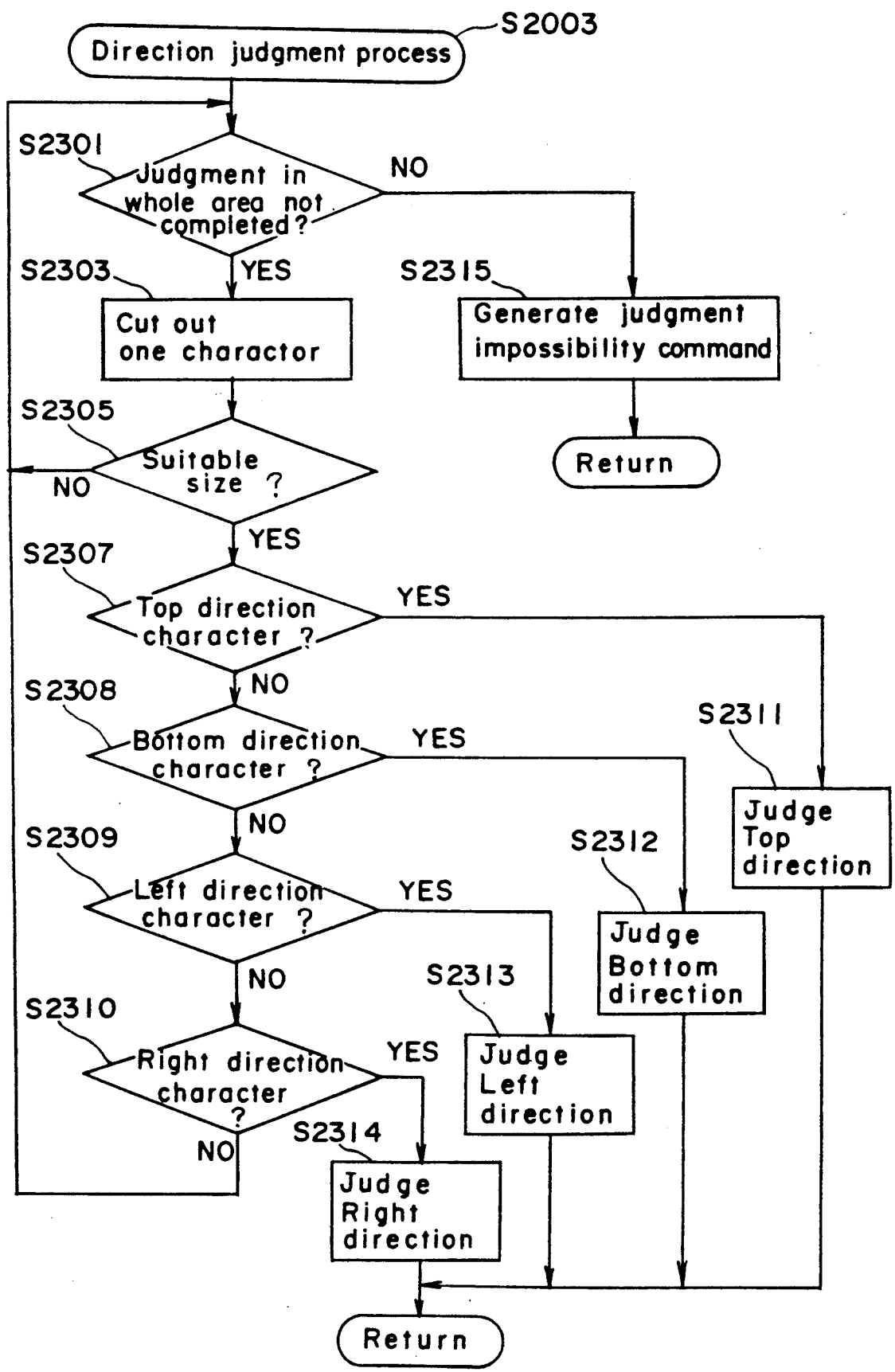
FIG. 27 is a flowchart showing a direction judgment process of a subroutine executed by the optical character reader character recognition section shown in FIG. 4.
Figure 29:
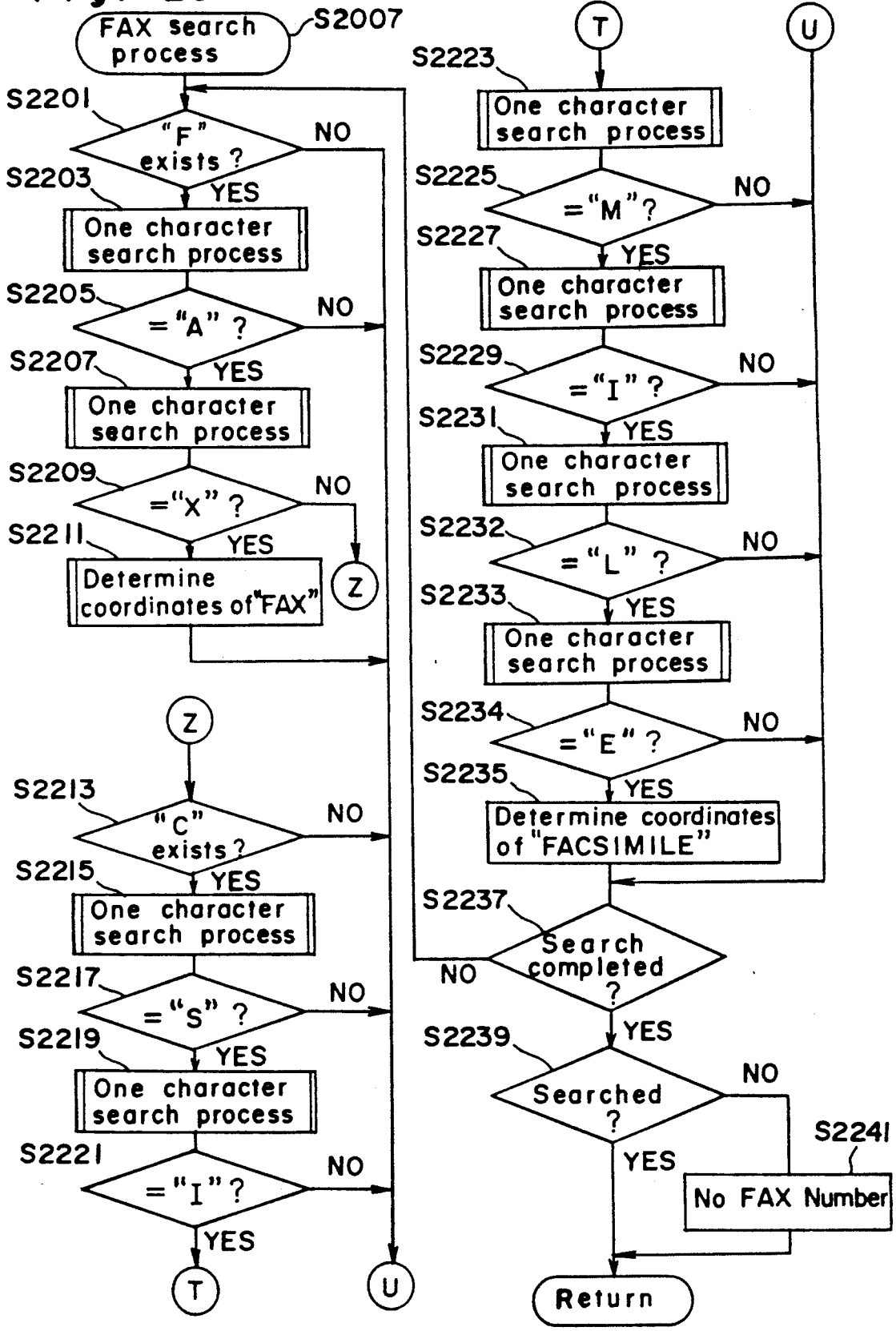
FIG. 29 is a flowchart showing a FAX search process of a subroutine executed by the optical character reader character recognition section shown in FIG. 4.

In the present preferred embodiment, as shown in FIG. 26, the above-mentioned character train representing the facsimile or the facsimile number such as "FAX", "FACSIMILE" is searched in a FAX search process shown in FIG. 29, and the printed direction of each character is judged in a direction judgment process shown in FIG. 27. Thereafter, a facsimile number and a facsimile group of the specification are searched in the right side of the above-mentioned character train representing the facsimile or the facsimile number based on the judged printed direction of each character in a FAX number search process shown in FIGS. 30a and 30b.

In the case of searching a facsimile number from a calling card utilizing the OCR technique, it is necessary to recognize only the above-mentioned character train representing the facsimile or the facsimile number, the group of the specification of the facsimile apparatus, and numerals etc. representing the facsimile number. Therefore, the OCR process is executed relatively easier. It is to be noted that the OCR technique is not described in this specification since the OCR technique is well known to those skilled in the art.

Further, since a company's name, a name of a person of a calling card, an office's name to which the person thereof belongs, a section's name to which the person thereof belongs are printed on a calling card, these names can be automatically registered as a destination by reading them in the vicinity of the above-mentioned character train representing the facsimile or the facsimile number (See FIGS. 23c and 26).

Furthermore, after a character train representing the telephone or the telephone number such as "TEL", "TELEPHONE", "Telephone" is searched, the telephone number which is not the facsimile number may be read.

(d-2) Selecting one of plural facsimile numbers

There may be such a case that plural facsimile numbers are printed on a calling card. For example, as shown in FIG. 5b, two facsimile numbers are printed on the calling card 80a and 80b. Therefore, it is necessary to select one of two facsimile numbers. In the present preferred embodiment, when plural facsimile numbers are searched without any facsimile groups or with the common facsimile group from an image printed on the calling card, the plural facsimile numbers are displayed in a message 100p shown in FIG. 3p on the LCD 41 at step S643 of FIG. 22c, and one of the plural facsimile numbers is selected by the operator. Then, when the operator selects one of the plural facsimile numbers using the one-touch dial key 42, the facsimile number corresponding to the pressed one-touch dial key 42. It is to be noted that, if the operator does not select one of the plural facsimile numbers until a time of one minute has been passed, the topmost facsimile number is selected, automatically, at steps S635 to S641 of FIG. 22b.

In the present preferred embodiment, the office's name and the section's name are not recognized. However, these data may be recognized and may be displayed on the LED 41 with the message 100p so that the operator can select one of the plural facsimile numbers looking at the office's name and the section's name.

(d-3) Selecting one of plural facsimile groups

When the facsimile numbers of facsimile apparatuses of different facsimile groups such as Group 3 and Group 4 are recognized from a calling card as shown in FIG. 5a, it is necessary to select one of the plural facsimile numbers taking the facsimile group of the transmitting facsimile apparatus into considerations. In the present preferred embodiment, a facsimile number without any facsimile group is judged to be the facsimile number of the facsimile apparatus of Group 3. Further, the facsimile apparatus of the present preferred embodiment is a facsimile apparatus of Group 3 and Group 4, which can communicates with a facsimile apparatus of Group 3 and a facsimile apparatus of Group 4. Therefore, when the facsimile numbers of facsimile apparatuses of Group 3 and Group 4 are recognized from a calling card as shown in FIG. 5a, there is selected the facsimile number of the facsimile apparatus of Group 4 which can communicate with the present facsimile apparatus, more efficiently, at step S1019 of FIG. 23b.

(d-4) Registering read facsimile number

The facsimile apparatus of the present preferred embodiment has a registration function for registering a facsimile number which has been read from a calling card in addition to the automatic transmission function by reading a calling card. Therefore, the one-touch transmission can be performed, and it is not necessary to read an image printed on the calling card again in the next transmission.

Figure 22A:
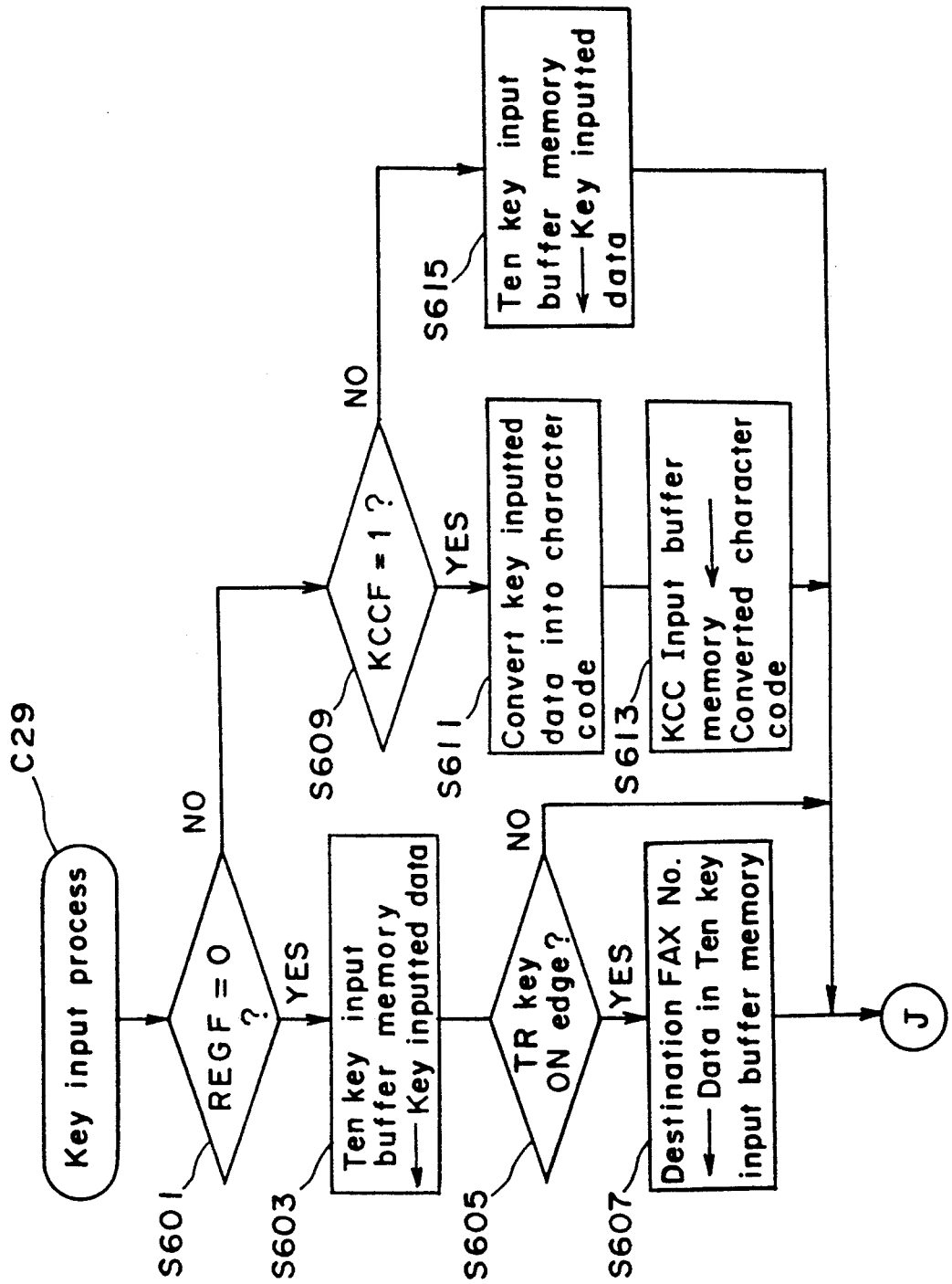
Figure 22C:
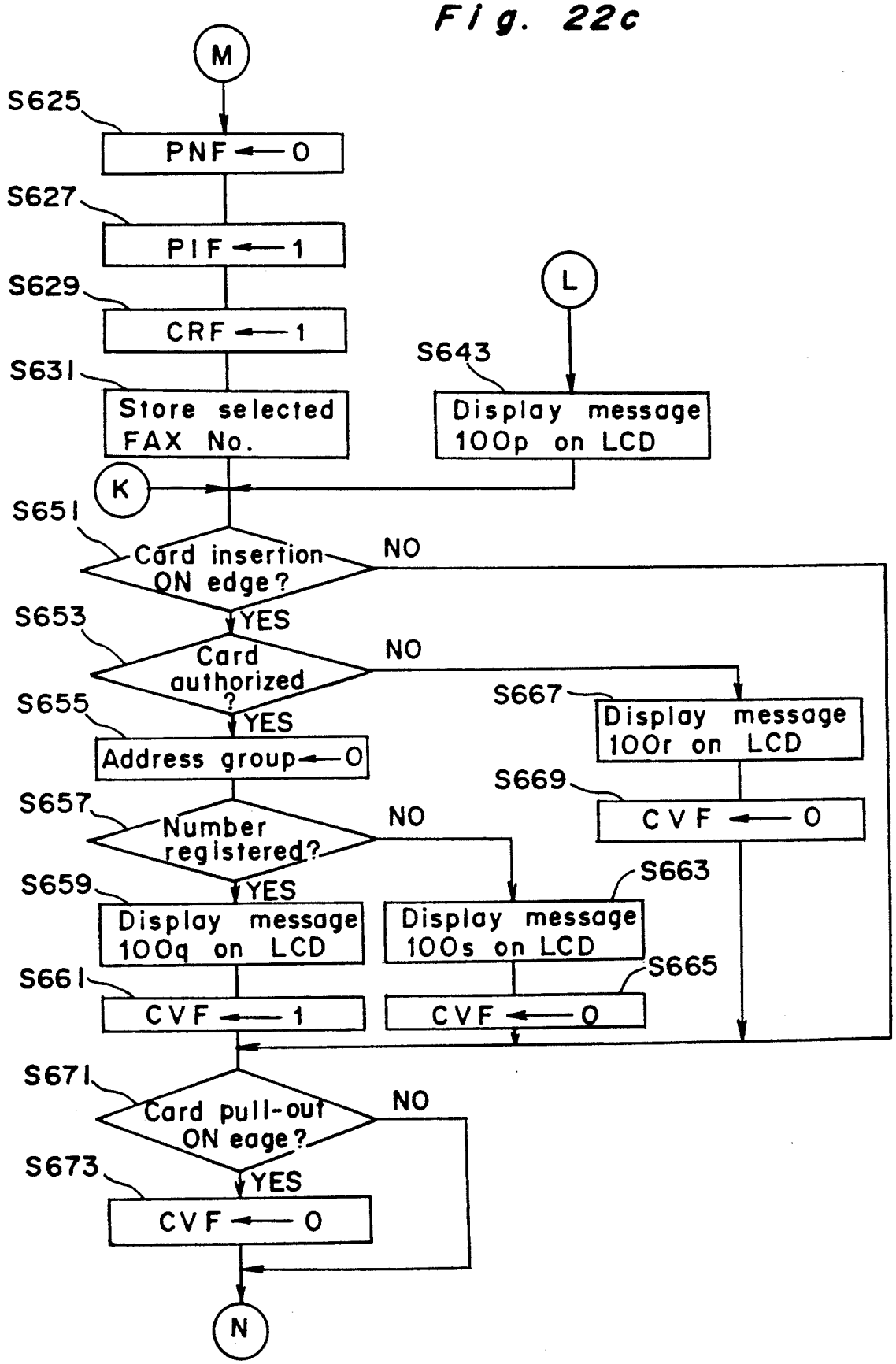
Figure 22D:
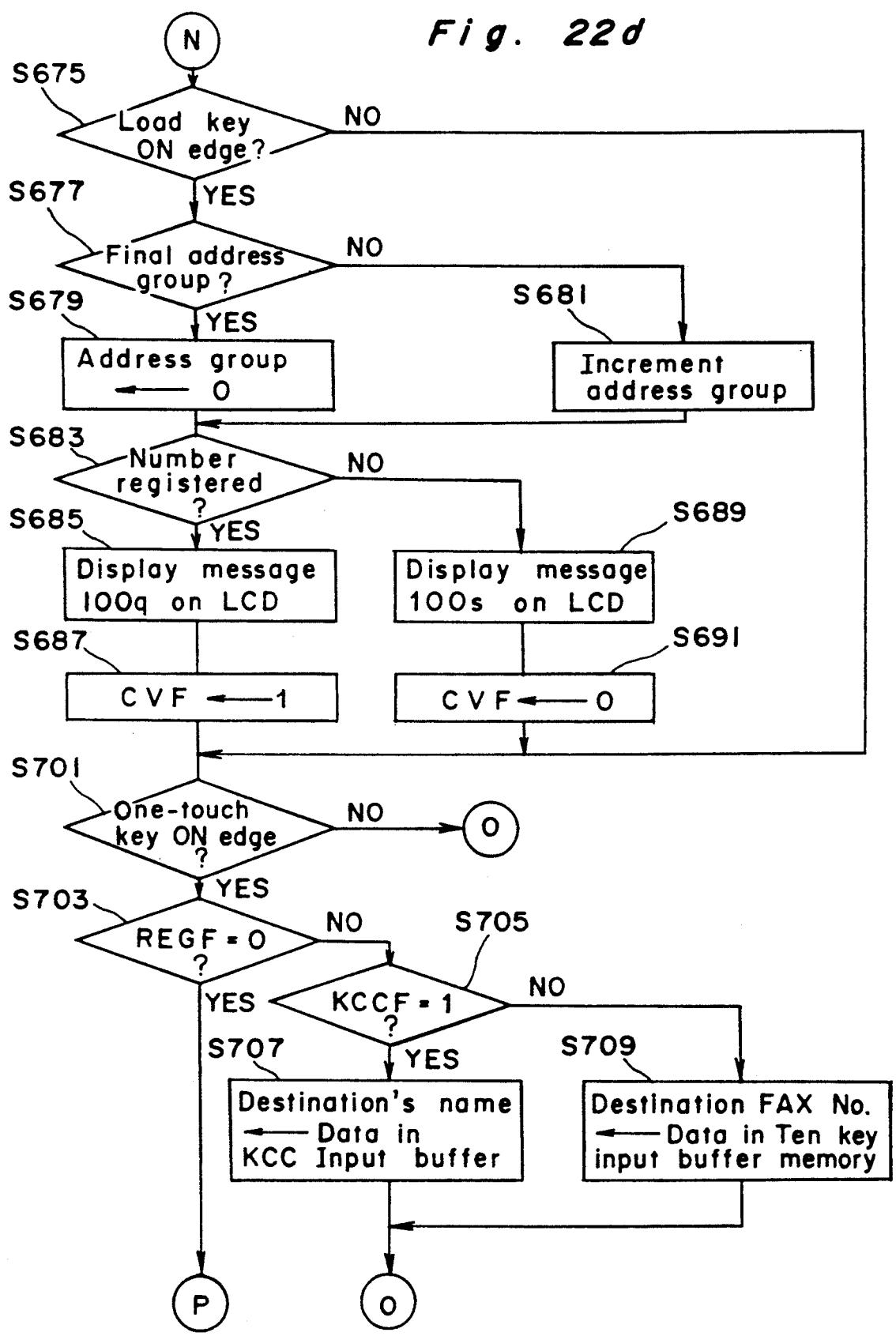
Figure 22F:
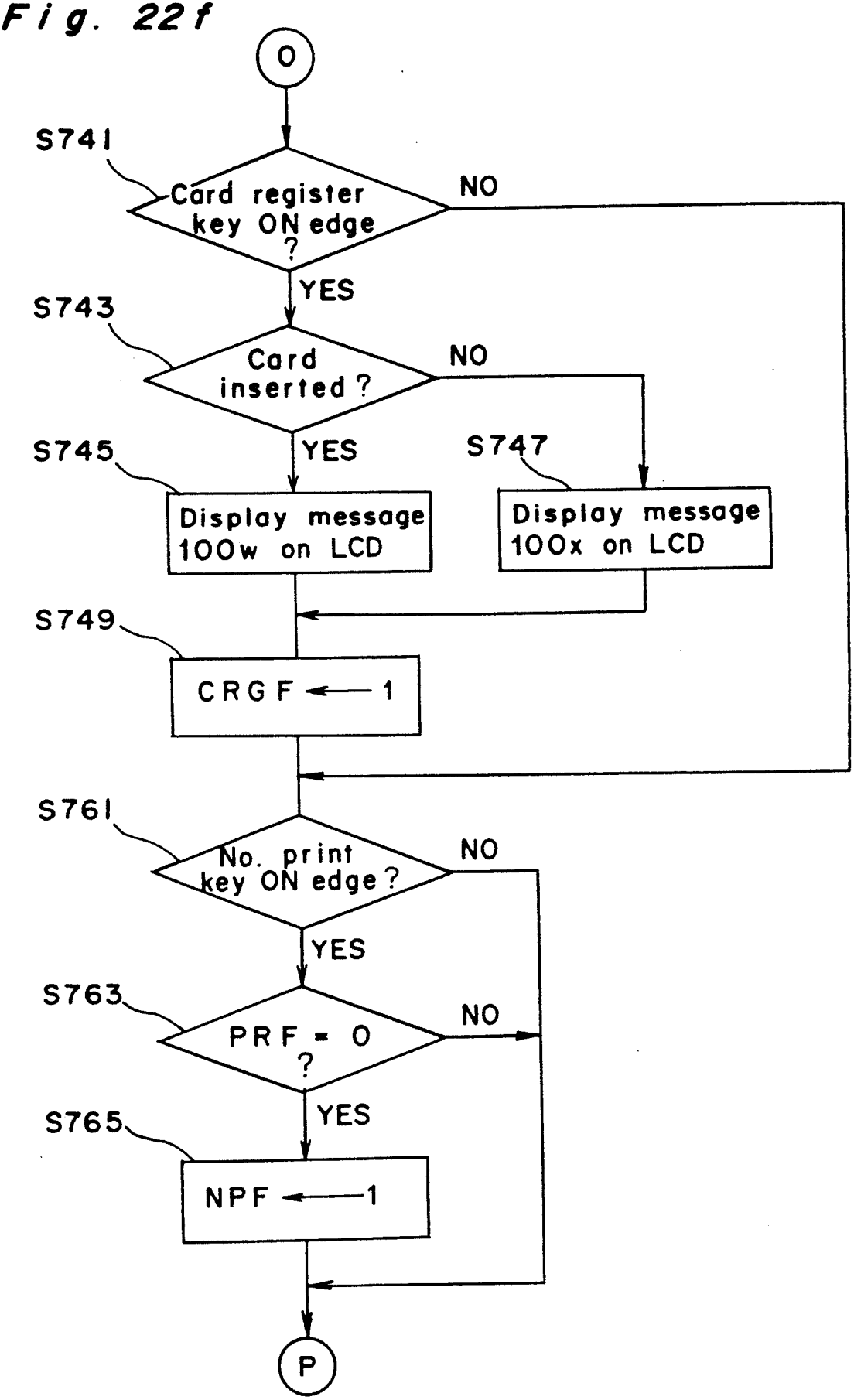
Figure 22G:
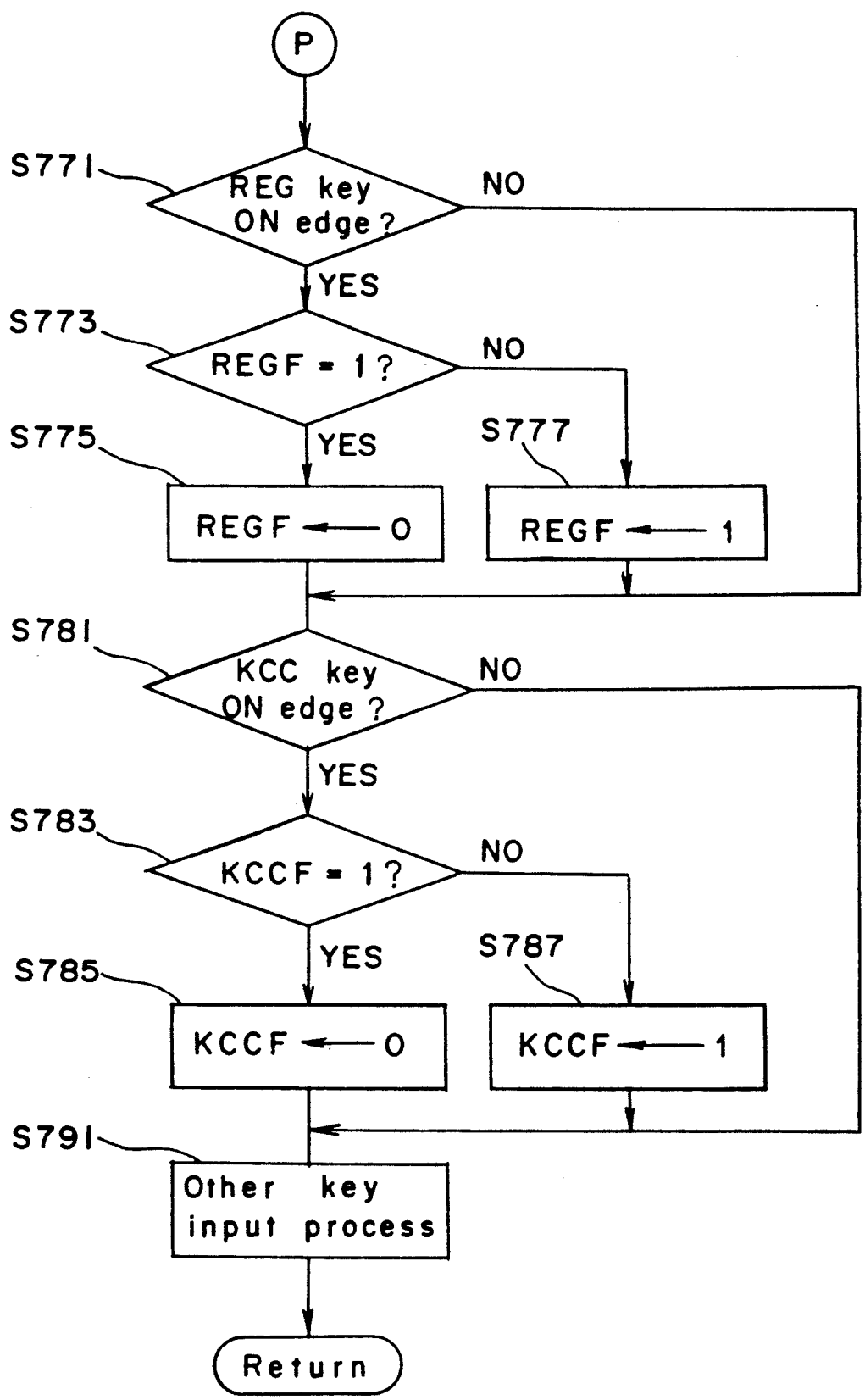

Namely, in the present preferred embodiment, when the registration key 47 of the operation panel 15 is pressed after a calling card is inserted into the facsimile apparatus, the operation mode of the facsimile apparatus enters the registration mode as shown in FIG. 22g. Thereafter, when the one-touch dial key 42 is pressed after an image printed on the calling card has been read, data of the facsimile number, the destination and the facsimile group printed on the calling card are stored at an address of the RAM 64 of the main body corresponding to the pressed one-touch dial key 42, at step S1217 of FIG. 25.

Figure 25:
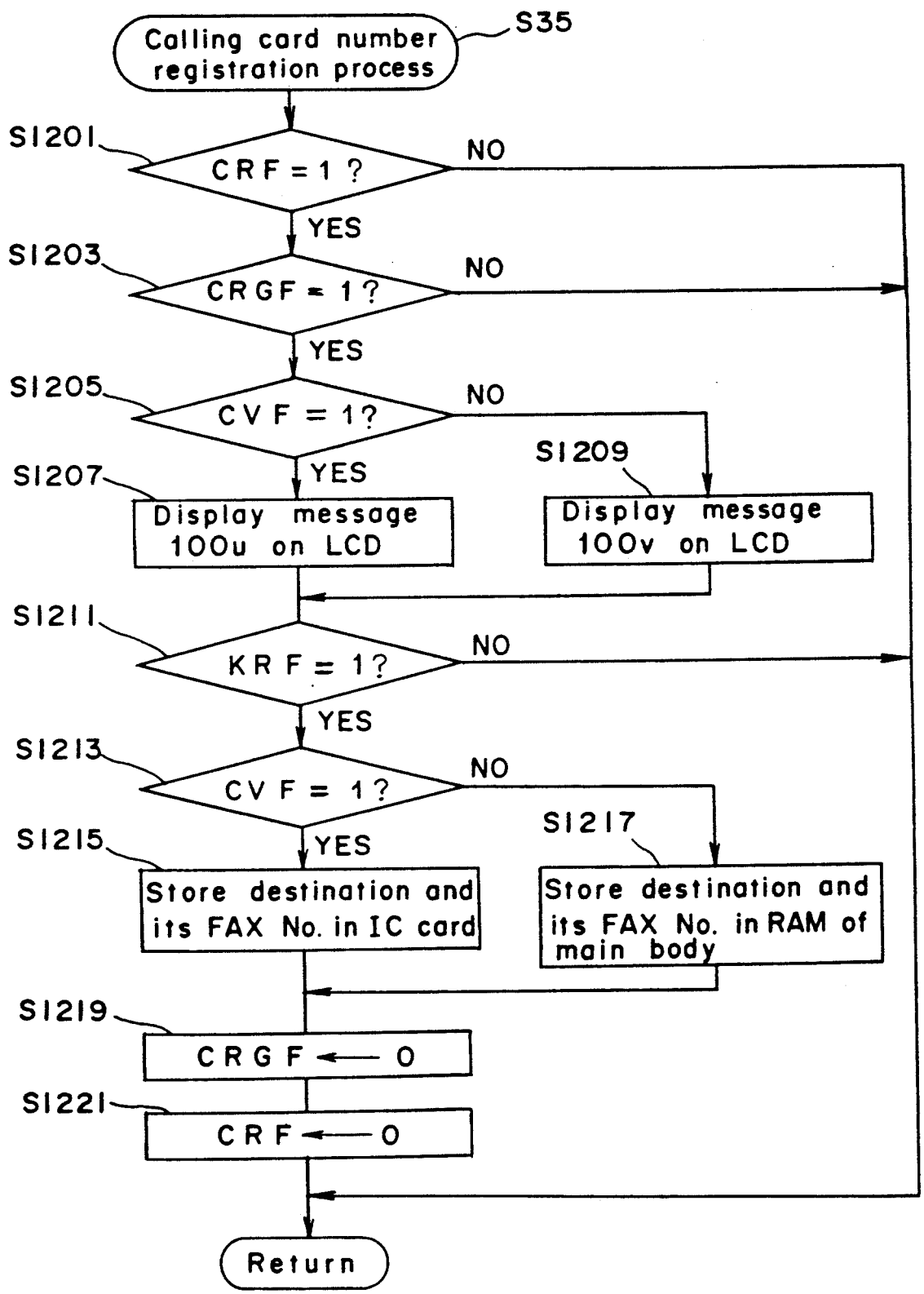
FIG. 25 is a flowchart showing a calling card number registration process of a subroutine executed by the communication control CPU shown in FIG. 4.

On the other hand, when the IC card 52 is inserted into the IC card interface unit 51, data of the facsimile number, the destination and the facsimile group printed on the calling card are stored at an address of the RAM of the IC card 52 corresponding to the pressed one-touch dial key 42, at step S1215 of FIG. 25.

(e) One-touch dial function and Number print function

The facsimile apparatus of the present preferred embodiment has a one-touch dial registration function. Data of destinations and facsimile numbers thereof corresponding to the one-touch dial keys 42 are stored in the RAM 64 of the main body or the RAM of the IC card 52. Upon transmitting an image signal or registering those data, the operator selects one of plural destinations and the facsimile number thereof by pressing one of the one-touch dial keys 42. In the present preferred embodiment, since these data are stored in the RAM of the IC card 52 every address group corresponding to each of the one-touch dial keys 42, it is necessary to input the number of the address group to be registered upon the registration or the transmission.

It is selected whether the one-touch dial keys 42 are made to correspond to the RAM of the IC card 52 or the RAM 64 of the main body by detecting whether or not the IC card 52 is inserted into the IC card interface unit 51. Namely, as shown in FIG. 22c, when the IC card 52 is inserted thereinto, the calling card validation flag CVF is set at one. On the other hand, when the IC card 52 is pulled out therefrom, the calling card validation flag is reset to zero. Thereafter, as shown in FIGS. 22d and 22e, when the one-touch dial key 42 is pressed, data such as the facsimile number are stored in the RAM 64 of the main body or the RAM of the IC card 52 depending on the IC card validation flag CVF, or the facsimile number is set as a facsimile number to be dialed.

If the operator does not memorize that each of the one-touch dial key 42 corresponds to which of the facsimile numbers of the destinations, it is necessary to confirm the above-mentioned corresponding relationship.

Figure 24:
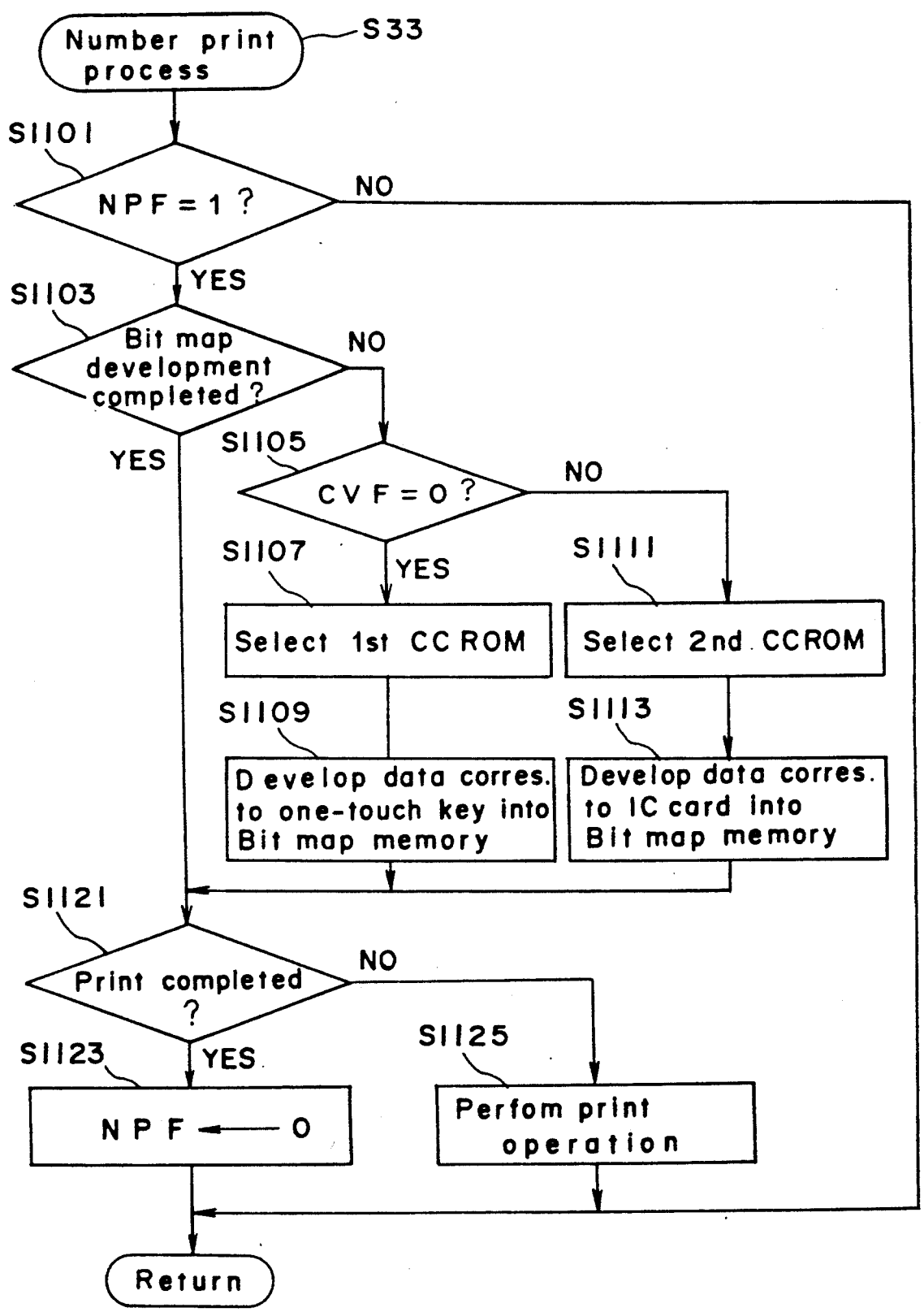
FIG. 24 is a flowchart showing a number print process of a subroutine executed by the communication control CPU shown in FIG. 4.

In order to overcome the above-mentioned problem, in the present preferred embodiment, there is provided the number print key 46 on the operation panel 15, and when the number print key 46 is pressed, the names of the destinations and the facsimile numbers thereof stored in the RAM of the IC card 52 or the RAM 64 of the main body are printed in a format on a piece or plural pieces of labels so that a piece of printed label can be stuck on the IC card 52 or plural pieces of labels can be stuck under respective one-touch dial keys 42, as shown in a flowchart of FIG. 24.

FIG. 6a is a front view of facsimile number labels showing a print format thereof upon printing destinations and facsimile numbers thereof for the one-touch dial keys 42, and FIG. 6b is a front view of one-touch dial keys 42 of the operation panel 15 shown in FIG. 2. The size of each of the facsimile number labels indicated by dotted lines is predetermined so that they are stuck under respective one-touch dial keys 42 and between the adjacent one-touch dial keys 42.

FIG. 6c is an enlarged front view of the facsimile number labels to be stuck under respective one-touch keys shown in FIG. 6.

Referring to FIG. 6c, a destination's name and a facsimile number thereof corresponding to the one-touch dial key 42 are printed on each of the facsimile number label indicated by the dotted line, and the size of each of the facsimile number labels indicated by the dotted lines is predetermined so that they are stuck under respective one-touch dial keys 42 and between the adjacent one-touch dial keys 42, as described above.

Further, each facsimile number label may be stuck on each of the one-touch dial keys 42. Furthermore, the destination's names and the facsimile numbers thereof corresponding to the one-touch dial keys 42 may be printed on a piece of sticking label having a proper size which can be stuck on a proper position of the facsimile apparatus.

In the present preferred embodiment, the destination's names and the facsimile numbers thereof stored in the RAM of the IC card 52 corresponding to the one-touch dial keys 42 are printed on a piece of facsimile number label which can be stuck on the IC card 52.

FIG. 7a is a front view of a facsimile number label showing a print format thereof upon printing facsimile numbers for the IC card 52, and FIG. 7b is a front view of the IC card 52. The size of the facsimile number label indicated by the dotted lines in FIG. 7a is predetermined so that it can be stuck on the IC card 52.

FIG. 7c is an enlarged front view of one example of the facsimile number label to be stuck on the IC card 52 shown in FIG. 7b. Referring to FIG. 7, the destination's names and the facsimile numbers thereof stored in the RAM of the IC card 52 corresponding to the one-touch dial keys 42 are printed on a piece of facsimile number label which can be stuck on the IC card 52. As a result, it is not necessary for the operator to write the destination's names and the facsimile numbers thereof, and these data can be rewritten easier upon changing data. The size of the facsimile number label to be stuck on the IC card 52 may be changed from that of the present preferred embodiment.

In these print processes, it is necessary to select whether data stored in the RAM 64 of the main body or data stored in the RAM of the IC card 52 are printed thereon, and also it is necessary to select one of plural printing forms and one of plural fonts. However, since it is selected whether the contents of the one-touch dial keys 42 correspond to the RAM of the IC card 52 or the RAM 64 of the main body by judging whether or not the IC card 52 is inserted into the IC card interface unit 51, it is desirable to select data to be printed by the above-mentioned selection.

Therefore, in the present preferred embodiment, as shown in FIG. 24, data to be printed are selected automatically depending on the IC card validation flag CVF. Namely, in the case of pressing the number print key 46 in order to print the above-mentioned data (See FIG. 22f), it is automatically selected depending on the IC card validation flag CVF representing whether or not the IC card is inserted thereinto, whether data stored in the RAM of the IC card 52 are printed or data stored in the RAM 64 of the main body are printed, at step S1105 of FIG. 24. Then, data stored therein are developed on the page memory 74 of a bit map memory so that the data can be printed in the above-mentioned format on the sticking label or labels which can be stuck on the operational panel 15 or the IC card 52. At that time, either one of the first and second CCROMs 65 and 66 is selected, and the font corresponding thereto is used.

Figures 8A, 8B, 10A, 10B:
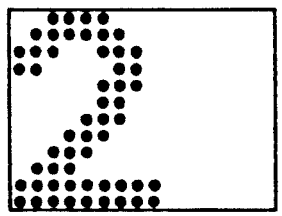
Figures 9A, 9B:
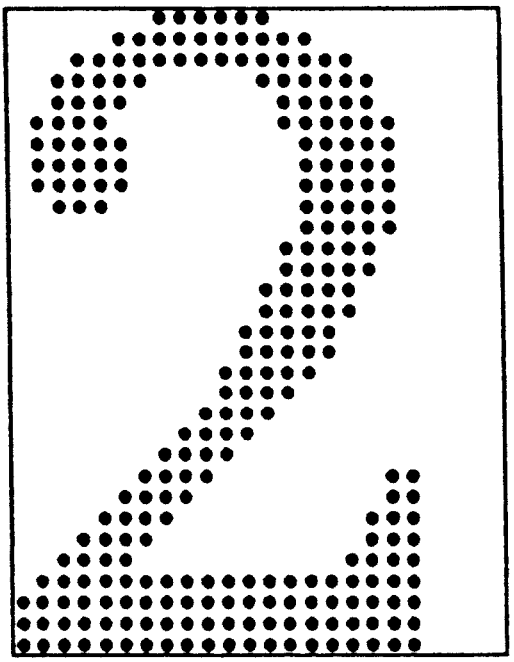
FIG. 9a shows one example of a font.
FIG. 9b shows font data of the font shown in FIG. 9a to be stored in a first Chinese character ROM shown in FIG. 4.

FIG. 9a shows one example of the font stored in the first CCROM 65, and FIG. 10a shows one example of the font stored in the second CCROM 66.

In order to print or recognize the numeral "2", data shown in FIG. 9b are stored in the first CCROM 65. Also, and data shown in FIG. 10b are stored in the second CCROM 66. Data shown in FIG. 9b correspond to a dot image of the font shown in FIG. 9a, and data shown in FIG. 10b correspond to a dot image of the font shown in FIG. 10a.

Further, character codes corresponding to the destinations and the facsimile numbers thereof are stored in the RAM 64 of the main body and the RAM of the IC card 52. For example, in the case of data to be stored as shown in FIG. 8a (it is to be noted that the destination thereof is written using the Chinese characters), the character code train shown in FIG. 8b is stored therein. Therefore, upon printing these data, after the character codes are read out sequentially, the font data corresponding to each character code, which are, for example, the font data of the numeral "2" shown in FIG. 9b or 10b, are read out, and then, are developed on the page memory 74 of the bit map memory. After all the character codes are developed thereon, the developed font data are printed on a piece of sticking label or the like in a manner similar to that of the conventional print operation.

In order to print the above-mentioned data, a thermal transfer type printer or a thermosensible paper type printer may be used in stead of the electrophotographic laser printer of the present preferred embodiment. Further, as the above-mentioned label, there can be used a sticking label, the back surface of which is coated with an adhesive agent so that the sticking label can be easily stuck on the IC card 52 or the operation panel 15. Furthermore, the other data with respect to modes of the transmission such as the broadcast communication, the number of prints may be printed thereon.

In the present preferred embodiment, data corresponding to the one-touch dial keys 42 are printed, however, there may be printed not only these data but also data with respect to compacted dial and/or the destination to which image data are to be transmitted in the broadcast communication mode.

(f) Control flow of Communication control CPU

The control flow of the CCCPU 60 will be described below. In the control flow, when the state of a switch, a sensor, a signal or the like changes from an OFF-state to an ON-state, the change in the state thereof is referred to as an ON edge hereinafter, and also it is described in the specification hereinafter that the switch, the sensor, the signal or the like has been turned on. On the other hand, the state of a switch, a sensor, a signal or the like changes from an ON-state to an OFF-state, the change in the state thereof is referred to as an OFF edge hereinafter, and also it is described in the specification hereinafter that the switch, the sensor, the signal or the like has been turned off.

(f-1) Main routine

Figure 11:
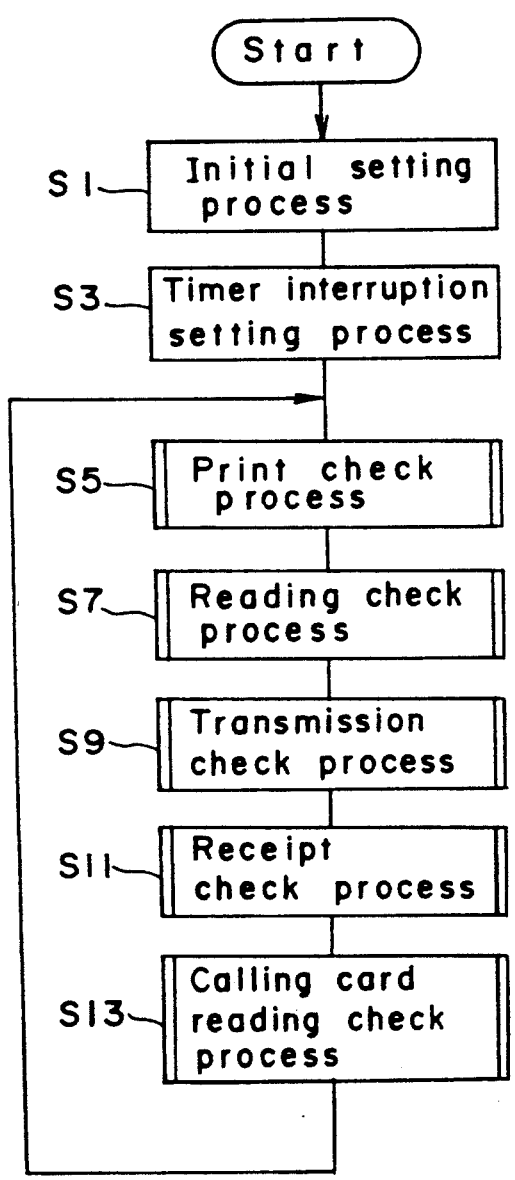
FIG. 11 is a flowchart showing a main routine executed by a communication control CPU shown in FIG. 4.

FIG. 11 is a flowchart showing a main routine executed by the CCCPU 60 shown in FIG. 4.

Referring to FIG. 11, first of all, there is executed an initial setting process for initializing registers, various kinds of input and out ports and the above-mentioned flags at step S1. Thereafter, at step S3, there is executed an initial setting process of the timer interruption for executing a timer interruption process shown in FIG. 12 at predetermined periods.

Thereafter, in order to execute respective processes included in the timer interruption process in a desirable manner, there are sequentially executed a print check process at step S5, a reading check process at step S7, a transmission check process at step S9, a receipt check process at step S11, and a calling card reading check process at step S13. After the calling card reading check process is completed, the program flow goes back to step S5, again, the check processes from step S5 to step S13 are repeated.

The above-mentioned check processes are described in detail later.

(f-2) Timer interruption process

Figure 12:
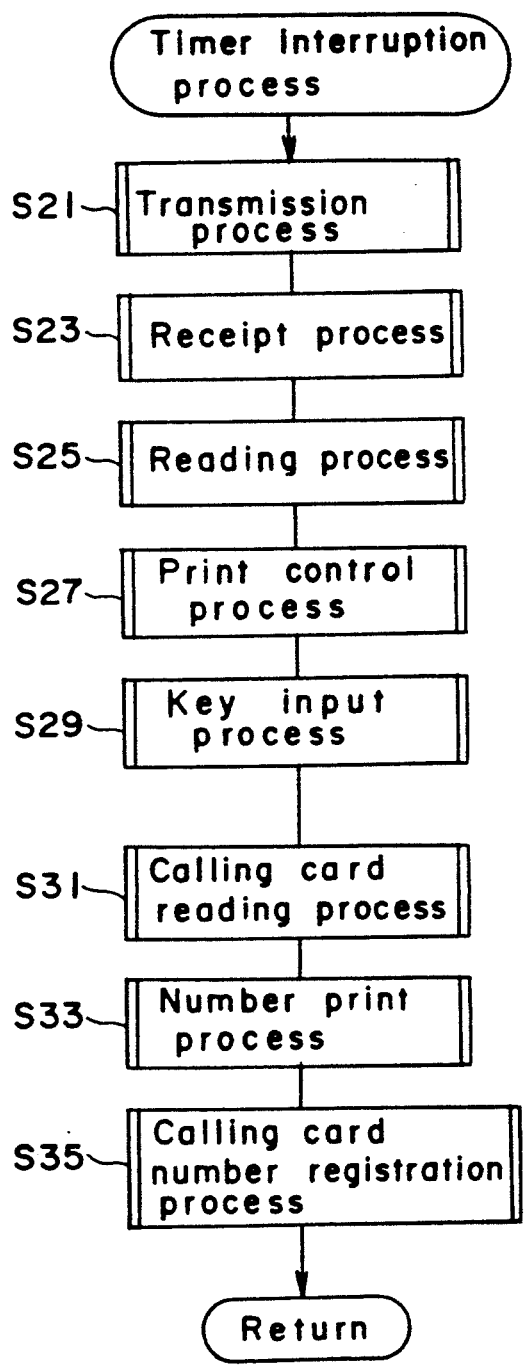
FIG. 12 is a flowchart showing a timer interruption process executed by the communication control CPU shown in FIG. 4.

FIG. 12 is a flowchart showing the timer interruption process executed by the CCCPU 60 shown in FIG. 4, and the timer interruption process is executed at the predetermined periods, as described above.

Referring to FIG. 12, there are sequentially executed a transmission process at step S21, a receipt process at step S23, a reading process at step S25, a print control process at step S27, a key input process at step S29, a calling card reading process at step S31, a number print process at step S33, and a calling card number registration process at step S35. The above-mentioned respective processes are described in detail later.

Hereinafter, respective check processes shown in FIG. 11 are described.

(f-3) Print check process

Figure 13:
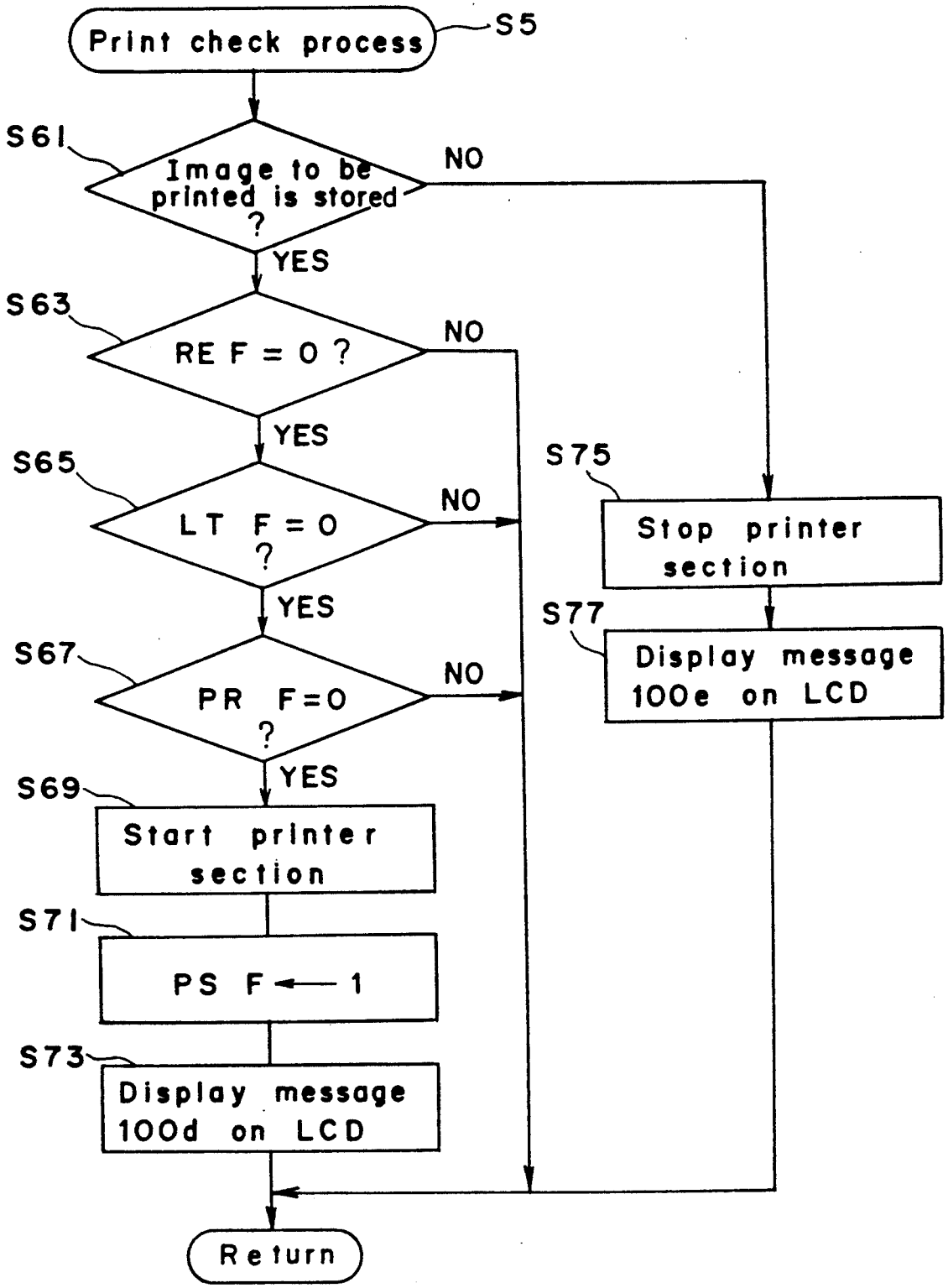
FIG. 13 is a flowchart showing a print check process of a subroutine executed by the communication control CPU shown in FIG. 4.

FIG. 13 is a flowchart showing the print check process (step S5) of a subroutine shown in FIG. 11.

Referring to FIG. 13, it is judged at step S61 whether or not image data to be printed are stored in the page memory 74. If the image data to be printed are stored in the page memory 74 (Yes at step S61), it is judged whether or not image data are not being read out or the reading flag REF is set at zero at step S63, it is judged whether or not an image signal is not being transmitted through the ISDN line or the line transmission flag LTF is set at zero at step S65, and it is judged whether or not the printer section 1 is not started or the print flag PRF is set at zero at step S67. If the reading flag REF is set at zero (Yes at step S63), the line transmission flag LTF is set at zero (Yes at step S65) and the print flag PRF is set at zero (Yes at step S67), the printed section 1 is started so as to turn on the heater etc. at step S69, and the print start flag PSF representing that the printer section 1 has been started is set at one. Thereafter, the message 100d shown in FIG. 3d is displayed on the LCD 41 at step S73 so as to inform the operator that the printer section 1 is printing, and then, the program flow returns to the main routine.

On the other hand, if the reading flag REF is set at one (No at step S63), or the line transmission flag LTF is set at one (No at step S65), the print operation can not be started since the compression and expansion section 73 can not be used for reading image data. Therefore, the program flow returns to the main routine, directly. Further, if the print flag PRF is set at one (No at step S67), the program flow returns to the main routine without executing any process since the printer section 1 has been already started.

On the other hand, if the image data to be printed are not stored in the page memory 74 or become empty therein (No at step S61), the printer section 1 is stopped so as to turn off the heater etc. at step S75, and the message 100e shown in FIG. 3e is displayed on the LCD 41 at step S77 so as to inform the operator that the print operation is completed. Thereafter, the program flow returns to the main routine.

(f-4) Reading check process

Figure 14A:
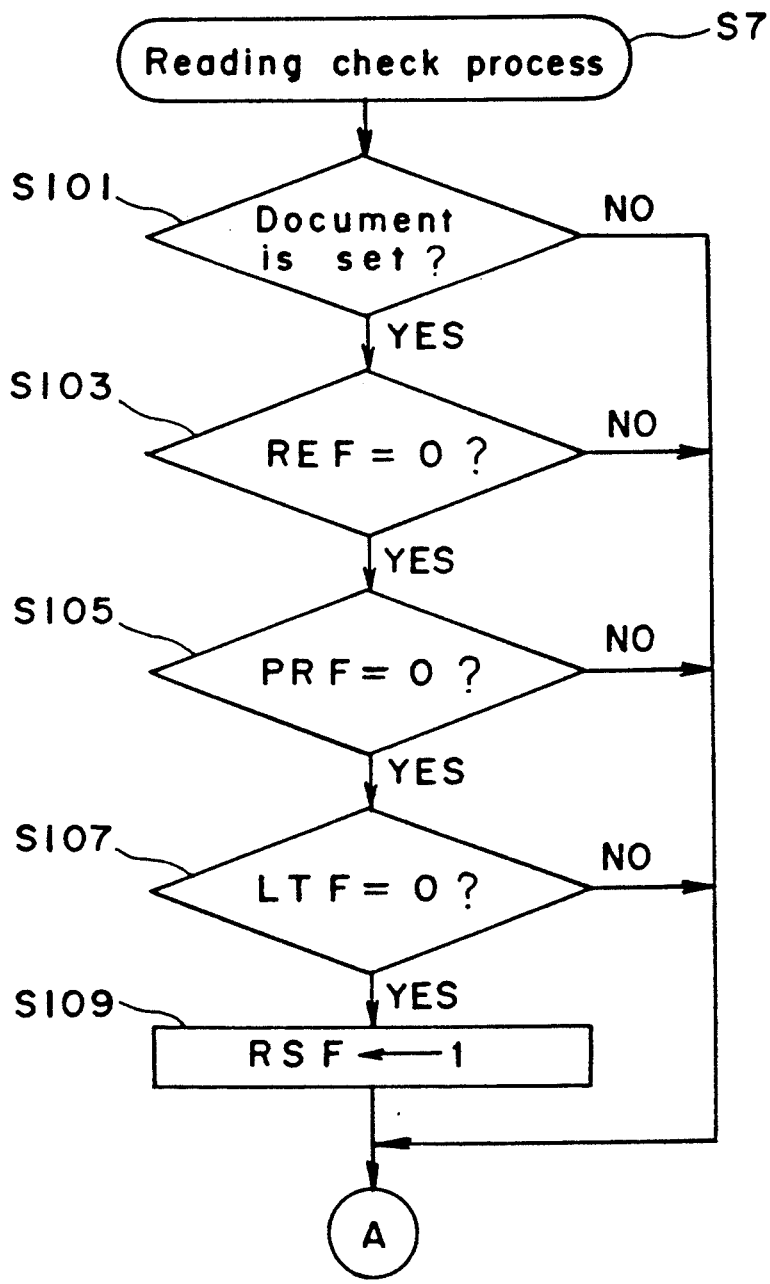
FIGS. 14a and 14b are flowcharts showing a reading check process of a subroutine executed by the communication control CPU shown in FIG. 4.
Figure 14B:
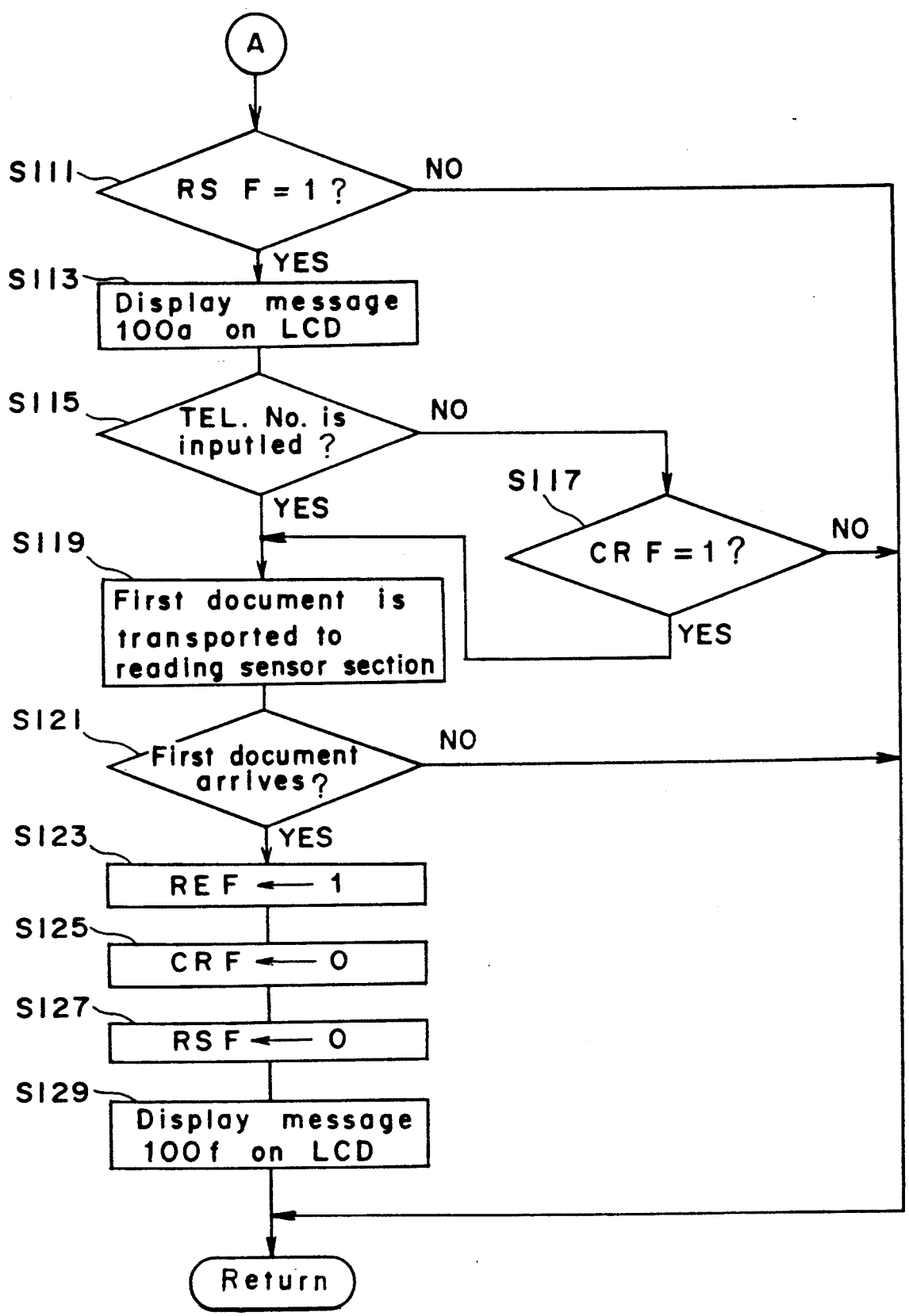

FIGS. 14a and 14b are flowcharts showing the reading check process (step S7) of a subroutine shown in FIG. 11.

Referring to FIG. 14a, it is judged whether or not a document is set on the document tray 11 at step S101. If the document is set on the document tray 11 (Yes at step S101), the program flow goes to step S103. On the other hand, if the document is not set on the document tray 11 (No at step S101), the program flow goes to step S111.

It is judged at step S103 whether or not the document image is not being read or the reading flag REF is set at zero, it is judged at step S105 whether or not the printer section 1 is not printing or the print flag PRF is set at zero, and it is judged at step S107 whether or not an image signal is not transmitted or the line transmission flag LTF is set at zero. If the reading flag REF is set at zero (Yes at step S103), the print flag PRF is set at zero (Yes at step S105) and the line transmission flag LTF is set at zero (Yes at step S107), the reading start flag RSF is set at one at step S109, and then, the program flow goes to step S111. On the other hand, if the reading flag REF is set at one (No at step S103), the program flow goes to step S111 without executing any process, since the image data are being read. Further, if the print flag PRF is set at one (No at step S105), or the line transmission flag LTF is set at one (No at step S107), the program flow also goes to step S111 without executing any process, since the image data can not read out because of using the compression and expansion section 73 upon printing or transmitting.

Referring to FIG. 14b, it is judged at step S111 whether or not the reading start flag RSF is set at one. If the reading start flag RSF is set at one (Yes at step S111), the program flow goes to step S113, the message 100a shown in FIG. 3a is displayed on the LCD 41 in order to instruct the operator to input the facsimile number, and then, the program flow goes to step S115.

It is judged at step S115 whether or not a facsimile number has been inputted, and it is judged at step S117 whether or not the facsimile number printed on the calling card has been read or the calling card read flag CRF is set at one. If the facsimile number has been inputted (Yes at step S115) or the calling card read flag CRF is set at one (Yes at step S117), the program flow goes to step S119, and then, the following process for reading the document image. On the other hand, if the reading start flag REF is set at zero (No at step S111), or if the calling card read flag CRF is set at zero (No at step S117), the program flow returns to the main routine.

At step S119, the first document is fed to the CCD linear image sensor 26, and then, it is detected at step S121 by the sensor 25 whether or not the first document arrives at the CCD linear image sensor 26. If it is detected that the first document arrives at the CCD linear image sensor 26 (Yes at step S121), the program flow goes to step S123. On the other hand, if the first document has not arrive at the CCD linear image sensor 26 (No at step S121), the program flow returns to the main routine without executing any process.

At step S123, the reading flag REF for representing that the document image is being read is set at one in order to start the reading operation of the CCD linear image sensor 26, and then, the calling card read flag CRF is reset to zero at step S125 in order to represent that the calling card has not read. Thereafter, the reading start flag RSF is reset to zero at step S127, and then, the message 100f shown in FIG. 3f is displayed on the LCD 41 at step S129 so as to inform the operator that the reading operation is started. Thereafter, the program flow returns to the main routine.

In the present preferred embodiment, when the document is set on the document tray 21 and the calling card read flag CRF is set at one (Yes at step S117), the document image is read and the image signal thereof is transmitted even though the transmission key 43 is not pressed. In the case of normally transmitting a document, it is necessary to press the transmission key 43 for starting the transmission after setting the document on the document tray 21. However, when a facsimile number is read using the function for reading a calling card, the operation of pressing the transmission key 43 and the operation of inserting a calling card are duplicated. Further, the operation of pressing the transmission key 43 means the completion of inputting a facsimile number. Therefore, it is unnecessary to press the transmission key 43. In the present preferred embodiment, when the facsimile number is determined by reading the facsimile number, the process for reading a document image or the transmission process is started. Thus, the operation of pressing the transmission key 43 can be omitted.

(f-5) Transmission check process

FIG. 15 is a flowchart showing the transmission check process (step S9) of a subroutine shown in FIG. 11.

Referring to FIG. 15, first of all, it is judged at step S131 whether or not data to be transmitted (referred to as transmission data hereinafter) are stored in the image memory 75. If any transmission data are not in the image memory 75 (No at step S131), the program flow returns to the main routine without executing any process. On the other hand, if the transmission data are stored in the image memory 75 (Yes at step S131), it is judged at step S133 whether or not the reading flag REF is set at zero, it is judged at step S135 whether or not the print flag PRF is set at zero, it is judged at step S137 whether or not the line receipt flag LRF representing whether or not an image signal is being received from a destination is set at zero, and it is judged at step S139 whether or not the line transmission flag LTF is set at zero. If the reading flag REF is set at zero (Yes at step S133), the print flag PRF is set at zero (Yes at step S135), the line receipt flag LRF is set at zero (Yes at step S137) and the line transmission flag LTF is set at zero (Yes at step S139), the program flow goes to step S141. On the other hand, if the reading flag REF is set at one (No at step S133), or if the print flag PRF is set at one (No at step S135), the program flow returns to the main routine since the compression and expansion section 73 is being used and an image signal can not be transmitted. Further, if the line receipt flag LRF is set at one (No at step S137), the program flow returns to the main routine since the ISDN line is used for receiving an image signal and another image signal can not transmitted. Furthermore, if the line transmission flag LTF is set at one (No at step S139), the program flow returns to the main routine since the transmission process has been already started.

The line transmission flag LTF is set at one at step S141, and then, the image transmission flag ITF is reset to zero at step S143. Thereafter, the previous transmission data stored in the image memory 75 are cleared at step S145, and then, the message 100g shown in FIG. 3g is displayed on the LCD 41 at step S147 so as to inform the operator that an image signal starts to be transmitted. Thereafter, the program flow returns to the main routine.

In the present preferred embodiment, the original image data are stored as the transmission data in the image memory 75, however, the image data which have been expanded and compressed again upon the previous transmission may be stored in the image memory 75.

Further, the previous image data may be cleared at any timing at least after the transmission of the next document including the reading operation has been started. For example, when it is detected that the document is set on the document tray 11, when the facsimile number of a destination is set, or when the document starts to be read, the previous image data may be cleared.

(f-6) Receipt check process

FIG. 16 is a flowchart showing a receipt check process (step S11) of a subroutine shown in FIG. 11.

Referring to FIG. 16, first of all, it is judged at step S151 whether or not there is an incoming call through the ISDN line. If there is an incoming call (Yes at step S151), it is judged at step S153 whether or not the line transmission flag LTF is set at zero, and it is judged at step S155 whether or not the line receipt flag LRF is set at zero. If there is not any incoming call through the ISDN line (No at step S151), the program flow returns to the main routine. Further, if the line transmission flag LTF is set at one (No at step S153), or if the line receipt flag LRF is set at one (No at step S155), namely, when the ISDN line is being used, the program flow returns to the main routine. On the other hand, if the line transmission flag LTF is set at zero (Yes at step S153) and the line receipt flag LRF is set at zero (Yes at step S155), namely, when the ISDN line is not used, the line receipt flag LRF is set at one (Yes at step S157) so as to start the receipt process, and then, the image received flag IRF is reset to zero at step S159. Thereafter, the receipt connected flag RCF is reset to zero at step S161, and then, the message 100h shown in FIG. 3h is displayed on the LCD 41 so as to inform the operator that an image signal is being received. Thereafter, the program flow returns to the main routine.

(f-7) Calling card reading check process

FIG. 17 is a flowchart showing the calling card reading check process (step S13) of a subroutine shown in FIG. 11 for checking the start of the OCR character recognition section 67.

Referring to FIG. 17, it is judged at step S171 whether or not an image printed on a calling card is not being read or the calling card reading flag CCRF is set at zero. If the calling card reading flag CCRF is set at zero (Yes at step S171), the program flow goes to step S173, and then, it is judged whether or not the calling card detection sensor 32 for detecting whether or not an calling card is set has been turned on. On the other hand, if the calling card reading flag CCRF is set at one (No at step S171), the program flow returns to the main routine.

If the calling card detection sensor 32 has been turned on (Yes at step S173), it is judged at step S175 whether or not the reading flag REF is set at zero. On the other hand, if the calling card detection sensor 32 has not been turned on (No at step S173), the program flow returns to the main routine.

If the reading flag REF is set at one (No at step S175), the program flow returns to the main routine since the CCD linear image sensor 26 is used in common for reading a document image and for reading an image printed on a calling card and an image printed on a calling card can not be read upon reading another document image. On the other hand, if the reading flag REF is set at zero (Yes at step S175), namely, if a document image is not being read, the program flow goes to step S177 since an image printed on a calling card can be read, and then, the plural number inputted flag PIF is set at zero. Thereafter, the program flow branches into steps S181 and S193 depending on the calling card registration flag CRGF since there are following two cases:

(a) a first case of dialing the read facsimile number through the ISDN line; and (b) a second case of registering the read facsimile number as data corresponding to one-touch dial key 42.

If the calling card registration flag CRGF is set at zero (Yes at step S179), or if the read facsimile number is used for the one-touch transmission, the program flow goes to step S181, and then, it is judged whether or not the line transmission flag LTF is set at zero, and further, it is judged at step S183 whether or not the print flag PRF is set at zero. If the compression and expansion section 73 is not used, or if the line transmission flag LTF is set at zero (Yes at step S181) and the print flag PRF is set at zero (Yes at step S183), it is judged at step S185 whether or not the reading start flag RSF is set at one. On the other hand, if the line transmission flag LTF is set at one (No at step S181) or if the print flag PRF is set at one (No at step S183), the program flow returns to the main routine.

If the reading start flag RSF is set at one (Yes at step S185), the calling card reading flag CCRF is set at one at step S187 since a document is set on the document tray 21 (See step S109 of FIG. 14a and step S725 of FIG. 22e), and then, the message 100l shown in FIG. 3l is displayed on the LCD 41 at step S189 so as to inform the operator that an image printed on a calling card is being read. Thereafter, the program flow returns to the main routine.

On the other hand, if the reading start flag RSF is set at zero (No at step S185), the message 100m shown in FIG. 3m is displayed on the LCD 41 so as to inform the operator that a document is to be set on the document tray 21, and then, the program flow returns to the main routine without reading any image printed on the calling card.

In the present preferred embodiment, when a calling card is inserted (Yes at step S173), the process for reading an image printed on a calling card is started at step S187. However, the above-mentioned reading process is started when a predetermined key is pressed. In this case, a calling card reading key is provided, and after inserting a calling card into the facsimile apparatus, the above-mentioned reading process may be started if it is detected that the calling card reading key has been turned.

On the other hand, if the read facsimile number is used for the calling card registration, or the calling card registration flag CRGF is set at one (No at step S179), the key registration flag KRF is reset to zero at step S193, and then, the calling card reading flag CCRF representing that an image printed on a calling card is being read is set at one at step S195. Thereafter, the message 100w shown in FIG. 3w is displayed on the LCD 41 so as to inform the operator of the calling card registration, and then, the program flow returns to the main routine.

Hereinafter, respective subroutines executed in the timer interruption process (step S3) shown in FIG. 11 will be described.

(f-8) Transmission process

FIGS. 18a to 18d are flowcharts showing the transmission process (step S21) of a subroutine shown in FIG. 12.

In the present preferred embodiment, after the compressed image data are converted into expanded image data, the expanded image data are converted into the compressed image data again, since there is adopted a transmission method of a so-called memory transmission. Namely, in the transmission method, upon reading a document image prior to a transmission, image data of all the document image are stored in the image memory 75, and thereafter, the line connection process for connecting the present facsimile apparatus with a receiving destination is executed upon the transmission. However, in this case, since the recording performance of a facsimile apparatus of a destination such as a recording size and the compression method thereof can not be known, the coding process is executed utilizing a coding method suitable for the transmitting facsimile apparatus such as a coding method having a high compression efficiency. Thereafter, it is necessary to expand the image data upon the communication with a receiving facsimile apparatus so as to convert them into the original image data, and thereafter, to compress the original image data so as to convert them into the compressed image data suitable for a receiving facsimile apparatus. Therefore, as shown in FIG. 18a, the compression process and the expansion process are executed alternately.

Figure 18A:
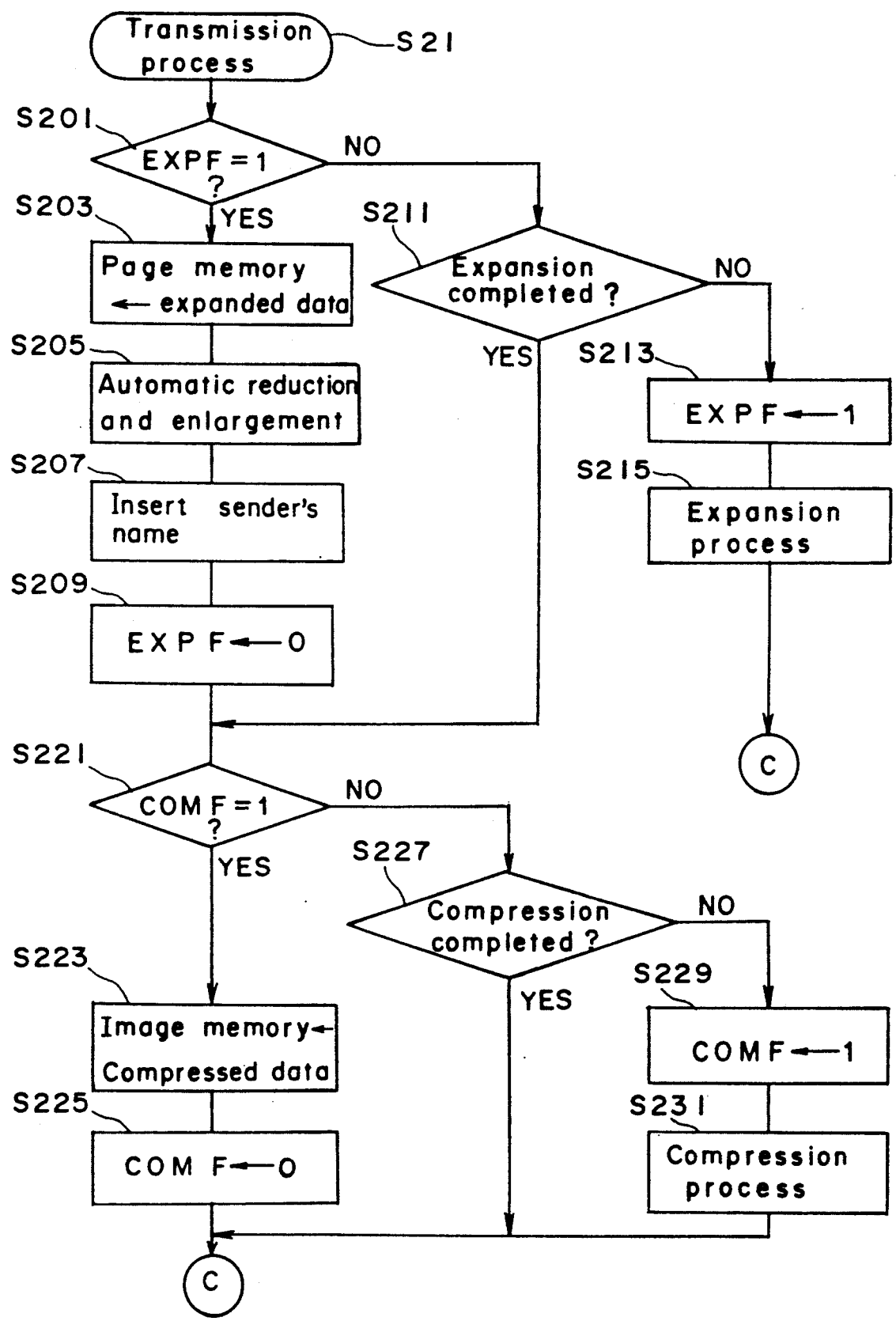
FIGS. 18a to 18d are flowcharts showing a transmission process of a subroutine executed by the communication control CPU shown in FIG. 4.

Referring to FIG. 18a, it is judged at step S201 whether or not the expansion EXPF which is to be set when image data are being expanded is set at one. If the expansion flag EXPF is set at one (Yes at step S201), the expanded image data are stored in the page memory 74 at step S203, and then, there is executed at step S205 the automatic reduction process for reducing or enlarging the image data depending on the recording size of the receiving facsimile apparatus. Thereafter, an image process for adding the name of the sender into the image data to be transmitted at step S207, and then, the expansion flag EXPF is reset to zero at step S209. Thereafter, the program flow goes to step S221.

On the other hand, if the expansion flag EXPF is set at zero (No at step S201) or the image data are not being expanded, it is judged at step S211 whether or not the expansion process for all the image data is completed. If the expansion process is completed (Yes at step S211), the program flow goes to step S221. On the other hand, if the expansion process is not completed (No at step S211), the expansion flag EXPF is set at one at step S213, and then, the expansion process is executed at step S215. Thereafter, the program flow goes to step S241 of FIG. 18b.

It is judged at step S221 whether or not the compression flag COMF representing whether or not image data are being compressed is set at one. If the image data are being compressed or the compression flag COMF is set at one (Yes at step S221), the compressed image data are stored in the image memory 75 at step S223, and then, the compression flag COMF is reset to zero at step S225. Thereafter, the program flow goes to step S241. On the other hand, if the image data is not being compressed or the compression flag COMF is set at zero (No at step S221), it is judged at step S227 whether or not the compression process for compressing all the image data is completed. If the compression process is completed (Yes at step S227), the program flow directly goes to step S241. On the other hand, if the compression process is not completed (No at step S227), the compression flag COMF is set at one at step S229, and then, the compression process is executed at step S231. Thereafter, the program flow goes to step S241.

Figure 18B:
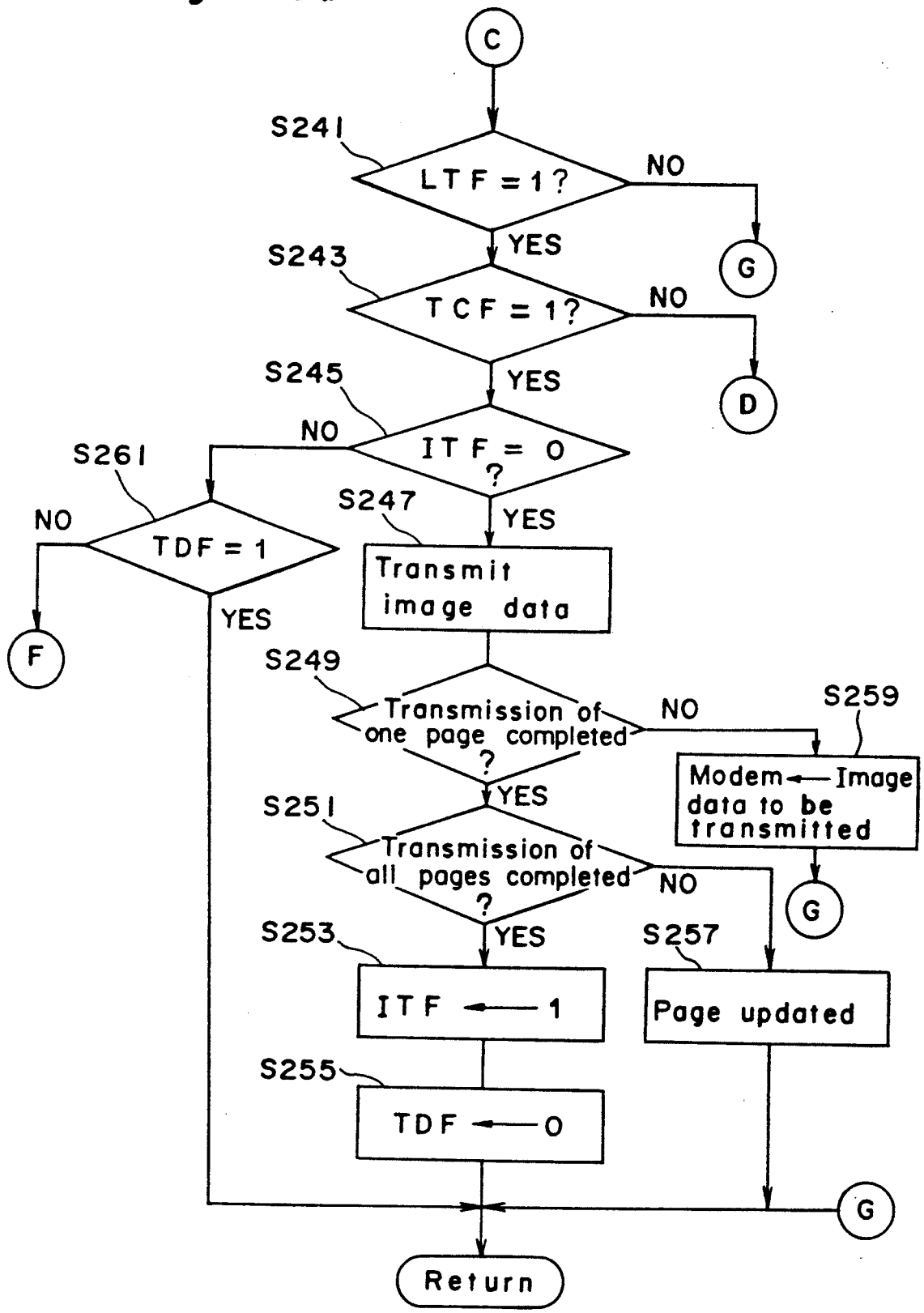

Thereafter, referring to FIG. 18b, it is judged at step S241 whether or not the line transmission flag LTF to be set when an image signal is transmitted is set at one. If the line transmission flag LTF is set at zero (No at step S241), the program flow returns to the main routine without executing any process. On the other hand, if the line transmission flag LTF is set at one (Yes at step S241), it is judged at step S243 whether or not the transmission connected flag TCF to be set when the line connection process for connecting the facsimile apparatus with a receiving facsimile apparatus is completed is set at one. If the line connection process is not completed or the transmission connected flag TCF is set at zero (No at step S243), the program flow goes to step S281 of FIG. 18d. On the other hand, if the line connection process is completed or the transmission connected flag TCF is set at one (Yes at step S243), the program flow goes to step S245 and more, and then, the image signal of the image data is transmitted as follows.

First of all, it is judged at step S245 whether or not the image transmitted flag ITF to be set when the transmission process for transmitting the image signal of the image data is completed is set at zero. If the transmission process is completed or the image transmitted flag ITF is set at one (No at step S245), the program flow goes to step S261. It is judged at step S261 whether or not the transmission disconnection process is completed based on the transmission disconnected flag TDF. If the transmission disconnection process is completed, or the transmission disconnected flag TDF is set at one (Yes at step S261), the program flow returns to the main routine, and then, the transmission process is completed. On the other hand, if the transmission disconnected flag TDF is set at zero (No at step S261), the program flow goes to step S263 of FIG. 18c.

On the other hand, if the image transmitted flag ITF is set at zero (Yes at step S245), or the image transmission is not completed, the program flow goes to step S247, there is executed a process for setting the transmission section such as the modem 77, and then, the image signal of the image data are transmitted through the ISDN line to the receiving facsimile apparatus of a destination. Thereafter, it is judged at step S249 whether or not the process for transmitting an image signal of one page is completed, and then, it is judged at step S251 whether or not the process for transmitting an image signal of all the pages is completed.

If the process for transmitting the image signal of one page is not completed (No at step S249), the program flow goes to step S259, and then, the image data are sent to the transmission section. Thereafter, the program flow returns to the main routine. If the process for transmitting the image signal of one page is completed (Yes at step S249) and the process for transmitting the image signal of all the pages is not completed (No at step S251), the program flow goes to step S257, and the page is updated at step S257. Thereafter, the program flow returns to the main routine. Further, if the process for transmitting the image signal of all the pages is completed (Yes at step S251), the image transmitted flag ITF is set at one at step S253, and the transmission disconnected flag TDF is reset to zero at step S255. Thereafter, the program flow returns to the main routine.

Figure 18C:
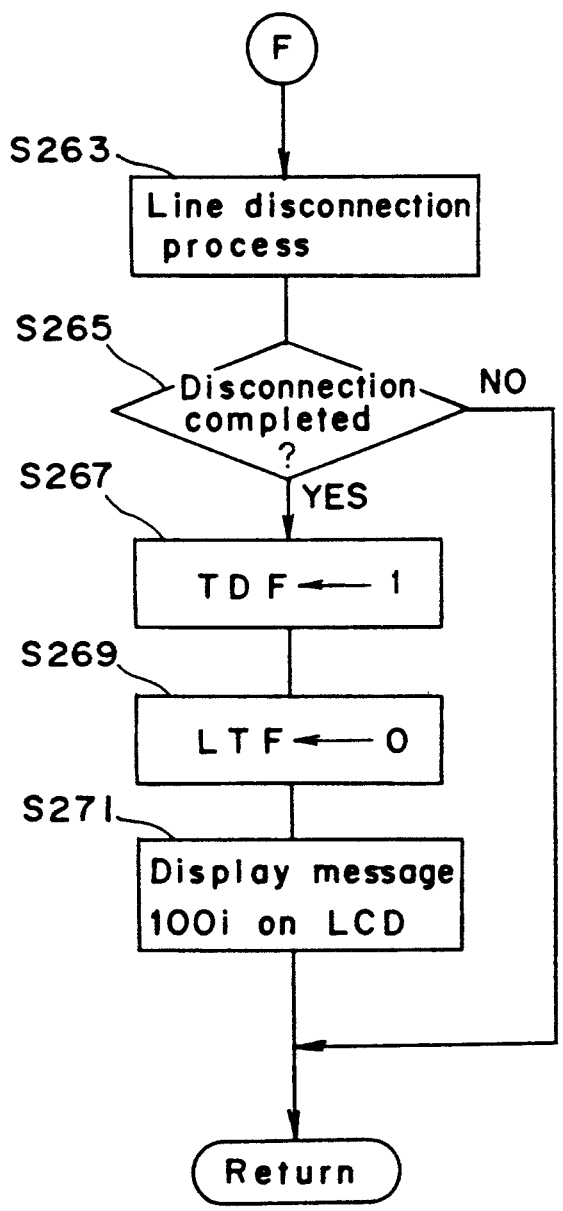

FIG. 18c shows a transmission line disconnection process, which is executed when the image transmission is completed or the image transmitted flag ITF is set at one (Yes at step S245) and the transmission disconnection process is not completed or the transmission disconnection flag TDF is set at zero (No at the step S261).

Referring to FIG. 18c, the line disconnection process is executed at step S263, and then, it is judged at step S265 whether or not the line disconnection process is completed. If the line disconnection process is completed (Yes at step S265), the transmission disconnected flag TDF is set at one at step S267, and then, the line transmission flag LTF is set at one at step S269. Thereafter, the message 100i shown in FIG. 3i is displayed on the LCD 41 so as to inform the operator of the completion of the transmission at step S271, and then, the program flow returns to the main routine. On the other hand, if the line disconnection process is not completed (No at step S265), the program flow returns to the main routine without executing any process.

Figure 18D:
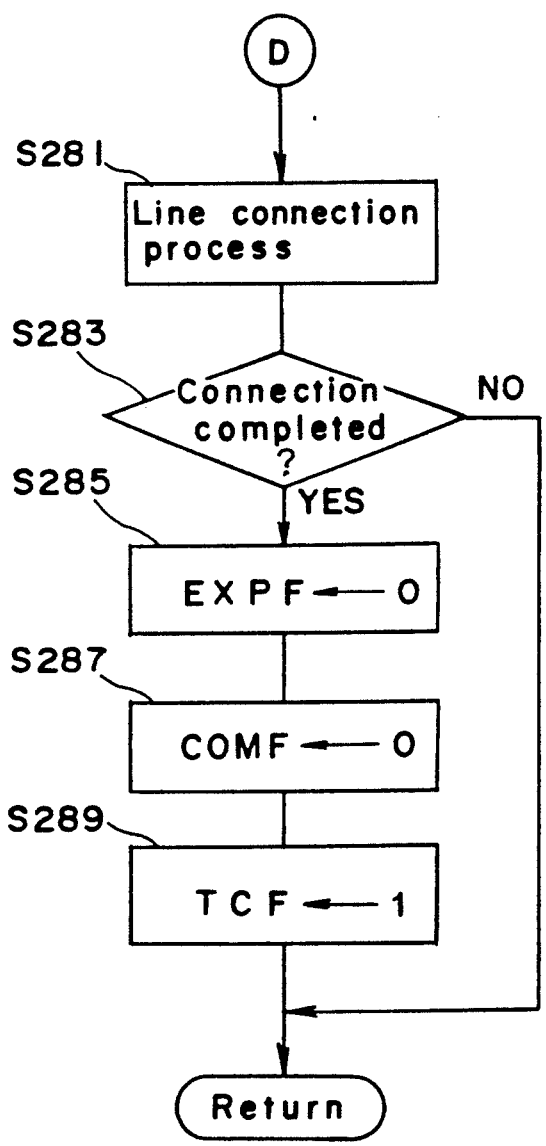

FIG. 18d shows a transmission line connection process, which is executed when it is judged that the transmission connected flag TCF is set at zero (No at step S243). In the process, there is executed the transmission line connection process for connecting the present facsimile apparatus with a receiving facsimile apparatus of a destination which is managed with the image data to be transmitted.

Referring to FIG. 18d, first of all, there is executed a line connection process at step S281, and then, it is judged at step S283 whether or not the line connection process is completed. If the line connection process is not completed (No at step S283), the program flow returns to the main routine without executing any process. On the other hand, if the line connection process is completed (Yes at step S283), the expansion flag EXPF is reset to zero at step S285, the compression flag COMF is reset to zero to zero at step S287, the transmission connected flag TCF is set at one at step S289, and then, the program flow returns to the main routine.

(f-9) Receipt process

Figure 19A:
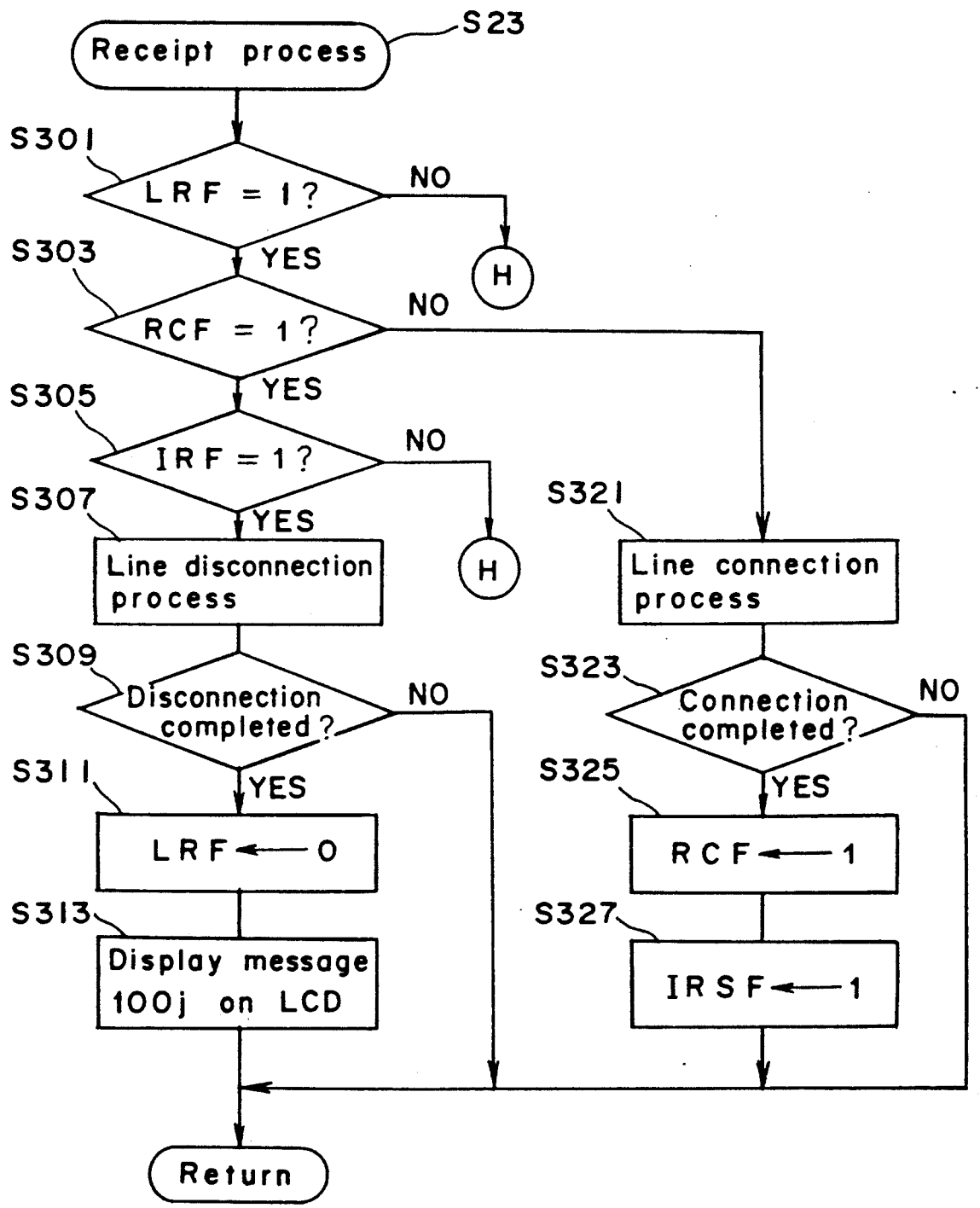
FIGS. 19a and 19b are flowcharts showing a receipt process of a subroutine executed by the communication control CPU shown in FIG. 4.
Figure 19B:
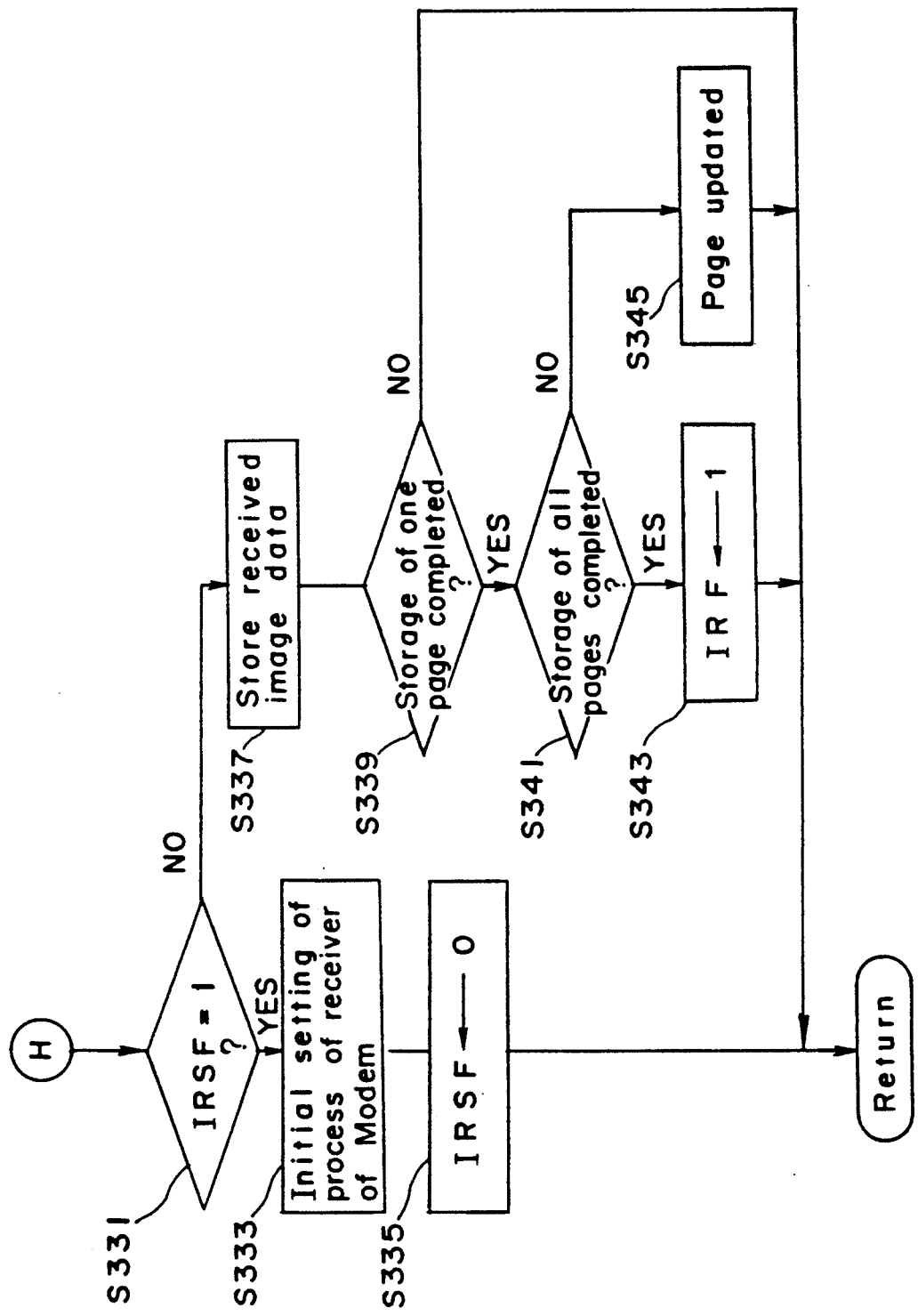

FIGS. 19a and 19b are flowcharts showing the receipt process (step S23) of a subroutine shown in FIG. 12.

Referring to FIG. 19a, it is judged at step S301 whether or not the line receipt flag LRF to be set when an image signal is being received is set at one. If the line receipt flag LRF is set at zero (No at step S301), the program flow goes to step S331 of FIG. 19b without executing any process. On the other hand, if the line receipt flag LRF is set at one (Yes at step S301) (See step S157 of FIG. 16), it is judged at step S303 whether or not the receipt connected flag RCF to be set when the line connection process upon the receipt process is completed is set at one. If the receipt connected flag RCF is set at one (Yes at step S303) (See step S325), it is judged at step S305 whether or not the image received flag IRF to be set when the receipt of the image signal is completed (See step S343 of FIG. 19b).

If the image received flag IRF is set at one (Yes at step S305), the program flow goes to step S307, the line disconnection process is executed. Thereafter, it is judged at step S309 whether or not the line disconnection process is completed. If the line disconnection process is completed (Yes at step S309), the line receipt flag LRF is reset to zero at step S311, the message 100j shown in FIG. 3j is displayed on the LCD 41 so as to inform the operator of the completion of the receipt, and then, the receipt process is completed. Thereafter, the program flow returns to the main routine. On the other hand, if the line disconnection process is not completed (No at step S309), the program flow returns to the main routine without executing any process. Thereafter, the line disconnection process continues to be executed.

On the other hand, if the receipt line connection process is not completed or the receipt connected flag RCF is set at zero (No at step S303), the program flow goes to step S321, first of all, the line connection process is executed, and then, it is judged at step S323 whether or not the line connection process is completed. If the line connection process is not completed (No at step S323), the program flow returns to the main routine without executing any process. On the other hand, if the line connection process is completed (Yes at step S323), the receipt connected flag RCF is set at one at step S325, the image receipt start flag IRSF is set at one at step S327, and then, the program flow returns to the main routine.

If the line receipt flag LRF is set at zero (No at step S301), or if the image received flag IRF is set at zero (No at step S305) or the process for receiving the image signal is not completed, the program flow goes to step S331 of FIG. 19b, and then, it is judged whether or not the image receipt start flag IRSF is set at one. If the image receipt start flag IRSF is set at one (Yes at step S331), there is executed an initial setting process for the receiving section such as the modem 77 at step S333, the image receipt start flag IRSF is reset to zero at step S335, and then, the program flow returns to the main routine.

On the other hand, if the image receipt start flag IRSF is set at zero (No at step S331), the program flow goes to step S337, and then, the received image data are stored in the image memory 75. Thereafter, it is judged at step S339 whether or not the process for storing the image data of one page is completed, and then, it is judged at step S341 whether or not the process for storing the image data of all the pages is completed. If the process for storing the image data of one page is completed (Yes at step S339) and the process for storing the image data of one page is not completed (No at step S339), the program flow returns to the main routine without executing any process. If the process for storing the image data of all the pages is not completed (No at step S341), the page of image data to be stored is updated at step S345, and then, the program flow returns to the main routine. Further, if the process for storing the image data of all the pages is completed (Yes at step S341), the image received flag IRF is set at one at step S343, and then, the program flow returns to the main routine.

(f-10) Reading process

Figure 20A:
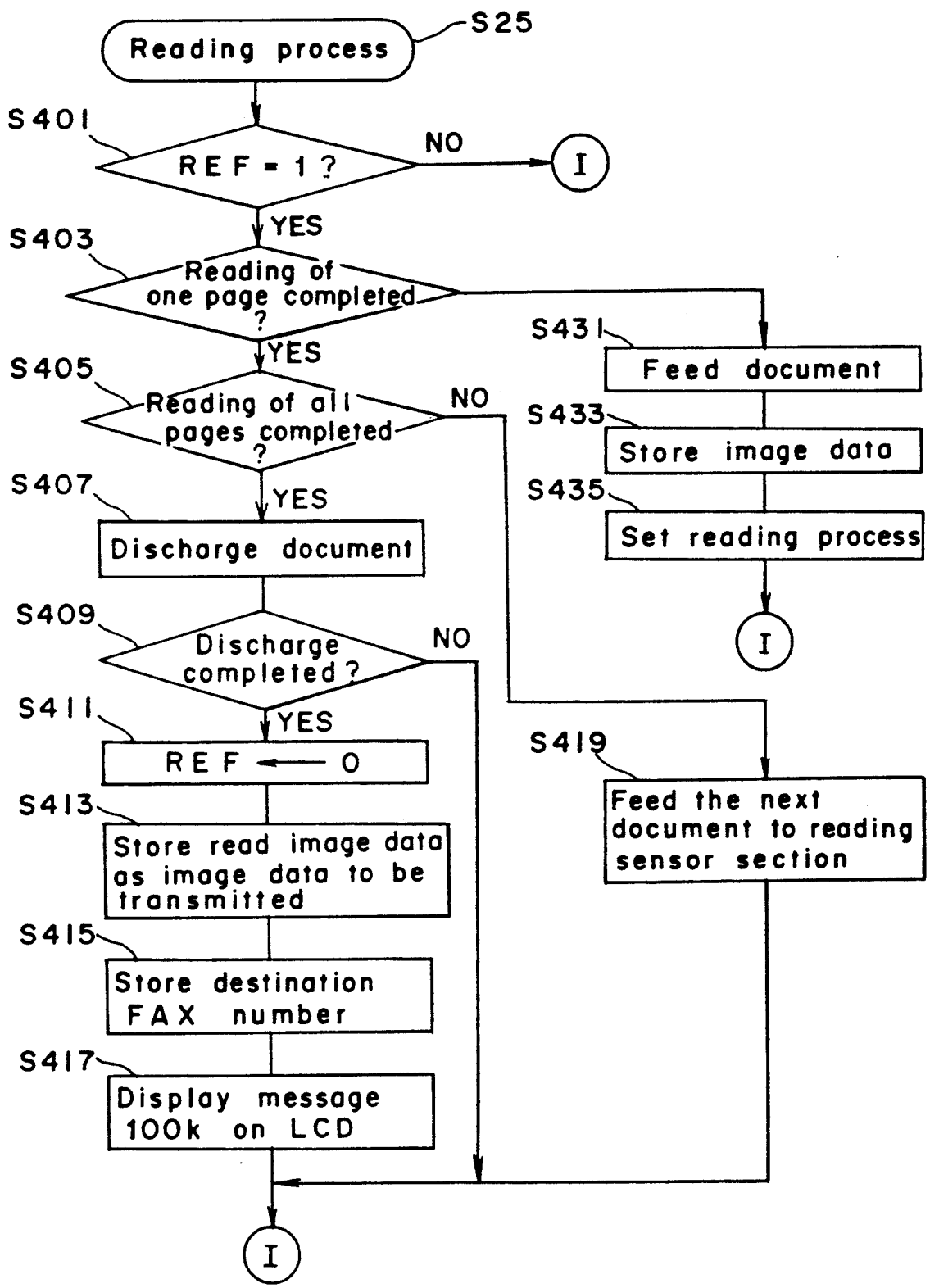
FIGS. 20a and 20b are flowcharts showing a reading process of a subroutine executed by the communication control CPU shown in FIG. 4.
Figure 20B:
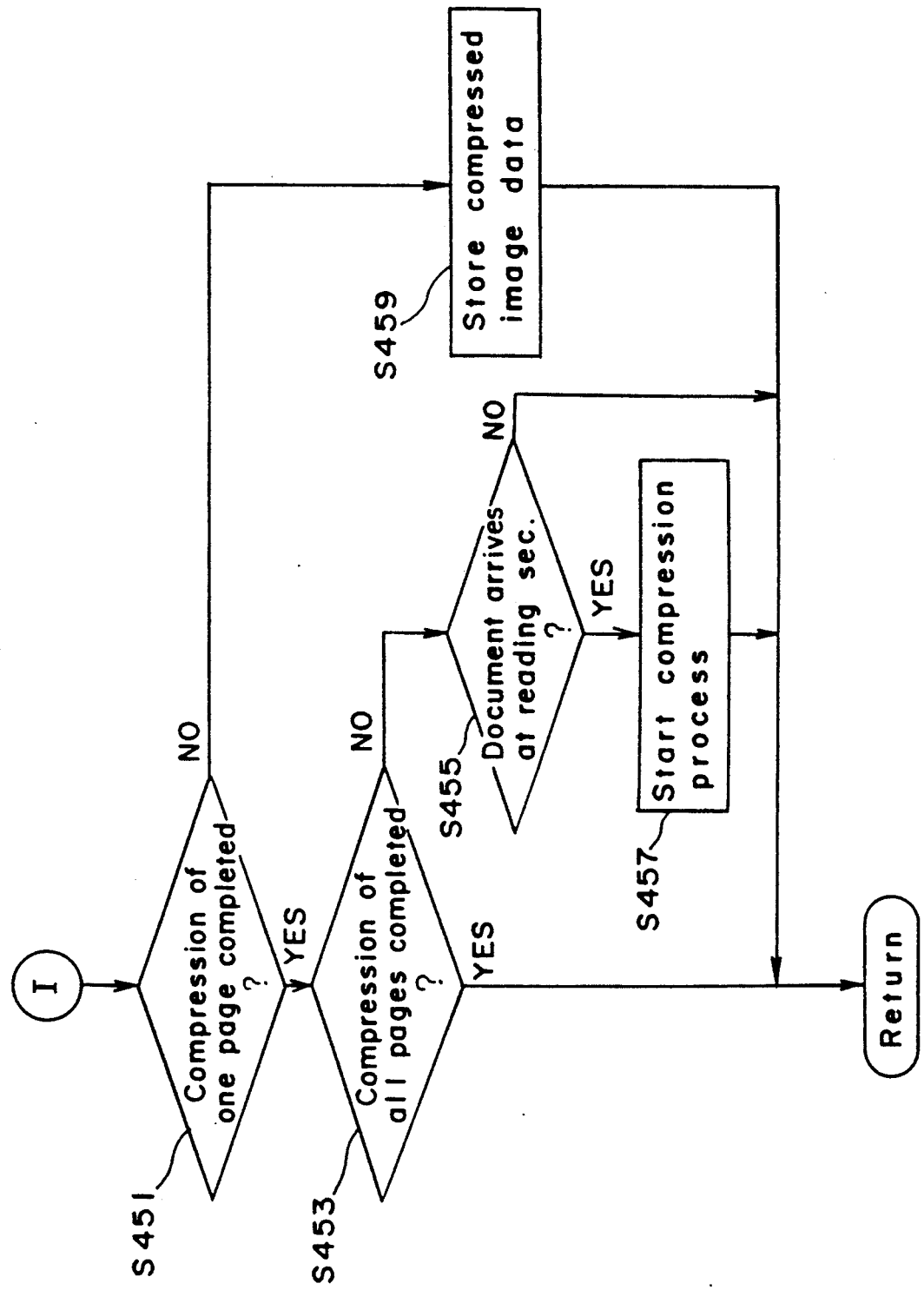

FIGS. 20a and 20b are flowcharts showing the reading process (step S25) of a subroutine shown in FIG. 12, which is executed for controlling the CCD linear image sensor 26 and the document feeding motors upon reading an image.

Referring to FIG. 20a, first of all, it is judged at step S401 whether or not the reading flag REF to be set when an image is read (See step S123 of FIG. 14b) is set at one. If the reading flag REF is set at zero (No at step S401), the program flow goes to step S451 of FIG. 20b. On the other hand, if the reading flag REF is set at one (Yes at step S401), the program flow goes to step S403 since the CCD linear image sensor 26 and the document feeding motors are being controlled. It is judged at step S403 whether or not the process for reading a document image of one page is completed, and further, it is judged at step S405 whether or not the process for reading the document image of all the pages is completed.

If the process for reading the document image of one page is not completed (No at step S403), the document is fed to the CCD linear image sensor 26 at step S431, the image data which have been read by the CCD linear image sensor 26 are stored in the buffer memory 72, there is executed a setting process for the next reading process at step S435, and then, the program flow goes to step S451 of FIG. 20b.

If the process for reading the document image of one page is completed (Yes at step S403), it is judged at step S405 whether or not the process for reading the document image of all the pages is completed. If the process for reading the document image of all the pages is not completed (No at step S405), the next document is fed to the CCD linear image sensor 26, and then, the program flow goes to step S451 of FIG. 20b.

On the other hand, if the process for reading the document image of all the pages is completed (Yes at step S405), the document is discharged onto the document discharge tray 21 at step S407, and then, it is judged at step S409 whether or not the above-mentioned document discharge process is completed. If the above-mentioned document discharge process is not completed (No at step S409), the program flow goes to step S451 of FIG. 20b, directly.

On the other hand, if the above-mentioned document discharge process is completed (Yes at step S409), the reading flag REF is reset to zero at step S411 in order to representing that any image is not read. Thereafter, the image data of the read image are stored as the transmission image in the buffer memory 72 at step S413, and then, the set facsimile number of the destination is managed using the RAM with the above-mentioned image data at step S415. Thereafter, the message 100k shown 3k is displayed on the LCD 41 so as to inform the operator of the completion of reading the image at step S417, and the program flow goes to step S451 of FIG. 20b.

Hereinafter, the compression process upon reading the image will described.

Referring to FIG. 20b, first of all, it is judged at step S451 whether or not the process for compressing the image data of one page is completed. If the process for compressing the image data of one page is not completed (No at step S451), the compressed image data are stored in the image memory 75 at step S459, and then, the program flow returns to the main routine. On the other hand, if the process for compressing the image data of one page is completed (Yes at step S451), it is judged at step S453 whether or not the process for compressing the image data of all the pages is completed.

If the process for compressing the image data of all the pages is completed (Yes at step S453), the program flow returns to the main routine. On the other hand, if the process for compressing the image data of all the pages is not completed (No at step S453), it is judged at step S455 whether or not the document arrives at the CCD linear image sensor 26. If the document arrives at the CCD linear image sensor 26 (Yes at step S455), the compression process is started at step S457, and then, the program flow returns to the main routine. On the other hand, if the document has not arrived at the CCD linear image sensor 26 (No at step S455), the program flow returns to the main routine without executing any process.

(f-11) Print control process

FIG. 21 is a flowchart showing the print control process (step S27) of a subroutine shown in FIG. 12, which is executed for controlling the printer section 1.

Referring to FIG. 21, first of all, it is judged at step S501 whether or not the print start flag PSF representing whether or not the printer section 1 is started is set at one. If the print start flag PSF is set at zero (No at step S501), the program flow goes to step S509. On the other hand, if the print start flag PSF is set at one (Yes at step S501) (See step S71 of FIG. 13), the print flag PRF is set at one at step S503, the printer section 1 is started at step S505, the print start flag PSF is reset to zero at step S507, and then, the program flow goes to step S509.

It is judged at step S509 whether or not the print flag PRF is set at one. If the print flag PRF is set at zero (No at step S509) or the process for printing the document images of all the pages is completed, the program flow returns to the main routine without executing any process. On the other hand, if the print flag PRF is set at one (Yes at step S509), the program flow goes to step S511.

It is judged at step S511 whether or not the process for expanding the image data of one page is completed. If the process for expanding the image data of one page is not completed (No at step S511), there is executed the expansion process such as a process for expanding the image data, a process for storing the expanded image data in the page memory 74 at step S513, and then, the program flow goes to step S515. On the other hand, if the process for expanding the image data of one page is completed (Yes at step S511), the program flow goes to step S515 without executing any process.

Thereafter, it is judged at step S515 whether or not the print process of one page is started. If the print process of one page is started (Yes at step S515), it is started to transfer the image data of one page from the page memory 74 to the printer controller 61. On the other hand, if the print process of one page is not started (No at step S515), the program flow goes to step S519.

Thereafter, it is judged at step S519 whether or not the print process of all the pages is completed. If the print process of all the pages is not completed (No at step S519), the printer section 1 is controlled so as to execute the print process at step S527, and then, the program flow returns to the main routine. On the other hand, if the print process of all the pages is completed (Yes at step S519), the print flag PRF is reset to zero at step S521, the printer section 1 is stopped, and then, the program flow returns to the main routine.

(f-12) Key input process

FIGS. 22a to 22g are flowcharts showing the key input process (step S29) of a subroutine shown in FIG. 12, which includes a process when various kinds of the keys of the operation panel 15 and a process for reading an image printed on a calling card.

Referring to FIG. 22a, first of all, it is judged at step S601 whether or not the registration flag REGF to be set in the registration mode is set at zero. If the registration flag REGF is set at zero or the registration mode is not set (Yes at step S601), the program flow goes to step S603, and then, data inputted using a set of ten keys 40 are stored in a ten key input buffer memory (not shown), sequentially. Thereafter, it is judged at step S605 whether or not the transmission key 43 has been turned on. If the transmission key 43 has been turned on (Yes at step S605), data stored in the ten key input buffer memory are stored in the RAM 64 as the facsimile number of the destination at step S607, and then, the program flow goes to step S621 of FIG. 22b. On the other hand, if the transmission key 43 has not turned on (No at step S605), the program flow goes to step S621 of FIG. 22b, directly.

If the registration mode is set or the registration flag REGF is set at one (No at step S601), the program flow goes to step S609, and then, it is judged whether or not the KCC mode is set or the KCC mode flag KCCF is set at one. If the KCC mode is set or the KCC mode flag KCCF is set at one (Yes at step S609), data inputted using a set of ten keys 40 are converted into KCC code in a manner well known to those skilled in the art, at step S611, and the converted KCC code is stored in a Kana and Chinese character input buffer memory (referred to as a KCC input buffer memory hereinafter) (not shown) at step S613. Thereafter, the program flow goes to step S621 of FIG. 22b. On the other hand, if the KCC mode is not set or the KCC mode flag KCCF is set at zero (No at step S609), the program flow goes to step S615, and then, data inputted using a set of ten keys 40 are stored in the ten key input buffer memory, directly. Thereafter, the program flow goes to step S621 of FIG. 22b.

Thereafter, at steps S621 and further steps, there is executed the following process when there are plural facsimile numbers upon reading an image printed on a calling card.

Referring to FIG. 22b, first of all, it is judged at step S621 whether or not the plural number flag PNF to be set when there are read plural facsimile numbers of facsimile apparatuses of the same facsimile group. If the plural number flag PNF is set at zero (No at step S621), the program flow goes to step S651 of FIG. 22c. On the other hand, if there have been read plural facsimile numbers or the plural number flag PNF is set at one (Yes at step S621), the program flow goes to step S623, and then, it is judged whether or not one of the plural facsimile numbers has been selected using a set of ten keys 40 by the operator. If one of the plural facsimile numbers has not been selected (No at step S623), it is judged at step S633 whether or not a time of one minute has been passed since the plural number flag PNF is set at one.

If a time of one minute has not passed (No at step S633), the program flow goes to step S643 of FIG. 22c, and then, the message 100p shown in FIG. 3p is displayed on the LCD 41 so as to instruct the operator to select one of the plural facsimile numbers. Thereafter, the program flow goes to step S651. Referring back to FIG. 22b, if one of the plural facsimile numbers has been selected (Yes at step S623), the plural number flag PNF is reset to zero at step S625, the plural number inputted flag PIF is set at one at step S627, the calling card read flag CRF is set at one at step S629, and then, the selected one of the plural facsimile numbers is stored in a temporary registration area of the RAM 64 at step S631. Thereafter, the program flow goes to step S651.

If a time of one minute has been passed without selecting one of the plural facsimile numbers (Yes at step S633), the program flow goes to step S635 in order to select one of the plural facsimile numbers, automatically. At step S635, the above-defined insertion direction of the calling card is checked.

If the insertion direction of the calling card is the left direction as shown in FIG. 32a, the leftmost facsimile number on the calling card is selected at step S636, and then, the program flow goes to step S641. If the insertion direction of the calling card is the right direction as shown in FIG. 32b, the rightmost facsimile number on the calling card is selected at step S637, and then, the program flow goes to step S641. If the insertion direction of the calling card is the top direction as shown in FIG. 32c, the topmost facsimile number on the calling card is selected at step S638, and then, the program flow goes to step S641. If the insertion direction of the calling card is the bottom direction as shown in FIG. 32d, the bottommost facsimile number on the calling card is selected at step S639, and then, the program flow goes to step S641.

At step S641, the message 100aa shown in FIG. 3aa including the automatically selected facsimile number is displayed on the LCD 41 so as to inform the operator of the selected facsimile number, and then, the program flow goes to step S625 of FIG. 22c.

In the process from step S651 to S673 shown in FIG. 22c, there is executed a process for reading the destinations and the facsimile numbers thereof which are stored in the IC card 52.

First of all, it is judged at step S651 whether or not the IC card 52 has been inserted into the IC card interface unit 51. If the IC card 52 has not been inserted thereinto (No at step S651), the program flow goes to step S671. On the other hand, if the IC card 52 has been inserted thereinto (Yes at step S651), it is judged at step S653 whether or not the IC card 52 is authorized, or an authorization number for the IC card 52 which is stored in the RAM 64 of the main body coincides with an authorization number which is stored in the RAM of the IC card 52. If the inserted IC card 52 is not authorized (No at step S653), the program flow goes to step S667, the message 100r shown in FIG. 3r is displayed on the LCD 41 so as to inform the operator that the inserted IC card can not used, the IC card validation card CVF is reset to zero at step S669, and then, the program flow goes to step S671.

On the other hand, if the inserted IC card 52 is authorized (Yes at step S653), first of all, an initial setting process is executed as follows.

In the present preferred embodiment, the destinations and the facsimile numbers thereof which are stored in the RAM of the IC card 52 are divided into twelve address groups, each of which corresponds to each of twelve one-touch dial keys 42. First of all, the address group is set at one at step S655. Thereafter, it is judged at step S657 whether or not the facsimile number is stored in the specified address group thereof. If the facsimile number is stored in the specified address group thereof (Yes at step S657), the message 100q shown in FIG. 3q is displayed on the LCD 41 so as to inform the operator of the number of the address group and the updated data corresponding to the one-touch dial key 42 at step S659, the IC card validation flag CVF is set at one at step S661, and then, the program flow goes to step S671. On the other hand, if the facsimile number is not stored in the specified address group thereof (No at step S657), and then, the message 100s shown in FIG. 3s is displayed on the LCD 41 at step S663 so as to inform the operator that there is stored no facsimile number in the RAM of the IC card 52, and in this case, data corresponding to the one-touch dial key 42 are stored therein as they are. Thereafter, the IC card validation flag CVF is reset to zero at step S665, and then, the program flow goes to step S671.

Thereafter, it is judged at step S671 whether or not a signal representing whether or not the IC card 52 has turned on. If the IC card 52 has been pulled out (Yes at step S671), the IC card validation flag CVF is reset to zero at step S673, the program flow goes to step S675 of FIG. 22d. On the other hand, if the IC card 52 has not been pulled out (No at step S671), the program flow goes to step S675 of FIG. 22d, directly.

In the process from step S675 to step S691, there is executed a process for the IC card load key 49 for selecting one of the above-mentioned address groups.

First of all, it is judged at step S675 whether or not the IC card load key 49 has been turned on. If the IC card load key 49 has not been turned on (No at step S675), the program flow goes to step S701 without executing any process. On the other hand, if the IC card load key 49 has been turned on (Yes at step S675), the program flow goes to step S677 in order to set the next address group, and then, it is judged whether or not the last address group is set as the address group. If the last address group is not set (No at step S677), the number of the address group is incremented at step S681, and then, the program flow goes to step S683. On the other hand, if the last address group is set (Yes at step S677), the address group is set at zero at step S679, and then, the program flow goes to step S683. Thereafter, it is judged at step S683 whether or not there are stored the facsimile number in the set address group thereof, and then, the process from step S683 to step S691 is executed in a manner similar to that of the process from step S657 to step S665 shown in FIG. 22d.

Namely, if the facsimile number is stored in the set address group thereof (Yes at step S683), the message 100q shown in FIG. 3q is displayed on the LCD 41 so as to inform the operator of the number of the address group and the updated data corresponding to the one-touch dial key 42 at step S685, the IC card validation flag CVF is set at one at step S687, and then, the program flow goes to step S701. On the other hand, if the facsimile number is not stored in the set address group thereof (No at step S683), and then, the message 100s shown in FIG. 3s is displayed on the LCD 41 at step S689 so as to inform the operator that there is stored no facsimile number in the RAM of the IC card 52, and in this case, data corresponding to the one-touch dial key 42 are stored therein as they are. Thereafter, the IC card validation flag CVF is rest to zero at step S691, and then, the program flow goes to step S701.

Thereafter, in the process from step S701 to S733 shown in FIGS. 22d and 22e, there is executed a process for the one-touch dial key 42. First of all, it is judged at step S701 whether or not the one-touch dial key 42 has been turned on. If the one-touch dial key 42 has not been turned on (No at step S701), the program flow goes to step S741 of FIG. 22f without executing any process.

If the present preferred embodiment, responsive to the set state or the reset state of the calling card registration flag CRGF, the one-touch dial keys 42 are used for setting a facsimile number of a destination upon transmitting an image signal, for registration the facsimile number read by the calling card reading function into the RAM 64 of the main body or the RAM of the IC card 52, and for registering a facsimile number of a destination into the one-touch dial key 42 without using the calling card reading function. Therefore, the following process is executed judging one of the cases depending on various kinds of the flags.

If the one-touch dial key 42 has been turned on (Yes at step S701), the program flow goes to step S703, and then, it is judged whether or not the registration flag REGF to be set when the registration mode is set is set at zero. If the registration mode is set or the registration flag REGF is set at one (Yes at step S703), the program flow goes to step S705, and then, it is judged whether or not the KCC mode flag KCCF to be set when the KCC mode is set is set at one. If the KCC mode is set or the KCC mode flag KCCF is set at one (Yes at step S705), the program flow goes to step S707, and then, data stored in the KCC input buffer memory are registered as a name of a destination. Thereafter, the program flow goes to step S741 of FIG. 22f. On the other hand, if the KCC mode is not set or the KCC mode flag is set at zero (No at step S705), the program flow goes to step S709, and then, data stored in the ten key input buffer memory are registered as a facsimile number of a destination. Thereafter, the program flow goes to step S741 of FIG. 22f. It is to be noted that the registration mode and the KCC mode are set using the registration key 47 and the KCC key 48, respectively, as shown in FIG. 22g.

On the other hand, if the registration mode without using the calling card reading function is not set (No at step S703), the program flow goes to step S711 of FIG. 22e, and then, it is judged whether or not the calling card registration flag CRGF representing whether or not the calling card registration mode is set is set at zero.

If the calling card registration mode is set (See step S749 of FIG. 22f) or the calling card registration flag CRGF is set at one (No at step S711), the program flow goes to step S731, and then, it is judged whether or not the calling card read flag CRF is set at one, or there is determined a facsimile number upon reading the calling card. If the calling card read flag CRF is set at one (Yes at step S731), the key registration flag KRF is set at one at step S733, and then, the program flow goes to step S741 of FIG. 22f. On the other hand, if the calling card read flag CRF is set at zero (No at step S731), the program flow goes to step S741 of FIG. 22f without executing any process so as to make the key input data being canceled. It is to be noted that the key registration flag KRF is used upon the calling card number registration process shown in FIG. 25.

If the calling card registration flag CRGF has been reset to zero (Yes at step S711), the program flow goes to step S713, and then, a facsimile number of a destination is set without using the calling card reading function. It is judged at step S713 whether or not the IC card validation flag CVF is set at one. If the IC card validation flag CVF is set at one (Yes at step S713), data such as the facsimile numbers stored in the RAM of the IC card 52 are read out at step S715, and then, the program flow goes to step S719. On the other hand, if the IC card validation flag CVF is set at zero (No at step S713), the facsimile number stored in the RAM 64 of the main body are read out at step S717, and then, the program flow goes to step S719.

Thereafter, it is judged at step S719 whether or not there are stored a facsimile number therein. If a facsimile number is stored therein (Yes at step S719), the program flow goes to step S721, and then, the read facsimile number is stored as a facsimile number of a destination at an address thereof corresponding to the pressed one-touch dial key 42. Thereafter, it is judged at step S723 whether or not a document is set on the document tray 21. If the document is set on the document tray 21 (Yes at step S725), the reading start flag RSF is set at one in order to start the reading process, and then, the program flow goes to step S741 of FIG. 22f. On the other hand, if a document is not set on the document tray 21 (No at step S723), the message 100m shown in FIG. 3m is displayed on the LCD 41 so as to instruct the operator to set a document on the document tray 21. Thereafter, the program flow goes to step S741 of FIG. 22f.

On the other hand, it is judged at step S719 that there is stored no facsimile number therein (No at step S719), the program flow goes to step S729, and then, the message 100t shown in FIG. 3t is displayed on the LCD 41 so as to instruct the operator to input a facsimile number using a set of ten keys 40. Thereafter, the program flow goes to step S741 of FIG. 22f.

In the process from step S741 to step S749 shown in FIG. 22f, there is executed a process for the calling card registration key 45. It is judged at step S741 whether or not the calling card registration key 45 has been turned on. If the calling card registration key 45 has not been turned on (No at step S741), the program flow goes to step S761 without executing any process. On the other hand, if the calling card registration key 45 has been turned on (Yes at step S741), the program flow goes to step S743, and then, it is judged whether or not the calling card 52 has been inserted into the IC card interface unit 51. If the calling card 52 has been inserted thereinto (Yes at step S743), the message 100w shown in FIG. 3w is displayed on the LCD 41 at step S745 so as to inform the operator of registering a facsimile number printed on a calling card, and then, the program flow goes to step S749. On the other hand, if the IC card 52 has not been inserted thereinto (No at step S743) the message 100x shown in FIG. 3x is displayed on the LCD 41 so as to instruct the operator to set a calling card on the calling card tray 31, and then, the program flow goes to step S749. At step S749, the calling card registration flag CRGF is set at one, and then, the program flow goes to step S761.

In the process from step S761 to step S765 shown in FIG. 22f, there is executed a process for the number print key 46. First of all, it is judged at step S761 whether or not the number print key 46 has been turned on. If the number print key 46 has not been turned on (No at step S761), the program flow goes to step S771 of FIG. 22g without executing any process. On the other hand, if the number print key 46 has been turned on (Yes at step S761), it is judged whether or not the print flag PRF is set at zero. If the print flag PRF is set at zero or the received image data are not being printed (Yes at step S763), the program flow goes to step S765, the number print flag NPF is set at one, and then, the program flow goes to step S771 of FIG. 22g. On the other hand, if the print flag PRF is set at one (No at step S763), the program flow goes to step S771 of FIG. 22g without executing any process.

In the process from step S771 to S787 shown in FIG. 22g, there is executed a process for the registration key 47 and the KCC key 48.

It is judged at step S771 whether or not the registration key 47 has been turned on. If the registration key 47 has not been turned on (No at step S771), the program flow goes to step S781 without executing any process. On the other hand, if the registration key 47 has been turned on (Yes at step S771), it is judged at step S773 whether or not the registration flag REGF representing whether or not the registration mode is set is set at one. If the registration mode is set or the registration flag REGF is set at one (Yes at step S773), the registration flag REGF is reset to zero at step S775 so as not to set the registration mode, and then, the program flow goes to step S781. On the other hand, if the registration mode is not set or the registration flag REGF is set at zero (No at step S773), the registration flag REGF is set at one at step S777 so as to set the registration mode, and then, the program flow goes to step S781.

Thereafter, the process for the KCC key 48 is executed in a manner similar to that of the above-mentioned registration key 47. It is judged at step S781 whether or not the KCC key 48 has been turned on. If the KCC key 48 has not been turned on (No at step S781), the program flow goes to step S791 without executing any process. On the other hand, if the KCC key 48 has been turned on (Yes at step S781), it is judged at step S783 whether or not the KCC mode flag KCCF representing whether or not the KCC mode is set is set at one. If the KCC mode is set or the KCC mode flag KCCF is set at one (Yes at step S783), the KCC mode flag KCCF is reset to zero at step S785 so as to set the non-KCC mode, and then, the program flow goes to step S791. On the other hand, if the non-KCC mode is set or the KCC mode flag KCCF is set at zero (No at step S783), the KCC mode flag KCCF is set at one at step S787 so as to set the KCC mode, and then, the program flow goes to step S791.

Further, there is executed the other process at step S791, and then, the key input process of the keys of the operation panel 15 is completed.

(f-13) Calling card reading process

FIGS. 23a to 23c are flowcharts showing the calling card reading process (step S31) of a subroutine shown in FIG. 12.

Referring to FIG. 23a, first of all, it is judged at step S1001 whether or not the calling card reading flag CCRF for instructing the reading sensor section 71 to read an image printed on a calling card is set at one. If the calling card reading flag CCRF is set at zero (No at step S1001), the program flow returns to the main routine without executing any process.

On the other hand, if the calling card reading flag CCRF is set at one (Yes at step S1001) (See steps 187 and 195 of FIG. 17), it is judged at step S1003 whether or not an image printed on a calling card is being read. If the image printed on the calling card is being read (Yes at step S1003), the read image data are sequentially stored into the buffer memory 72 at step S1005, there is set the reading process for the image data of the next line at step S1007, and then, the program flow returns to the main routine.

On the other hand, if the process for reading the image printed on the calling card is completed or the image printed on the calling card is not being read (No at step S1003), the program flow goes to step S1009 of FIG. 23b, and then, it is judged whether or not a process (referred to as a character recognition process hereinafter) for recognizing the characters printed on the calling card by the OCR character recognition section 67 is completed. If the character recognition process is completed (Yes at step S1009), the program flow goes to step S1011, and then, it is judged whether or not plural facsimile numbers have been recognized. If plural facsimile numbers have been recognized (Yes at step S1011), it is judged at step S1013 whether or not the plural number inputted flag PIF is set at zero, or one of the plural facsimile numbers has been selected.

If the plural inputted flag PIF is set at zero (Yes at step S1013), the program flow goes to step S1015, and then, it is judged whether or not the plural receiving facsimile apparatuses are the same facsimile group type of facsimile apparatuses so as to be the facsimile apparatuses of the G3 group. For example, if the plural receiving facsimile apparatuses are the different facsimile group type of facsimile apparatuses as shown in FIG. 5a (No at step S1015) (it is to be noted that a facsimile apparatus of G3 and G4 groups is handled as a facsimile apparatus of G4 group at the branch step of step S1015), the program flow goes to step S1019, and then, the most efficient receiving facsimile apparatus which can communicate with the present facsimile apparatus is selected. In the present preferred embodiment, since the present facsimile apparatus is the facsimile apparatus of G3 and G4 groups, the receiving facsimile apparatus of G4 group is selected among the plural receiving facsimile apparatuses. Thereafter, the calling card read flag CRF is set at one at step S1021 in order to represent that one of the plural facsimile apparatuses has been selected, and then, the message 100z shown in FIG. 3z is displayed on the LCD 41 at step S1023 so as to display the facsimile number corresponding to the selected facsimile apparatus. Thereafter, the selected facsimile number is registered and stored, and then, the program flow goes to step S1041 of FIG. 23a.

Referring back to FIG. 23b, if the plural receiving facsimile apparatuses are the same facsimile group type of facsimile apparatuses so as to be the facsimile apparatuses of the G3 group (Yes at step S1015), the plural number flag PNF representing whether or not the facsimile numbers of the same G3 facsimile group have been read is set at one at step S1017, the program flow goes to step S1041 of FIG. 23a. Thereafter, one of the plural facsimile numbers is selected using the operation panel 15.

If plural facsimile numbers have not been recognized (No at step S1011), it is judged at step S1031 whether or not one facsimile number has been recognized. If one facsimile number has been recognized (Yes at step S1031), it is judged at step S1035 whether or not the present facsimile apparatus can communicate with the receiving facsimile apparatus of the recognized facsimile number. If the present facsimile apparatus can communicate therewith (Yes at step S1035), the program flow goes to step S1021. On the other hand, if the present facsimile apparatus can not communicate therewith (No at step S1035), the message 100n shown in FIG. 3n is displayed on the LCD 41 so as to inform the operator that the present facsimile apparatus can not communicate with the receiving facsimile apparatus of the facsimile number, and then, the program flow goes to step S1041 of FIG. 23a. Further, If no facsimile number has been recognized (No at step S1031), the message 100y shown in FIG. 3y is displayed on the LCD 41 so as to inform the operator that no facsimile number has been recognized, and then, the program flow goes to step S1041 of FIG. 23a.

In the process from step S1041 to step S1045, there is executed a process for discharging the calling card after recognizing the facsimile number or numbers.

It is judged at step S1041 whether or not the process for discharging the calling card is completed. If the process for discharging the calling card is completed (Yes at step S1041), the calling card reading flag CCRF is reset to zero in order to represent that an image printed on the calling card is not being read, and then, the program flow returns to the main routine. On the other hand, if the process for discharging the calling card is not completed (No at step S1041), the calling card is transported in the opposite direction so as to be returned onto the calling card tray 31, and then, the program flow returns to the main routine.

Further, if the above-mentioned character recognition process is not completed (No at step S1009), the program flow goes to step S1051 of FIG. 23c, the CCCPU 60 transmits the commands of the start and end of each of recognizing the facsimile number or numbers and of recognizing the company's name as the name of the destination, which are printed on the calling card, to the OCR character recognition section 67. In the present preferred embodiment, the company's name is stored as the name of the destination, however, the present invention is not limited this. For example, the section's name etc. may be stored as the name of the destination. Further, there may be provided a means for selecting one of the plural names to be registered.

Referring to FIG. 23c, first of all, the message 100o shown in FIG. 3o is displayed on the LCD 41 so as to inform the operator that the characters printed on the calling card are being recognized, and then, it is judged at step S1053 whether or not the process for recognizing the facsimile number is started. If the process for recognizing the facsimile number is not started (No at step S1053), the program flow goes to step S1055, and then, the CCCPU 60 transmits a facsimile number recognition start command to the OCR character recognition section 67 so as to start the process for recognizing the facsimile number. Thereafter, the program flow returns to the main routine.

On the other hand, if the process for recognizing the facsimile number is started (Yes at step S1053), the program flow goes to step S1057, and then, it is judged whether or not the CCCPU 60 has received a facsimile number recognition completion command from the OCR character recognition section 67. If the CCCPU 60 has not received the facsimile number recognition start command therefrom (No at step S1057), the program flow returns to the main routine without executing any process.

On the other hand, if the CCCPU 60 has received the facsimile number recognition start command therefrom (Yes at step S1057), the program flow goes to step S1059, and then, it is judged whether or not the calling card registration flag CRGF is set at one, the calling card registration key 45 has pressed, or the calling card registration mode is set. If the calling card registration flag CRGF is set at zero (No at step S1059), the program flow goes to step S1067, the OCR character recognition process is completed, and then, the program flow returns to the main routine. On the other hand, if the calling card registration flag CRGF is set at one (Yes at step S1059), the program flow goes to step S1061 in order to recognize the company's name.

It is judged at step S1061 whether or not the CCCPU 60 has transmitted a company's name recognition start command to the OCR character recognition section 67. If the company's name recognition start command has not been transmitted to the OCR character recognition section 67 (No at step S1061), the company's name recognition start command is transmitted to the OCR character recognition section 67 at step S1063 in order to start the process for recognizing the company's name, and then, the program flow returns to the main routine.

On the other hand, if the process for recognizing the company's name is started (Yes at step S1061), the program flow goes to step S1065, and then, it is judged whether or not the CCCPU 60 has received a company's name recognition completion command from the OCR character recognition section 67, or the process for recognizing the company's name is completed. If the process for recognizing the company's name is not completed (No at step S1065), the program flow returns to the main routine with executing any process. On the other hand, if the process for recognizing the company's name is completed (Yes at step S1065), the program flow goes to step S1067, and then, the OCR character recognition process is completed. Thereafter, the program flow returns to the main routine.

(f-14) Number print process

FIG. 24 is a flowchart showing the number print process (step S33) of a subroutine shown in FIG. 12, which is provided for printing the names of the destinations and the facsimile numbers thereof which are stored in the RAM of the IC card 52 and the RAM of the main body, corresponding to the one-touch dial keys 42.

Referring to FIG. 24, first of all, it is judged at step S1101 whether or not the number print flag NPF presenting whether or not the number print mode is set (See step S765 of FIG. 22f) is set at one. If the number print flag NPF is set at zero (No at step S1101), the program flow returns to the main routine without executing any process. On the other hand, if the number print flag NPF is set at one (Yes at step S1101), it is judged at step S1103 whether or not there is completed a process (referred to as a bit map developing process hereinafter) for developing character code data including the names of destinations and the facsimile numbers thereof onto the page memory 74 of the bit map memory. If the bit map developing process is completed (Yes at step S1103), the program flow goes to step S1121.

On the other hand, if the bit map developing process is not completed (No at step S1103), it is judged at step S1105 whether or not the IC card validation flag CVF is set at zero. Then, the program flow branches to step 1107 or step S111 depending on the IC card validation flag CVF. Namely, if the IC card validation flag CVF is set at zero (Yes at step S1105), or data stored in the RAM 64 of the main body are to be printed, the first CCROM 65 is selected at step S1107, and then, the data stored in the RAM 64 of the main body corresponding to the one-touch dial keys 42 are developed at step S1109 onto the page memory 74 of the bit map memory in the format shown in FIG. 6c, reading the font data (for example, shown in FIG. 9b) which are stored in the first CCROM 65. Thereafter, the program flow goes to step S1121. On the other hand, if the IC card validation flag CVF is set at one (No at step S1105), or data stored in the RAM of the IC card 52 are to be printed, the second CCROM 66 is selected at step S1111, and then, the data stored in the RAM of the IC card 52 corresponding to the set address group of the IC card 52 are developed at step S1113 onto the page memory 74 of the bit map memory in the format shown in FIG. 7c, reading the font data (for example, shown in FIG. 10b) which are stored in the second CCROM 66. Thereafter, the program flow goes to step S1121. Namely, the font and the format for arranging the characters are changed depending on the size of the characters to be printed.

At step S1121, it is judged whether or not the number print process for printing the facsimile numbers is completed. If the number print process is not completed (No at step S1121), the number print process is performed at step S1125, and then, the program flow returns to the main routine. On the other hand, if the number print process is completed (Yes at step S1121), the number print flag NPF is reset to zero at step S1123, and then, the program flow returns to the main routine.

(f-15) Calling card number registration process

FIG. 25 is a flowchart showing the calling card number registration process (step S35) of a subroutine shown in FIG. 12.

Referring to FIG. 25, first of all, it is judged at step S1201 whether or not the calling card read flag CRF representing whether or not the facsimile number has been read is set at one, and then, it is judged at step S1203 whether or not the calling flag registration flag CRGF representing whether or not the calling card registration key 45 has been pressed is set at one. If the calling card read flag CRF is set at one (Yes at step S1201) and the calling card registration flag CRGF is set at one (Yes at step S1203), the program flow goes to step S1205. On the other hand, if the calling card read flag CRF is set at zero (No at step S1201) or the calling card registration flag CRGF is set at zero (No at step S1203), the program flow returns to the main routine without executing any process.

It is judged at step S1205 whether or not the IC card validation flag CVF is set at one. If the IC card validation flag CVF is set at one (Yes at step S1205), the message 100u shown in FIG. 3u is displayed on the LCD 41 at step S1207 so as to inform the operator of selecting the IC card 52, and then, the program flow goes to step S1211. On the other hand, if the IC card validation flag CVF is set at zero (No at step S1205), the message 100v shown in FIG. 3v is displayed on the LCD 41 at step S1209 so as to inform the operator of selecting the RAM of the main body, and then, the program flow goes to step S1211.

Thereafter, at step S1211, it is judged whether or not the one-touch dial key 42 to be registered has been pressed, or the key registration flag KRF is set at one. If the key registration flag KRF is set at zero (No at step S1211), the program flow returns to the main routine. On the other hand, if the key registration flag KRF is set at one (Yes at step S1211) (See step S733 of FIG. 22e), the program flow branches into step S1215 or S1217 depending on the IC card validation flag CVF. If the IC card validation flag CVF is set at one (Yes at step S1213), the data of the names of the destinations and the facsimile numbers thereof are stored in an area of the RAM of the IC card 52 corresponding to the one-touch dial key 42 of the address group selected by the IC card load key 49 at step S1215, and then, the program flow goes to step S1219. On the other hand, if the IC card validation flag CVF is set at zero (No at step S1213), the data of the names of the destinations and the facsimile numbers thereof are stored in an area of the RAM 64 of the main body corresponding to the one-touch dial key 42 at step S1217, and then, the program flow goes to step S1219.

Since the process for registering the facsimile number which has been read from the calling card is completed, the calling card registration flag CRGF is reset to zero at step S1219, the calling card read flag CRF is reset to zero at S1221, and then, the program flow returns to the main routine.

In the present preferred embodiment, data corresponding to the one-touch dial keys 42 are switched over depending on the IC card validation flag CVF (See FIG. 22c), however, the present invention is not limited to this. The data corresponding to the one-touch dial keys 42 may be switched over depending on turning on or off of another key. Further, there may be provided means for displaying the selected data corresponding to the one-touch dial keys 42.

(g) Control flow of OCR character recognition section

In the calling card reading process shown in FIGS. 23a and 23b, when the OCR character recognition section 67 receives the facsimile number recognition start command or the company's name recognition start command, the OCR character recognition section 67 executes the OCR character recognition process as described below, and when the OCR character recognition process is completed, the OCR character recognition section 67 transmits the facsimile number recognition completion command or the company's name recognition completion command with recognized information such as the presence of the facsimile number, the facsimile number, the functions, the coordinates etc. to the CCCPU 60, so as to inform the CCCPU 60 of the completion of the OCR character recognition process. Since the process for searching a character or characters and the process for recognizing characters are performed utilizing the OCR technique which is well known to those skilled in the art, the detailed description of these processes is omitted in the specification.

(g-1) Main routine

FIG. 26 is a flowchart showing the OCR character recognition process of a main routine executed by the OCR character recognition section 67 shown in FIG. 4.

Referring to FIG. 26, first of all, it is judged at step S2001 whether or not the OCR character recognition section 67 has received the facsimile number recognition start command from the CCCPU 60. If the OCR character recognition section 67 has not received the facsimile number recognition start command from the CCCPU 60 (No at step S2001), the program flow goes to step S2013. On the other hand, if the OCR character recognition section 67 has received the facsimile number recognition start command from the CCCPU 60 (Yes at step S2001), the OCR character recognition for the facsimile number is performed as follows. Namely, there is executed a direction judgment process (See FIG. 27) for judging the printed direction of the characters at step S2003, there is executed a character recognition process (See FIG. 28) for cutting out characters and recognizing the cut-out characters at step S2005, and then, there is executed a "FAX" search process (See FIG. 29) for searching the character train representing the facsimile or the facsimile number such as "FAX", "FACSIMILE" at step S2007. Further, there is executed a facsimile number search process (See FIG. 30a and 30b) for searching the facsimile number at step S2009, and then, the OCR character recognition section 67 transmits the character code of the recognized facsimile number and the facsimile number recognition completion command to the CCCPU 60 at step S2011. Thereafter, the program flow goes to step S2013.

Thereafter, it is judged at step S2013 whether or not the OCR character recognition section 67 has received the company's name recognition start command from the CCCPU 60. If the OCR character recognition section 67 has not received the company's name recognition start command from the CCCPU 60 (No at step S2013), the program flow goes back to step S2001. On the other hand, if the OCR character recognition section 67 has received the company's name recognition start command from the CCCPU 60 (Yes at step S2013), the OCR character recognition for the company's name is performed as follows. Namely, there is executed the direction judgment process for judging the printed direction of the characters at step S2015, there is a character cut-out process for cutting out characters at step S2017, and then, there is executed a process for converting the cut-out characters into character train at step S2019. Thereafter, at step S2021, the OCR character recognition section 67 compares the occupied ratio of character portions or black portions of the character train with each other among all the character train so as to search the character train having the high occupied ratio thereof as the most boldfaced character train. Thereafter, the OCR character recognition section 67 executes the character recognition process for the searched character train at step S2023, and transmits the character code of the recognized character train as information of the company's name to the CCCPU 60. Thereafter, the OCR character recognition section 67 transmits the company's name recognition completion command to the CCCPU 60 at step S2025, and then, the program flow goes back to step S2001.

(g-2) Direction judgment process

FIG. 27 is a flowchart showing the direction judgment process (step S2003) of a subroutine shown in FIG. 26, which is provided for determining the printed direction of characters printed on a calling card.

Referring to FIG. 27, first of all, it is judged at step S2301 whether or not the direction judgment process is not completed for the whole area of the calling card. If the direction judgment process is not completed for the whole area thereof (Yes at step S2301), one character is cut out among the image printed on the calling card at step S2303, and then, it is judged at step S2305 whether or not the cut-out character has a suitable size which is fallen into a predetermined range of the character size used as the facsimile number. If the cut-out character has not the suitable size (No at step S2305), the program flow goes back to step S2301, and then, the next character is cut out. On the other hand, if the cut-out character has the suitable size (Yes at step S2305), it is judged whether or not the cut-out character is a character printed in the above-defined top direction, the above-defined bottom direction, the above-defined left direction or the above-defined right direction, respectively, at steps S2307, S2308, S2309 or S2310.

If the cut-out character is a character printed in the top direction (Yes at step S2307), the program flow goes to step S2311, the printed direction of the character is judged as the top direction, the OCR character recognition section 67 transmits information of the judgment result thereof to the CCCPU 60, and then, the program flow returns to the main routine.

If the cut-out character is a character printed in the bottom direction (Yes at step S2308), the program flow goes to step S2312, the printed direction of the character is judged as the bottom direction, the OCR character recognition section 67 transmits information of the judgment result thereof to the CCCPU 60, and then, the program flow returns to the main routine.

If the cut-out character is a character printed in the left direction (Yes at step S2309), the program flow goes to step S2313, the printed direction of the character is judged as the left direction, the OCR character recognition section 67 transmits information of the judgment result thereof to the CCCPU 60, and then, the program flow returns to the main routine.

If the cut-out character is a character printed in the right direction (Yes at step S2310), the program flow goes to step S2314, the printed direction of the character is judged as the right direction, the OCR character recognition section 67 transmits information of the judgment result thereof to the CCCPU 60, and then, the program flow returns to the main routine.

On the other hand, if the cut-out character is not characters printed in the above-defined top direction, the above-defined bottom direction, the above-defined left direction and the above-defined right direction, (No at steps S2307, S2308, S2309 and S2310), the program flow returns to the main routine.

Further, if the direction judgment process is completed for the whole area (No at step S2301), the program flow goes to step S2315, the OCR character recognition section 67 transmits a judgment impossible command to the CCCPU 60 since there is found no suitable character, and then, the program flow returns to the main routine.

(g-3) Character recognition process

Figure 28:
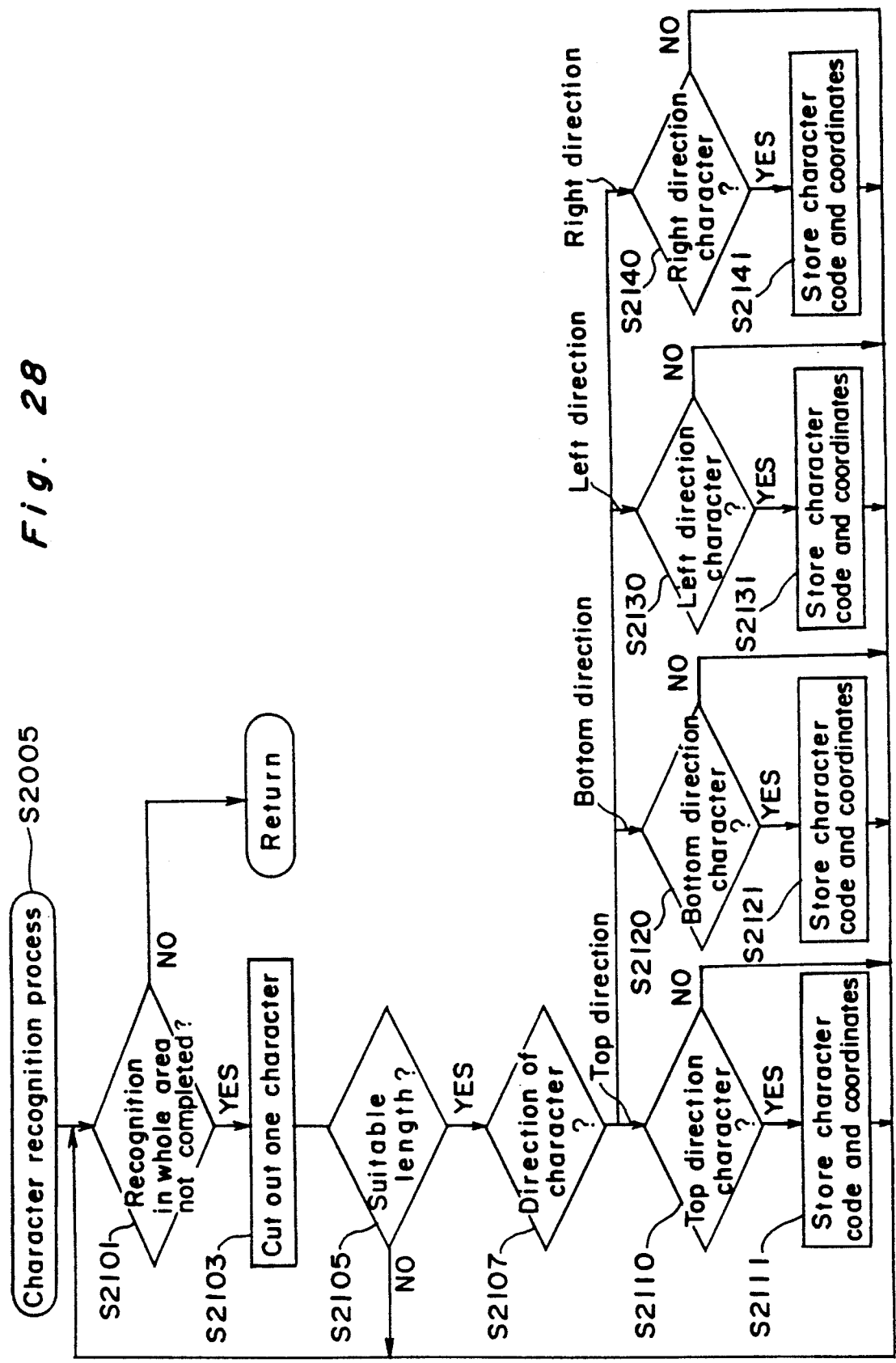
FIG. 28 is a flowchart showing a character recognition process of a subroutine executed by the optical character reader character recognition section shown in FIG. 4.

FIG. 28 is a flowchart showing the character recognition process (step S2005) of a subroutine shown in FIG. 26.

Referring to FIG. 28, it is judged at step S2101 whether or not the character recognition process is not completed for the whole area of a calling card. If the character recognition process is not completed for the whole area thereof (Yes at step S2101), one character is cut out from the image printed on the calling card, it is judged at step S2105 whether or not the cut-out character has a suitable size which is fallen into the predetermined range of the character size used as the facsimile number. If the cut-out character has not the suitable size (No at step S2105), the program flow goes back to step S2101, and then, the next character is cut out. On the other hand, if the cut-out character has the suitable size (Yes at step S2105), the printed direction of the cut-out character is judged at step S2107, and then, the program flow branches into step S2110, S2120, S2130 or S2140 depending on the printed direction of the cut-out character.

If the printed direction of the cut-out character is the top direction, the program flow goes to step S2110, and then, it is judged whether or not the cut-out character coincides with a character of an alphabet or a numeral in the top direction by comparing the cut-out character with the font data stored in the font table 69 for the OCR. If the cut-out character coincides with a character of an alphabet or a numeral in the top direction (Yes at step S2110), the character code of the cut-out character and the coordinates representing the position thereof are stored in the RAM 68 for the OCR at step S2111, and then, the program]flow goes back to step S2101. On the other hand, if the cut-out character does not coincide with a character of an alphabet or a numeral in the top direction (No at step S2110), the program flow goes back to step S2101 without executing any process.

If the printed direction of the cut-out character is the bottom direction, the program flow goes to step S2120, and then, it is judged whether or not the cut-out character coincides with a character of an alphabet or a numeral in the bottom direction by comparing the cut-out character with the font data stored in the font table 69 for the OCR. If the cut-out character coincides with a character of an alphabet or a numeral in the bottom direction (Yes at step S2120), the character code of the cut-out character and the coordinates representing the position thereof are stored in the RAM 68 for the OCR at step S2121, and then, the program flow goes back to step S2101. On the other hand, if the cut-out character does not coincide with a character of an alphabet or a numeral in the bottom direction (No at step S2120), the program flow goes back to step S2101 without executing any process.

If the printed direction of the cut-out character is the left direction, the program flow goes to step S2130, and then, it is judged whether or not the cut-out character coincides with a character of an alphabet or a numeral in the left direction by comparing the cut-out character with the font data stored in the font table 69 for the OCR. If the cut-out character coincides with a character of an alphabet or a numeral in the left direction (Yes at step S2130), the character code of the cut-out character and the coordinates representing the position thereof are stored in the RAM 68 for the OCR at step S2131, and then, the program flow goes back to step S2101. On the other hand, if the cut-out character does not coincide with a character of an alphabet or a numeral in the left direction (No at step S2130), the program flow goes back to step S2101 without executing any process.

If the printed direction of the cut-out character is the right direction, the program flow goes to step S2140, and then, it is judged whether or not the cut-out character coincides with a character of an alphabet or a numeral in the right direction by comparing the cut-out character with the font data stored in the font table 69 for the OCR. If the cut-out character coincides with a character of an alphabet or a numeral in the right direction (Yes at step S2140), the character code of the cut-out character and the coordinates representing the position thereof are stored in the RAM 68 for the OCR at step S2141, and then, the program flow goes back to step S2101. On the other hand, if the cut-out character does not coincide with a character of an alphabet or a numeral in the top direction (No at step S2140), the program flow goes back to step S2101 without executing any process.

On the other hand, if the character recognition process is completed for the whole area of the calling card (No at step S2101), the program flow returns to the main routine without executing any process.

(g-4) FAX search process

FIG. 29 is a flowchart showing the FAX search process (step S2007) of a subroutine shown in FIG. 26, which is provided for searching the character train representing the facsimile or the facsimile number. In the present preferred embodiment, there are searched character trains of "FAX" and "FACSIMILE" in order to describe the FAX search process, briefly. The other character trains representing the facsimile or the facsimile number such as "facsimile", "fax", "TELE-FAX" may be searched in this process. In the FAX search process, first of all, the character train "FAX" is searched, and secondly, the character train "FACSIMILE" is searched.

Referring to FIG. 29, first of all, it is judged at step S2201 whether or not there is a character "F" in the character code data stored in the RAM 68 for the OCR at step S2111, S2121, S2131 or S2141 by searching them. If there is the character "F" therein (Yes at step S2201), the program flow goes to step S2203, and then, there is executed the one character search process (See FIG. 31) for searching the next character. On the other hand, if there is no character "F" (No at step S2201), the program flow goes to step S2237. After executing the one character search process of step S2203, it is judged at step S2205 whether or not the searched one character is a character "A". If the searched one character is the character "A" (Yes at step S2205), the program flow goes to step S2207, and then, there is executed the one character search process (See FIG. 31) for searching the next character. On the other hand, if the searched one character is not the character "A" (No at step S2205), the program flow goes to step S2237.

After executing the one character search process of step S2207, it is judged at step S2209 whether or not the searched one character is a character "X". If the searched one character is the character "X" (Yes at step S2209), the program flow goes to step S2211, and then, the coordinates of the character train "FAX" are determined at step S2211 since the character train "FAX" has been searched. Thereafter, the program flow goes to step S2237. On the other hand, if the searched one character is not the character "X" (No at step S2209), the program flow goes to step S2213.

It is judged at step S2213 whether or not the next character of the character "A" is a character "C". If the next character of the character "A" is a character "C" (Yes at step S2213), the program flow goes to step S2215, and then, there is executed the one character search process (See FIG. 31) for searching the next character. On the other hand, if the next character of the character "A" is not a character "C" (No at step S2213), the program flow goes to step S2237.

After executing the one character search process of step S2215, it is judged at step S2217 whether or not the searched one character is a character "S". If the searched one character is the character "S" (Yes at step S2217), the program flow goes to step S2219, and then, there is executed the one character search process (See FIG. 31) for searching the next character. On the other hand, if the searched one character is not the character "S" (No at step S2217), the program flow goes to step S2237.

After executing the one character search process of step S2219, it is judged at step S2221 whether or not the searched one character is a character "I". If the searched one character is the character "I" (Yes at step S2221), the program flow goes to step S2223, and then, there is executed the one character search process (See FIG. 31) for searching the next character. On the other hand, if the searched one character is not the character "I" (No at step S2221), the program flow goes to step S2237.

After executing the one character search process of step S2223, it is judged at step S2225 whether or not the searched one character is a character "M". If the searched one character is the character "M" (Yes at step S2225), the program flow goes to step S2227, and then, there is executed the one character search process (See FIG. 31) for searching the next character. On the other hand, if the searched one character is not the character "M" (No at step S2225), the program flow goes to step S2237.

After executing the one character search process of step S2227, it is judged at step S2229 whether or not the searched one character is a character "I". If the searched one character is the character "I" (Yes at step S2229), the program flow goes to step S2231, and then, there is executed the one character search process (See FIG. 31) for searching the next character. On the other hand, if the searched one character is not the character "I" (No at step S2229), the program flow goes to step S2237.

After executing the one character search process of step S2231, it is judged at step S2232 whether or not the searched one character is a character "L". If the searched one character is the character "L" (Yes at step S2232), the program flow goes to step S2233, and then, there is executed the one character search process (See FIG. 31) for searching the next character. On the other hand, if the searched one character is not the character "L" (No at step S2232), the program flow goes to step S2237.

After executing the one character search process of step S2233, it is judged at step S2234 whether or not the searched one character is a character "E". If the searched one character is the character "E" (Yes at step S2234), the program flow goes to step S2235, and then, the coordinates of the character train "FACSIMILE" are determined at step S2211 since the character train "FACSIMILE" has been searched. Thereafter, the program flow goes to step S2237. On the other hand, if the searched one character is not the character "E" (No at step S2234), the program flow goes to step S2237.

It is judged at step S2237 whether or not the FAX search process is completed for all the characters of the character data stored in the RAM 68 for the OCR. If the FAX search process is not completed for all the characters thereof (No at step S2237), the program flow goes back to step S2201, and then, the FAX search process continues to be executed from step S2201.

On the other hand, if the FAX search process is completed for all the characters of the character data stored in the RAM 68 for the OCR (Yes at step S2237), it is judged at step S2239 whether or not the character train "FAX" or "FACSIMILE" has been searched. If the character train "FAX" or "FACSIMILE" has not been searched (No at step S2239), the program flow goes to step S2241, and then, the message 100y shown in FIG. 3y is displayed on the LCD 41 so as to inform the operator of no facsimile number in the read characters of the calling card. Thereafter, the program flow returns to the main routine.

On the other hand, if the character train "FAX" or "FACSIMILE" has been searched (Yes at step S2239), the program flow returns to the main routine without executing any process.

(g-5) Facsimile number search process

Figure 30A:
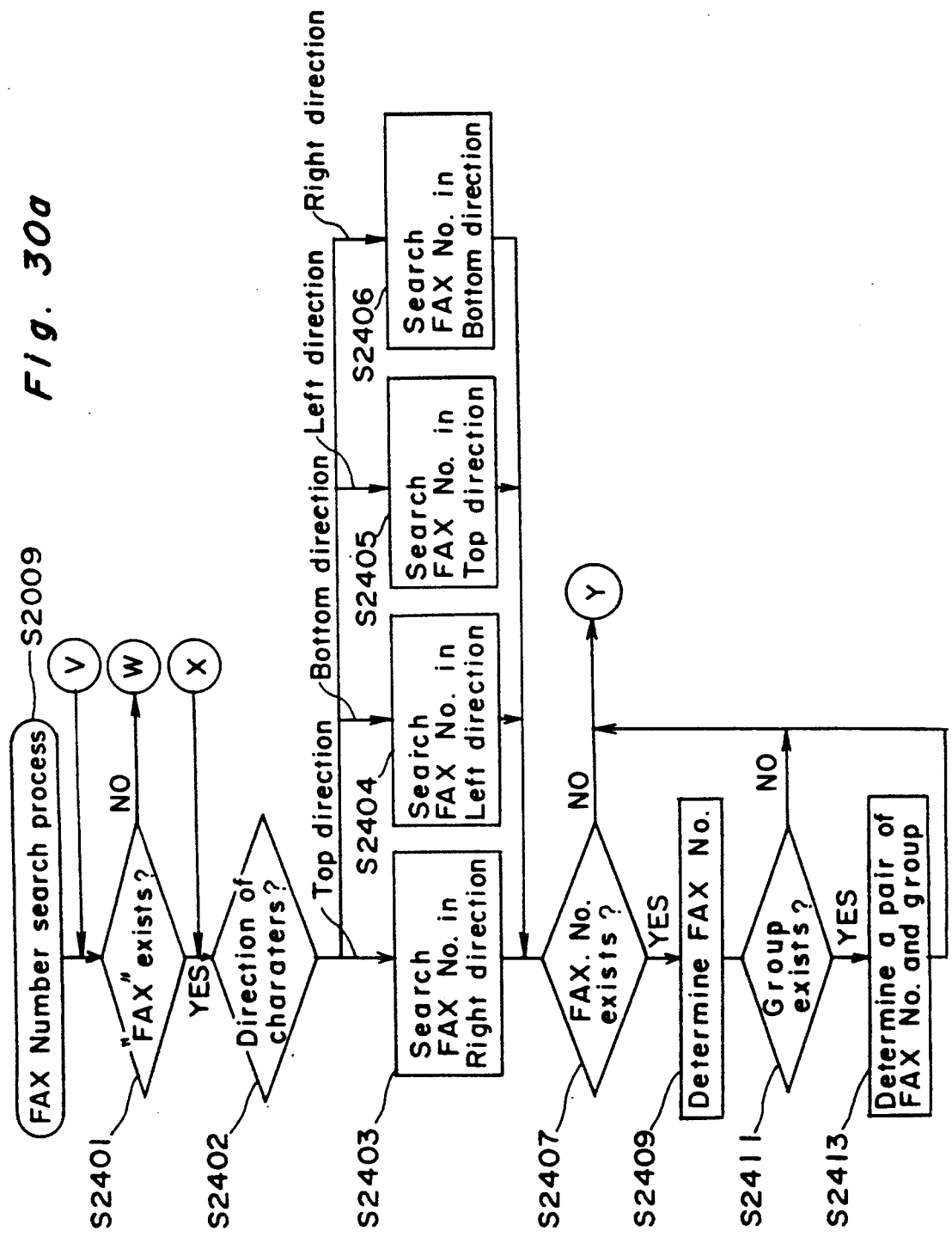
FIGS. 30a and 30b are flowcharts showing a facsimile number search process of a subroutine executed by the optical character reader character recognition section shown in FIG. 4.
Figure 30B:
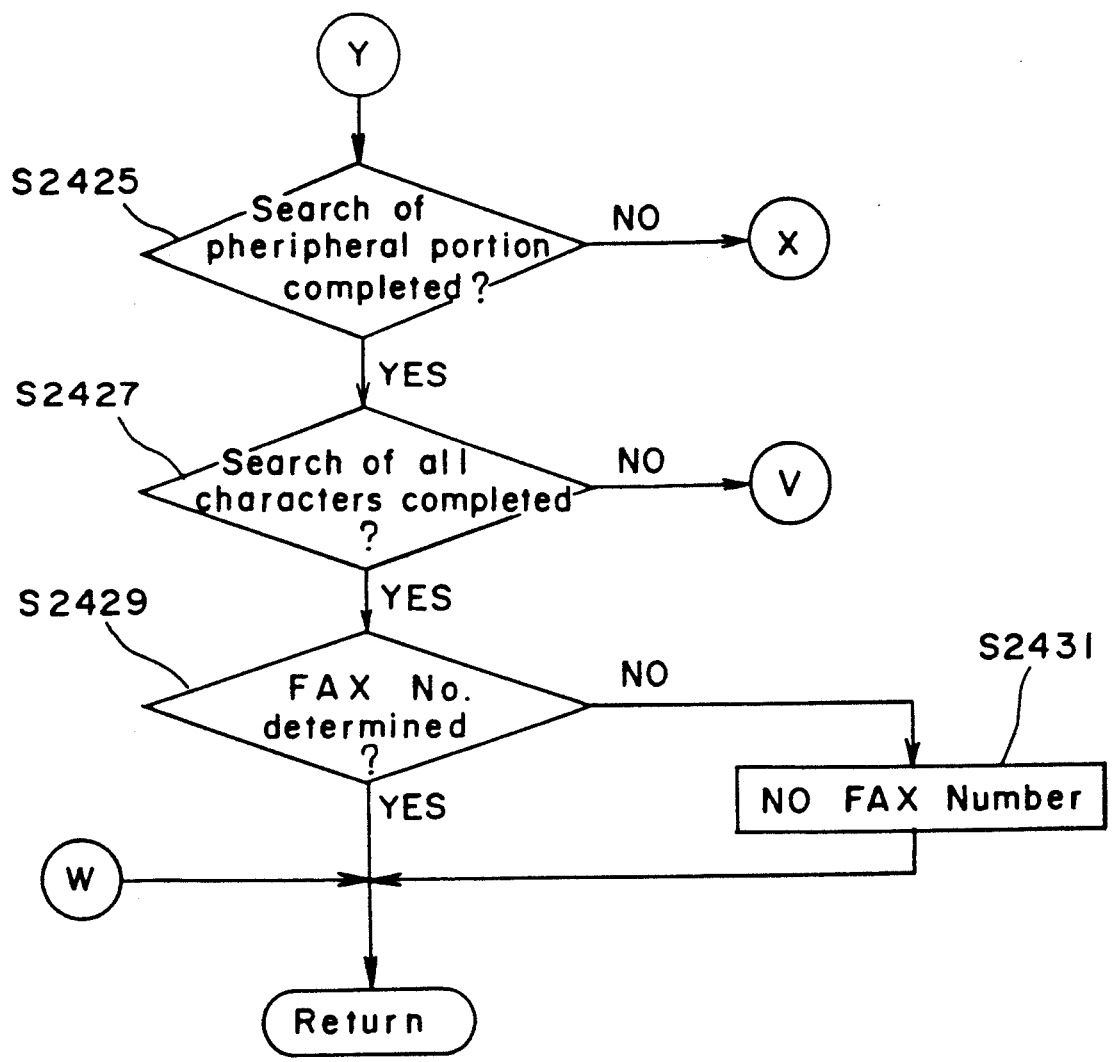

FIGS. 30a and 30b are flowcharts showing the facsimile number search process (step S2009) of a subroutine shown in FIG. 26.

Referring to FIG. 30a, first of all, it is judged at step S2401 whether or not the character train "FAX" or "FACSIMILE" has been searched. If the character train "FAX" or "FACSIMILE" has not been searched (No at step S2401), the program flow returns to the main routine without executing any process. On the other hand, if the character train "FAX" or "FACSIMILE" has been searched (Yes at step S2401), the direction of the character train thereof is judged at step S2402. The program flow branches into step S2403, S2404, S2405 or S2406 depending on the direction of the character train thereof.

If the direction of the character train thereof is the above-defined top direction, the program flow goes to step S2403, and then, the facsimile number is searched in the right direction from the coordinates of the character train thereof. Thereafter, the program flow goes to step S2407.

If the direction of the character train thereof is the above-defined bottom direction, the program flow goes to step S2404, and then, the facsimile number is searched in the left direction from the coordinates of the character train thereof. Thereafter, the program flow goes to step S2407.

If the direction of the character train thereof is the above-defined left direction, the program flow goes to step S2405, and then, the facsimile number is searched in the top direction from the coordinates of the character train thereof. Thereafter, the program flow goes to step S2407.

If the direction of the character train thereof is the above-defined right direction, the program flow goes to step S2406, and then, the facsimile number is searched in the bottom direction from the coordinates of the character train thereof. Thereafter, the program flow goes to step S2407.

It is judged at step S2407 whether or not the facsimile number has been searched. If the facsimile number has not been searched (No at step S2407), the program flow goes to step S2425 of FIG. 30b. On the other hand, if the facsimile number has been searched (Yes at step S2407), the program flow goes to step S2409, and then, the searched facsimile number is determined. Thereafter, it is judged at step S2411 whether or not the character train representing the facsimile group has been searched in the characters of the calling card. If the character train representing the facsimile group has not been searched in the characters of the calling card (No at step S2411), the program flow goes to step S2425 of FIG. 30b. On the other hand, if the character train representing the facsimile group has been searched in the characters of the calling card (Yes at step S2411), the program flow goes to step S2413, and then, the searched facsimile group is determined and is stored in the RAM 68 for the OCR with the facsimile number corresponding thereto. At that time, if plural character trains representing the facsimile or the facsimile number have been searched, the facsimile groups corresponding to the searched plural character trains thereof have been searched. Thereafter, the program flow goes to step S2425 of FIG. 30b.

At step S2402 of the present preferred embodiment, the direction of the character train is judged with respect to four directions: the top and bottom directions and the left and right directions. However, the present invention is not limited to this. The direction of the character train may be judged with respect to a direction inclined by an angle in the range from zero degrees to 90 degrees from the top or bottom direction, or the left or right direction.

Thereafter, it is judged at step S2425 whether or not the process for searching the facsimile number in the vicinity of the character train of "FAX" or "FACSIMILE" is completed. If the process for searching the facsimile number in the vicinity of the character train of "FAX" or "FACSIMILE" is not completed (No at step S2425), the program flow goes back to step S2402 of FIG. 30a, and then, the above-mentioned process continues to be executed. On the other hand, if the process for searching the facsimile number in the vicinity of the character train of "FAX" or "FACSIMILE" is completed (Yes at step S2425), the program flow goes to step S2427, and then, it is judged whether or not the process for searching the facsimile number is completed in all the character trains representing the facsimile or the facsimile number.

If the process for searching the facsimile number is not completed in all the character trains representing the facsimile or the facsimile number (No at step S2427), the program flow goes back to step S2401 of FIG. 30a. On the other hand, if the process for searching the facsimile number is completed in all the character trains representing the facsimile or the facsimile number (Yes at step S2427), the program flow goes to step S2429, and then, it is judged whether or not at least one facsimile number has been searched. If at least one facsimile number has been searched (Yes at step S2429), the program flow returns to the main routine. On the other hand, if any facsimile number has not been searched (No at step S2429), the program flow goes to step S2431, and then, it is judged that there is no facsimile number in all the characters. Thereafter, the program flow returns to the main routine.

(g-6) One character search process

FIG. 31 is a flowchart showing the one character search process (steps S2203, S2207, S2215, S2219, S2223, S2227, S2231 and S2233) of a subroutine shown in FIG. 29.

Referring to FIG. 31, first of all, the direction of the characters is judged at step S2501, and then, the program flow branches into step S2502, S2503, S2504 or S2505 depending on the direction of the characters.

If the direction of the characters is the top direction at step S2501, the program flow goes to step S2502, and then, the coordinates of one character in the right direction are added to the present searching coordinates. Thereafter, the program flow goes to step S2507.

If the direction of the characters is the bottom direction at step S2501, the program flow goes to step S2503, and then, the coordinates of one character in the left direction are added to the present searching coordinates. Thereafter, the program flow goes to step S2507.

If the direction of the characters is the left direction at step S2501, the program flow goes to step S2504, and then, the coordinates of one character in the top direction are added to the present searching coordinates. Thereafter, the program flow goes to step S2507.

If the direction of the characters is the top direction at step S2501, the program flow goes to step S2505, and then, the coordinates of one character in the bottom direction are added to the present searching coordinates. Thereafter, the program flow goes to step S2507.

It is judged at step S2507 whether or not there is a character in the vicinity of the present searching coordinates. If there is a character in the vicinity of the present searching coordinates (Yes at step S2507), the program flow goes to step S2509, the character code of the searched character and the coordinates thereof are stored in the RAM 68 for the OCR, and then, the program flow returns to the original routine. On the other hand, if there is no character in the vicinity of the present searching coordinates (No at step S2507), the program flow goes to step S2511, it is judged that there is no character, and then, the program flow returns to the original routine.

(h) Other modifications

FIG. 33a is a front view of another example of a calling card on which facsimile numbers are printed, and FIG. 33b is a front view of a message displayed on the liquid crystal display of the operation panel shown in FIG. 2.

In the case of a calling card 80c shown in FIG. 33a, namely, in the case that there are plural character trains representing "FAX" and there are plural facsimile numbers corresponding to one character train representing "FAX" in the Osaka Branch Office, the facsimile number of the facsimile apparatus of the most efficient facsimile group may be selected every character train representing "FAX", and then, a message 100ab shown in FIG. 33b including the selected facsimile numbers may be displayed on the LCD 41. In this case, even though there are printed facsimile numbers of plural offices, since the facsimile number of the suitable facsimile apparatus of each office can be displayed on the LCD 41, the operator can transmit image data of a document image to the office to be transmitted, more efficiently, by selecting one of the displayed plural facsimile numbers by the manual operation.

In the present preferred embodiment, a facsimile number is read by the OCR technique from an image or characters printed on a calling card, however, the present invention is not limited this. A facsimile number may be read by the OCR technique from an image or characters printed on a letter head.

In the present preferred embodiment, there is used an ISDN line in order to connect a transmitting facsimile apparatus with a receiving facsimile apparatus, however, the present invention is limited to this. There may be used a communication line such as a telephone line, a digital data exchange (DDX) line.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A facsimile apparatus comprising:

input means including a print key and a plurality of one-touch dial keys arranged on an operation panel, each key of said plurality of one-touch dial keys designating a destination to communicate;

storage means for storing data of destinations and facsimile numbers thereof so as to correspond to respective said plurality of one-touch dial keys of said input means;

line connection means for dialing through a communication line said facsimile number stored in said storage mean corresponding to a pressed one of said plurality of one-touch dial keys of said input means when one of said plurality of one-touch dial keys of said input means is pressed; and print means automatically responsive to pressing of said print key for printing said data of destinations thereof stored in said storage means on a piece of paper or label in a format suitable for sticking it in the vicinity of each of said plurality of one-touch dial keys of said input means on said operation panel.

2. The apparatus as claimed in claim 1, further comprising:

image reading means for reading an image of a document and converting said read image into image data; and transmission means for transmitting said image data converted by said image reading means to a receiving facsimile apparatus of a destination having said dialed facsimile number.

3. The apparatus as claimed in claim 1, further comprising;

a page memory for storing bit map data; and developing means for developing the data stored in said storage means into bit map data of bit images on said page memory corresponding to the arrangement of said plurality of one-touch dial keys of said input means, wherein said print means prints the data stored in said storage means according to the bit map data stored in said page memory.

4. A facsimile apparatus comprising:

input means including a print key and a plurality of one-touch dial keys arranged on an operation panel, each key of said plurality of one-touch dial keys designating a destination to communicate;

an IC card including storage means for storing data of destinations and facsimile numbers thereof so as to correspond to respective said plurality of one-touch dial keys of said input means;

line connection means for dialing through a communication line said facsimile number stored in said storage means of said IC card corresponding to a pressed one of said plurality of one-touch dial keys of said input means when one of said plurality of one-touch dial keys on said input means is pressed; and print means automatically responsive to pressing of said print key for printing said data of destinations thereof stored in said storage means of the IC card on a piece of paper or label in a format suitable for sticking it on said IC card.

5. The apparatus as claimed in claim 4, further comprising:

a page memory for storing bit map data; and developing means for developing the data stored in said storage means into bit map data of bit images on said page memory corresponding to the arrangement of said plurality of one-touch dial keys of said input means, wherein said print means prints the data stored in said storage means according to the bit map data stored in said page memory.

6. The apparatus as claimed in claim 4, further comprising:

image reading means for reading an image of a document and converting said read image into image data; and transmission means for transmitting said image data converted by said image reading means to a receiving facsimile apparatus of a destination having said dialed facsimile number.

7. A facsimile apparatus comprising:

input means including a print key and a plurality of one-touch dial keys arranged on an operation panel, each key of said plurality of one-touch dial keys designating a destination to communicate;

first storage means for storing data of destinations and facsimile numbers thereof so as to correspond to respective said plurality of one-touch dial keys of said input means;

an IC card including second storage means for storing data of destinations and facsimile numbers thereof so as to correspond to respective said plurality of one-touch dial keys of said input means;

first selection means for selecting either data stored in said first storage means or data stored in said second storage means as data to be printed;

first print means automatically responsive to pressing of said print key for printing said data of destinations thereof stored in said first storage means on a piece of paper or label in a format suitable for sticking it in the vicinity of each of said plurality of one-touch dial keys of said input means on said operation panel;

second print means automatically responsive to pressing of said print key for printing said data of destinations thereof stored in said second storage means of said IC card on a piece of paper or label in a format suitable for sticking it on said IC card; and second selection means for selecting said first print means and enabling said first print means when said data stored in said first storage means are selected by said first selection means, and for selecting said second print means and enabling said second print means when said data stored in said second storage means are selected by said first selection means.

8. The apparatus as claimed in claim 7, further comprising:

line connection means for dialing through a communication line said facsimile number stored in said first or second storage means selected by said first selection means corresponding to a pressed one of said plurality of one-touch dial keys of said input means when one of said plurality of one-touch dial keys of said input means is pressed;

image reading means for reading an image of a document and converting said read image into image data; and transmission means for transmitting said image data converted by said image reading means to a receiving facsimile apparatus of a destination having said dialed facsimile number.

* * * * *

UNITED STATES PATENT AND TRADEMARK OFFICE
CERTIFICATE OF CORRECTION

PATENT NO. : 5,293,256
DATED : March 8, 1994
INVENTOR(S) : Shigenobu Fukushima, et al.

It is certified that error appears in the above-indentified patent and that said Letters Patent is hereby corrected as shown below:

In Col. 2, line 41, change "selected" to -- select --.

In Col. 9, line 28, change "signals" to -- signal --.

In Col. 11, line 49, before "are expanded", delete "and".

In Col. 12, line 32, after "printed" insert -- on --.

In Col. 28, line 54, after "shown" insert -- in Fig. --

In Col. 28, line 59, after "will", insert -- be --.

In Col. 31, line 57, after "not" insert -- be --.

In Col. 38, line 31, change "with" to -- without --.

In Col. 43, line 14, after "program", delete "]".

In Col. 48, line 49, after "limited", insert -- to --.

In Col. 48, line 55, before "limited" insert -- not --.

Signed and Sealed this

Eighteenth Day of October, 1994

Attest:

BRUCE LEHMAN

Attesting Officer      Commissioner of Patents and Trademarks